United States Patent
Moon et al.

(10) Patent No.: US 12,382,063 B2
(45) Date of Patent: Aug. 5, 2025

(54) IMAGE ENCODING/DECODING METHOD AND DEVICE

(71) Applicant: INDUSTRY ACADEMY COOPERATION FOUNDATION OF SEJONG UNIVERSITY, Seoul (KR)

(72) Inventors: Joo Hee Moon, Seoul (KR); Sung Won Lim, Seoul (KR); Dong Jae Won, Goyang-si (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 18/425,273

(22) Filed: Jan. 29, 2024

(65) Prior Publication Data
US 2024/0244230 A1 Jul. 18, 2024

Related U.S. Application Data

(60) Division of application No. 17/492,779, filed on Oct. 4, 2021, now abandoned, which is a continuation of
(Continued)

(30) Foreign Application Priority Data

| Jan. 16, 2017 | (KR) | 10-2017-0007346 |
| Jan. 16, 2017 | (KR) | 10-2017-0007347 |
| Jan. 16, 2017 | (KR) | 10-2017-0007348 |

(51) Int. Cl.
H04N 19/82 (2014.01)
H04N 19/124 (2014.01)
(Continued)

(52) U.S. Cl.
CPC ......... H04N 19/159 (2014.11); H04N 19/124 (2014.11); H04N 19/176 (2014.11); H04N 19/45 (2014.11); H04N 19/52 (2014.11)

(58) Field of Classification Search
CPC .. H04N 19/159; H04N 19/124; H04N 19/176; H04N 19/45; H04N 19/52;
(Continued)

(56) References Cited

U.S. PATENT DOCUMENTS

| 6,173,078 B1 | 1/2001 | Kadono |
| 6,333,949 B1 | 12/2001 | Nakagawa |

(Continued)

FOREIGN PATENT DOCUMENTS

| CN | 103385004 A | 11/2013 |
| CN | 103875246 A | 6/2014 |

(Continued)

OTHER PUBLICATIONS

Chinese Office Action from Chinese Patent Application No. 201880007055.1 dated Oct. 13, 2022.
(Continued)

*Primary Examiner* — Philip P. Dang
(74) *Attorney, Agent, or Firm* — Dilworth & Barrese, LLP.; Michael J. Musella, Esq.

(57) ABSTRACT

The present invention relates to an image encoding/decoding method and device. In an image decoding method and device according to an embodiment of the present invention, a reconstructed pixel region within an image to which a current block to be decoded belongs is selected; a motion vector of the reconstructed pixel region is derived on the basis of the reconstructed pixel region and a reference image of the current block; and the derived motion vector is selected as a motion vector of the current block.

3 Claims, 51 Drawing Sheets

Related U.S. Application Data application No. 16/478,259, filed as application No. PCT/KR2018/000750 on Jan. 16, 2018, now abandoned.

(51) Int. Cl.
  *H04N 19/159* (2014.01)
  *H04N 19/176* (2014.01)
  *H04N 19/44* (2014.01)
  *H04N 19/52* (2014.01)

(58) Field of Classification Search
  CPC .. H04N 19/157; H04N 19/463; H04N 19/513; H04N 19/54; H04N 19/56; H04N 19/567; H04N 19/583; H04N 19/105
  See application file for complete search history.

(56) References Cited

U.S. PATENT DOCUMENTS

| | | | |
|---|---|---|---|
| 7,773,828 B2* | 8/2010 | Sakata | H04N 23/68 348/208.99 |
| 7,929,610 B2 | 4/2011 | Sun | |
| 8,085,846 B2* | 12/2011 | Tourapis | H04N 19/109 348/620 |
| 8,102,920 B2 | 1/2012 | Suh | |
| 8,644,395 B2 | 2/2014 | Huang | |
| 8,665,964 B2* | 3/2014 | Joshi | H04N 19/11 375/240.11 |
| 8,750,378 B2* | 6/2014 | Karczewicz | H04N 19/52 375/240.12 |
| 8,855,206 B2* | 10/2014 | Pateux | H04N 19/137 382/233 |
| 9,058,659 B2 | 6/2015 | Yie | |
| 9,088,795 B2* | 7/2015 | Kadono | H04N 19/577 |
| 9,148,667 B2* | 9/2015 | Chien | H04N 19/147 |
| 9,154,803 B2 | 10/2015 | Kwon | |
| 9,165,379 B2* | 10/2015 | Lim | H04N 19/52 |
| 9,288,485 B2 | 3/2016 | Chono | |
| 9,300,943 B2* | 3/2016 | Sugio | H04N 19/597 |
| 9,324,165 B2* | 4/2016 | Lin | H04N 19/53 |
| 9,338,476 B2* | 5/2016 | Van der Auwera | H04N 19/159 |
| 9,357,195 B2* | 5/2016 | Chen | H04N 19/597 |
| 9,357,214 B2* | 5/2016 | Zhang | H04N 19/52 |
| 9,438,910 B1* | 9/2016 | Han | H04N 19/61 |
| 9,491,458 B2* | 11/2016 | Tu | H04N 19/147 |
| 9,491,459 B2* | 11/2016 | Seregin | H04N 19/52 |
| 9,491,460 B2* | 11/2016 | Seregin | H04N 19/577 |
| 9,491,480 B2* | 11/2016 | Lim | H04N 19/567 |
| 9,525,872 B2* | 12/2016 | Joshi | H04N 19/147 |
| 9,609,324 B2* | 3/2017 | Kim | H04N 19/61 |
| 9,699,450 B2* | 7/2017 | Zhang | H04N 13/161 |
| 9,729,881 B2 | 8/2017 | Song | |
| 9,736,454 B2 | 8/2017 | Hunnuksela | |
| 9,749,658 B2* | 8/2017 | Yoshikawa | H04N 19/61 |
| 9,788,015 B2* | 10/2017 | Chen | H04N 19/44 |
| 9,807,427 B2* | 10/2017 | Helle | H04N 19/52 |
| 9,819,954 B2 | 11/2017 | Park | |
| 9,819,963 B2* | 11/2017 | Kim | H04N 19/593 |
| 9,832,467 B2* | 11/2017 | Rapaka | H04N 19/117 |
| 9,866,863 B1* | 1/2018 | Han | H04N 19/176 |
| 9,906,790 B2* | 2/2018 | Kim | H04N 19/176 |
| 9,912,955 B2 | 3/2018 | Song | |
| 9,918,105 B2* | 3/2018 | Pang | H04N 19/44 |
| 10,033,997 B2* | 7/2018 | Hayashi | H04N 19/44 |
| 10,148,981 B2* | 12/2018 | Zhu | H04N 19/597 |
| 10,154,271 B2* | 12/2018 | Park | H04N 19/597 |
| 10,182,234 B2* | 1/2019 | Park | H04N 19/30 |
| 10,212,419 B2* | 2/2019 | Hinz | H04N 19/159 |
| 10,250,881 B2 | 4/2019 | Song | |
| 10,313,682 B2* | 6/2019 | Pang | H04N 19/70 |
| 10,321,145 B2* | 6/2019 | Lee | H04N 19/463 |
| 10,321,151 B2 | 6/2019 | Chen | |
| 10,321,162 B2 | 6/2019 | Ramasubramonian | |
| 10,334,263 B2* | 6/2019 | Park | H04N 19/30 |
| 10,368,084 B2* | 7/2019 | Lee | H04N 19/159 |
| 10,375,405 B2* | 8/2019 | Chen | H04N 19/33 |
| 10,491,892 B2* | 11/2019 | Lim | H04N 19/105 |
| 10,554,966 B2* | 2/2020 | Lee | H04N 19/597 |
| 10,574,999 B2* | 2/2020 | Tanner | H04N 19/567 |
| 10,582,215 B2* | 3/2020 | Jang | H04N 19/56 |
| 10,621,614 B2* | 4/2020 | Helle | H04N 19/139 |
| 10,645,421 B2 | 5/2020 | Ishida | |
| 10,666,940 B2* | 5/2020 | Park | H04N 19/46 |
| 10,687,053 B2* | 6/2020 | Jun | H04N 19/147 |
| 10,708,589 B2 | 7/2020 | Mishurovskiy | |
| 10,728,571 B2* | 7/2020 | Son | H04N 19/44 |
| 10,798,403 B2* | 10/2020 | Ikai | H04N 19/52 |
| 10,979,707 B2 | 4/2021 | Chen | |
| 11,153,562 B2 | 10/2021 | Zhang | |
| 11,234,003 B2 | 1/2022 | Jang | |
| 11,317,094 B2* | 4/2022 | Chen | H04N 19/573 |
| 11,800,089 B2* | 10/2023 | Jang | H04N 19/176 |
| 12,041,227 B2* | 7/2024 | Kang | H04N 19/176 |
| 2010/0329336 A1 | 12/2010 | Soho | |
| 2011/0122950 A1* | 5/2011 | Ji | H04N 19/51 375/E7.243 |
| 2011/0150095 A1* | 6/2011 | Choi | H04N 19/52 375/E7.125 |
| 2011/0194613 A1* | 8/2011 | Chen | H04N 19/176 375/E7.2 |
| 2012/0106645 A1* | 5/2012 | Lin | H04N 19/56 375/E7.125 |
| 2012/0269268 A1 | 10/2012 | Kim et al. | |
| 2012/0275522 A1* | 11/2012 | Kim | H04N 19/567 375/E7.243 |
| 2013/0083853 A1* | 4/2013 | Coban | H04N 19/51 375/E7.243 |
| 2013/0121407 A1 | 5/2013 | Chono | |
| 2013/0216150 A1 | 8/2013 | Kondo | |
| 2013/0266070 A1 | 10/2013 | Sato | |
| 2013/0279586 A1 | 10/2013 | Sato | |
| 2013/0287093 A1 | 10/2013 | Hannuksela | |
| 2014/0044369 A1 | 2/2014 | Sekiguchi et al. | |
| 2014/0056350 A1* | 2/2014 | Wedi | H04N 19/50 375/240.12 |
| 2014/0140409 A1* | 5/2014 | Kim | H04N 19/52 375/240.16 |
| 2014/0192884 A1* | 7/2014 | Laroche | H04N 19/147 375/240.16 |
| 2014/0301463 A1* | 10/2014 | Rusanovskyy | H04N 19/52 375/240.16 |
| 2015/0063464 A1* | 3/2015 | Chen | H04N 19/70 375/240.25 |
| 2016/0029033 A1* | 1/2016 | Park | H04N 19/44 375/240.12 |
| 2016/0227244 A1 | 8/2016 | Rosewarne | |
| 2016/0309169 A1* | 10/2016 | Winken | H04N 19/11 |
| 2016/0330458 A1* | 11/2016 | Lee | H04N 19/513 |
| 2016/0345011 A1* | 11/2016 | Naing | H04N 19/91 |
| 2017/0214937 A1* | 7/2017 | Lin | H04N 19/577 |
| 2017/0353722 A1* | 12/2017 | Jung | H04N 19/70 |
| 2017/0359577 A1* | 12/2017 | Park | H04N 19/51 |
| 2018/0007379 A1* | 1/2018 | Park | H04N 19/52 |
| 2018/0063534 A1* | 3/2018 | Moccagatta | H04N 19/103 |
| 2018/0131943 A1 | 5/2018 | Park et al. | |
| 2018/0160113 A1 | 6/2018 | Jeong et al. | |
| 2018/0176596 A1* | 6/2018 | Jeong | H04N 19/82 |
| 2018/0176601 A1* | 6/2018 | Jeong | H04N 19/137 |
| 2018/0220149 A1* | 8/2018 | Son | H04N 19/182 |
| 2018/0249156 A1* | 8/2018 | Heo | H04N 19/105 |
| 2018/0359469 A1* | 12/2018 | Won | H04N 19/119 |
| 2019/0028731 A1* | 1/2019 | Chuang | H04N 19/176 |
| 2019/0068967 A1 | 2/2019 | Ikai | |
| 2019/0124332 A1* | 4/2019 | Lim | H04N 19/137 |
| 2019/0158870 A1* | 5/2019 | Xu | H04N 19/513 |
| 2023/0082043 A1* | 3/2023 | Hendry | H04N 19/577 375/240.15 |

FOREIGN PATENT DOCUMENTS

| | | |
|---|---|---|
| CN | 106331722 A | 1/2017 |
| JP | 2004165785 A | 6/2004 |

(56) References Cited

FOREIGN PATENT DOCUMENTS

| | | | |
|---|---|---|---|
| JP | 2007181226 A | 7/2007 | |
| JP | 4427553 B2 | 3/2010 | |
| JP | 2013012960 A | 1/2013 | |
| KR | 10-1390193 B1 | 5/2014 | |
| KR | 10-2014-0076652 A | 6/2014 | |
| KR | 10-2014-0146541 A | 12/2014 | |
| KR | 10-1676791 B1 | 11/2016 | |
| WO | 2011099468 A1 | 2/2011 | |
| WO | 2016141609 A1 | 9/2016 | |
| WO | 2016175550 A1 | 11/2016 | |
| WO | 2016/195453 A1 | 12/2016 | |

OTHER PUBLICATIONS

Korean Office Action from Korean Patent Application No. 10-2018-0005395 dated Sep. 28, 2022.
Indian Office Action issued on Jan. 6, 2022 in the corresponding Indian Patent Application No. 201917032183 (6 pages in English).
Final Office Action mailed in U.S. Appl. No. 17/492,779 dated Dec. 30, 2022.
Office Action mailed in U.S. Appl. No. 17/492,779 dated May 31, 2023.
Final Office Action mailed in U.S. Appl. No. 17/492,779 dated Nov. 8, 2023.
Office Action mailed in U.S. Appl. No. 16/478,259 dated Jul. 2, 2021.
Office Action mailed in U.S. Appl. No. 16/478,259 dated Jan. 29, 2021.
Office Action mailed in U.S. Appl. No. 16/478,259 dated Nov. 2, 2020.
Office Action mailed in U.S. Appl. No. 16/478,259 dated Jul. 20, 2020.
Huang et al., "Control-Point Representation and Differential Coding Affine-Motion Compensation", IEEE Transactions on Circuits and Systems for Video Technology, vol. 23, No. 10, Oct. 2013 (Year: 2013).
Office Action mailed in U.S. Appl. No. 17/492,779 dated Sep. 21, 2022.
Chinese Office Action in Chinese Application No. 202310179294.8 dated May 30, 2025.
Chinese Office Action in Chinese Application No. 202310193767.X dated Apr. 30, 2025.
Yan-Fei Shen et al., High Efficiency Video Coding, Journal, Nov. 2013, vol. 36, No. 11, Chinese Journals of Computers, Beijing, China.

* cited by examiner

Current image

FIG. 25

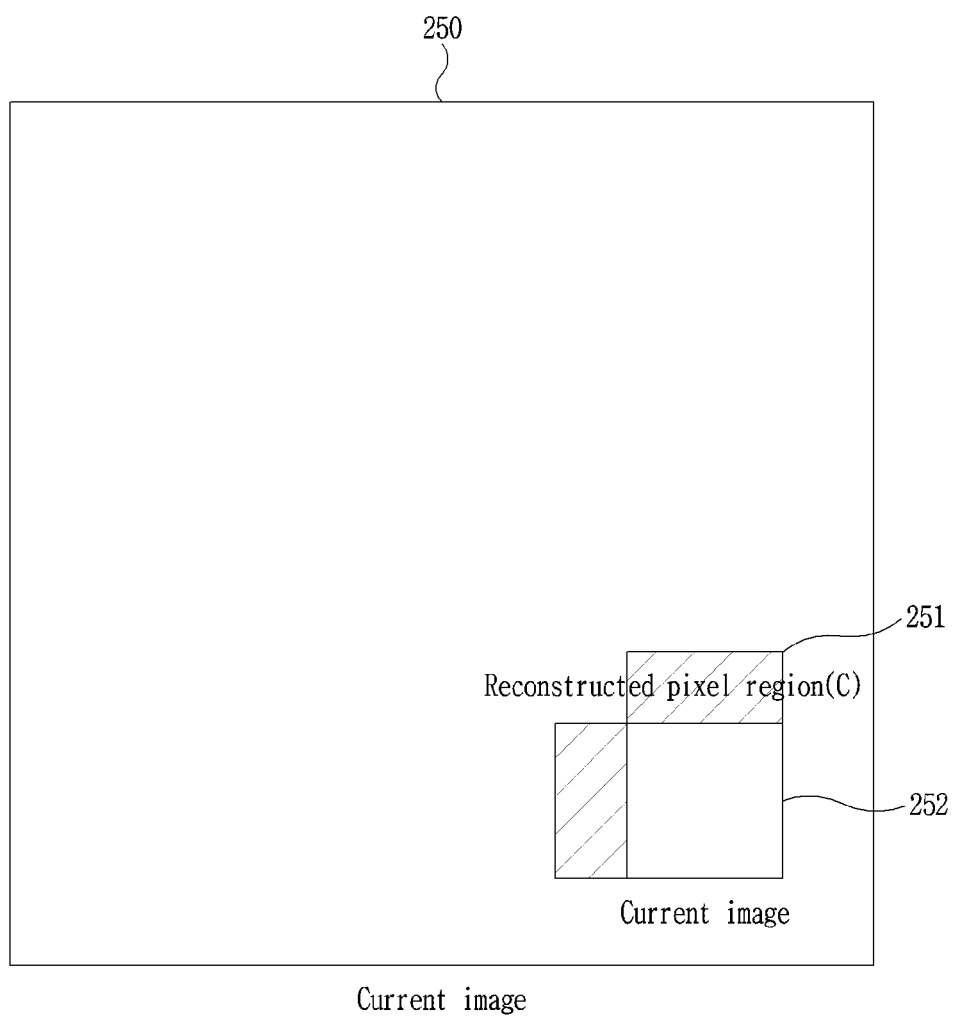

IMAGE ENCODING/DECODING METHOD AND DEVICE

This application is a divisional of application Ser. No. 17/492,779 filed Oct. 4, 2021, which is a continuation of application Ser. No. 16/478,259, filed on Jul. 16, 2019, which is a U.S. National Stage Application of International Application No. PCT/KR2018/000750, filed on Jan. 16, 2018, which claims the benefit under 35 USC 119(a) and 365(b) of Korean Patent Application No. 10-2017-0007346, filed on Jan. 16, 2017, Korean Patent Application No. 10-2017-0007347, filed on Jan. 16, 2017, and Korean Patent Application No. 10-2017-0007348, filed on Jan. 16, 2017 in the Korean Intellectual Property Office, the entire disclosures of which are incorporated herein by reference for all purposes.

TECHNICAL FIELD

The present invention relates to an image signal encoding/decoding method and device. More particularly, the present invention relates to an image encoding/decoding method using inter prediction and an image encoding/decoding device using inter prediction.

BACKGROUND ART

Recently, demand for multimedia data such as video has rapidly increased on the Internet. However, the rate at which a bandwidth of a channel has developed is insufficient to keep up with the amount of multimedia data that has rapidly increased. Considering this situation, the Video Coding Expert Group (VCEG) of ITU-T and the Moving Picture Expert Group (MPEG) of ISO/IEC, which are the International Organizations for Standardization, established the High Efficiency Video Coding (HEVC) version 1, a video compression standard, in February 2014.

HEVC uses a variety of technologies such as intra prediction, inter prediction, transform, quantization, entropy encoding, and in-loop filtering. In inter prediction of HEVC, new technologies such as block merging, advanced motion vector prediction (AMVP) have been applied such that efficient inter prediction is possible. However, when multiple motions are present in a block, the block is partitioned into small parts, so that rapid increase in overhead may occur and encoding efficiency may be lowered.

DISCLOSURE

Technical Problem

Accordingly, the present invention has been made keeping in mind the above problems, and the present invention is intended to enhance efficiency of inter prediction by providing improved inter prediction.

Also, the present invention is intended to provide a motion vector derivation method by an image decoding device, where an image encoding device does not need to transmit motion vector information to the image decoding device.

Also, the present invention is intended to provide a motion vector derivation method of a control point by an image decoding device, wherein in affine inter prediction, an image encoding device does not need to transmit a motion vector of the control point to the image decoding device.

Also, the present invention is intended to provide inter prediction capable of efficient encoding or decoding when multiple motions are present in one block.

Also, the present invention is intended to reduce blocking artifacts that may occur when one block is partitioned into multiple regions and encoding or decoding is performed using different types of inter prediction.

Also, the present invention is intended to enhance efficiency of inter prediction by partitioning a current block to be encoded or decoded, on the basis of a partitioning structure of reconstructed neighboring blocks.

Also, the present Invention is intended to enhance efficiency of inter prediction by partitioning, on the basis of a partitioning structure of reconstructed neighboring blocks, a pre-reconstructed neighboring image region which is used to encode or decode a current block.

Also, the present invention is intended to enhance efficiency of image encoding or decoding by performing encoding or decoding using a current block or a neighboring image partitioned as described above.

Technical Solution

In an image decoding method and device according to an embodiment of the present invention, a reconstructed pixel region within an image to which a current block to be decoded belongs is selected; on the basis of the reconstructed pixel region and a reference image of the current block, a motion vector of the reconstructed pixel region is derived; and the derived motion vector is selected as a motion vector of the current block.

The reconstructed pixel region may include at least one among a region adjacent to an upper side of the current block and a region adjacent to a left side of the current block.

The motion vector of the reconstructed pixel region may be derived on the basis of a position of a region corresponding to the reconstructed pixel region, wherein the region corresponding to the reconstructed pixel region is determined within the reference image.

In an image encoding method and device according to an embodiment of the present invention, a reconstructed pixel region within an image to which a current block to be encoded belongs is selected; on the basis of the reconstructed pixel region and a reference image of the current block, a motion vector of the reconstructed pixel region is derived; and the derived motion vector is selected as a motion vector of the current block.

Also, in the image encoding method and device according to the embodiment of the present invention, decoder-side motion vector derivation indication information may be generated and encoded.

The decoder-side motion vector derivation indication information may indicate whether or not the derived motion vector of the reconstructed pixel region is selected as the motion vector of the current block.

In an image decoding method and device according to another embodiment of the present invention, at least one reconstructed pixel region is selected within an image to which a current block to be decoded using affine inter prediction belongs; on the basis of the at least one reconstructed pixel region and a reference image of the current block, a motion vector of the at least one reconstructed pixel region is derived; and the derived motion vector of the at least one reconstructed pixel region is selected as a motion vector of at least one control point of the current block.

The at least one reconstructed pixel region may be a region adjacent to the at least one control point of the current block.

Further, the at least one control point may be positioned at an upper left side, an upper right side, or a lower left side of the current block.

Further, the motion vector of the control point positioned at a lower right side of the current block may be decoded on the basis of motion information included in a bitstream.

Further, in the image decoding method and device according to the embodiment of the present invention, decoder-side control point motion vector derivation indication information may be decoded.

In the image decoding method and device according to the embodiment of the present invention, the motion vector of the at least one reconstructed pixel region may be derived on the basis of the decoder-side control point motion vector derivation indication information.

In an image encoding method and device according to still another embodiment of the present invention, at least one reconstructed pixel region is selected within an image to which a current block to be encoded using affine inter prediction belongs; on the basis of the at least one reconstructed pixel region and a reference image of the current block, a motion vector of the at least one reconstructed pixel region is derived; and the derived motion vector of the at least one reconstructed pixel region is selected as a motion vector of at least one control point of the current block.

In an image decoding method and device according to yet still another embodiment of the present invention, a current block to be decoded is partitioned into multiple regions including a first region and a second region; and a prediction block of the first region and a prediction block of the second region are obtained, wherein the prediction block of the first region and the prediction block of the second region are obtained by different inter prediction methods.

The first region may be a region adjacent to a reconstructed image region within an image to which the current block belongs, and the second region may be a region that is not in contact with the reconstructed image region within the image to which the current block belongs.

In the image decoding method and device according to the embodiment of the present invention, on the basis of the reconstructed image region within the image to which the current block belongs, and of a reference image of the current block, a motion vector of the first region may be estimated.

In the image decoding method and device according the embodiment of the present invention, a region positioned at a boundary as a region within the prediction block of the first region or a region positioned at a boundary as a region within the prediction block of the second region may be partitioned into multiple sub-blocks; motion information of a neighboring sub-block of a first sub-block, which is one of the multiple sub-blocks, may be used to generate a prediction block of the first sub-block; and the first sub-block and the prediction block of the first sub-block may be subjected to a weighted sum, so that a prediction block of the first sub-block to which the weighted sum is applied may be obtained.

In an image encoding method and device according to yet still another embodiment of the present invention, a current block to be encoded is partitioned into multiple regions including a first region and a second region; a prediction block of the first region and a prediction block of the second region are obtained, wherein the prediction block of the first region and the prediction block of the second region are obtained by different inter prediction methods.

The first region may be a region adjacent to a pre-encoded reconstructed image region within an image to which the current block belongs, and the second region may be a region that is not in contact with the pre-encoded reconstructed image region within the image to which the current block belongs.

In the image encoding method and device according to the embodiment of the present invention, on the basis of the pre-encoded reconstructed image region within the image to which the current block belongs, and of a reference image of the current block, a motion vector of the first region may be estimated.

In the image encoding method and device according to the embodiment of the present invention, a region positioned at a boundary as a region within the prediction block of the first region or a region positioned at a boundary as a region within the prediction block of the second region may be partitioned into multiple sub-blocks; motion information of a neighboring sub-block of a first sub-block, which is one of the multiple sub-blocks, may be used to generate a prediction block of the first sub-block; and the first sub-block and the prediction block of the first sub-block may be subjected to a weighted sum, so that a prediction block of the first sub-block to which the weighted sum is applied may be obtained.

In an image decoding method and device according to yet still another embodiment of the present invention, on the basis of blocks around a current block to be decoded, the current block is partitioned into multiple sub-blocks, and the multiple sub-blocks of the current block are decoded.

In the image decoding method and device according to the embodiment of the present invention, on the basis of a partitioning structure of neighboring blocks of the current block, the current block may be partitioned into the multiple sub-blocks.

In the image decoding method and device according to the embodiment of the present invention, on the basis of at least one among the number of the neighboring blocks, a size of the neighboring blocks, a shape of the neighboring blocks, and a boundary between the neighboring blocks, the current block may be partitioned into the multiple sub-blocks.

In the image decoding method and device according to the embodiment of the present invention, as a region neighbors the current block, a pro-reconstructed pixel region may be partitioned on a per-sub-block basis, and at least one of the multiple sub-blocks of the current block may be decoded using at least one sub-block included in the reconstructed pixel region.

In the image decoding method and device according to the embodiment of the present invention, on the basis of a partitioning structure of neighboring blocks of the current block, the reconstructed pixel region may be partitioned on a per-sub-block basis.

In the image decoding method and device according to the embodiment of the present invention, on the basis of at least one among the number of the neighboring blocks, a size of the neighboring blocks, a shape of the neighboring blocks, and a boundary between the neighboring blocks, the reconstructed pixel region may be partitioned on a per-sub-block basis.

In an image encoding method and device according to yet still another embodiment of the present invention, on the basis of blocks around a current block to be encoded, the current block may be partitioned into multiple sub-blocks, and the multiple sub-blocks of the current block may be encoded.

In the image encoding method and device according to the embodiment of the present invention, on the basis of a partitioning structure of neighboring blocks of the current block, the current block may be partitioned into the multiple sub-blocks.

In the image encoding method and device according to the embodiment of the present invention, on the basis of the at least one among the number of the neighboring blocks, a size of the neighboring blocks, a shape of the neighboring blocks, and a boundary between the neighboring blocks, the current block may be partitioned into the multiple sub-blocks.

In the image encoding method and device according to the embodiment of the present invention, as a region neighbors the current block, a pre-reconstructed pixel region may be partitioned on a per-sub-block basis, and at least one of the multiple sub-blocks of the current block may be encoded using at least one sub-block included in the reconstructed pixel region.

In the image encoding method and device according to the embodiment of the present invention, on the basis of a partitioning structure of neighboring blocks of the current block, the reconstructed pixel region may be partitioned on a per-sub-block basis.

In the image encoding method and device according to the embodiment of the present invention, on the basis of at least one among the number of the neighboring blocks, a size of the neighboring blocks, a shape of the neighboring blocks, and a boundary between the neighboring blocks, the reconstructed pixel region may be partitioned on a per-sub-block basis.

Advantageous Effects

According to the present invention, the amount of encoding information generated as a result of encoding a video may be reduced and thus encoding efficiency may be enhanced. Also, by adaptively decoding an encoded image, reconstruction efficiency of an image may be enhanced and the quality of the reproduced image may be improved.

Also, in inter prediction according to the present invention, the image encoding device does not need to transmit motion vector information to the image decoding device, so that the amount of encoding information may be reduced and thus encoding efficiency may be enhanced.

Also, according to the present invention, blocking artifacts may be reduced that may occur when one block is partitioned into multiple regions and encoding or decoding is performed using different types of inter prediction.

DESCRIPTION OF DRAWINGS

FIG. 18 is a diagram illustrating a current block partitioned into multiple regions for inter prediction according to a third exemplary embodiment of the present invention.

FIG. 25 is a diagram illustrating a method of reducing blocking artifacts according to a fourth exemplary embodiment of the present invention.

FIGS. 31a and 31b are diagrams illustrating inter prediction using a reconstructed pixel region according to a fifth exemplary embodiment of the present invention.

FIG. 38 is a flowchart illustrating a method of partitioning a reconstructed region used to encode or decode a current block into multiple sub-blocks according to an embodiment of the present invention.

MODE FOR INVENTION

Figure 1:
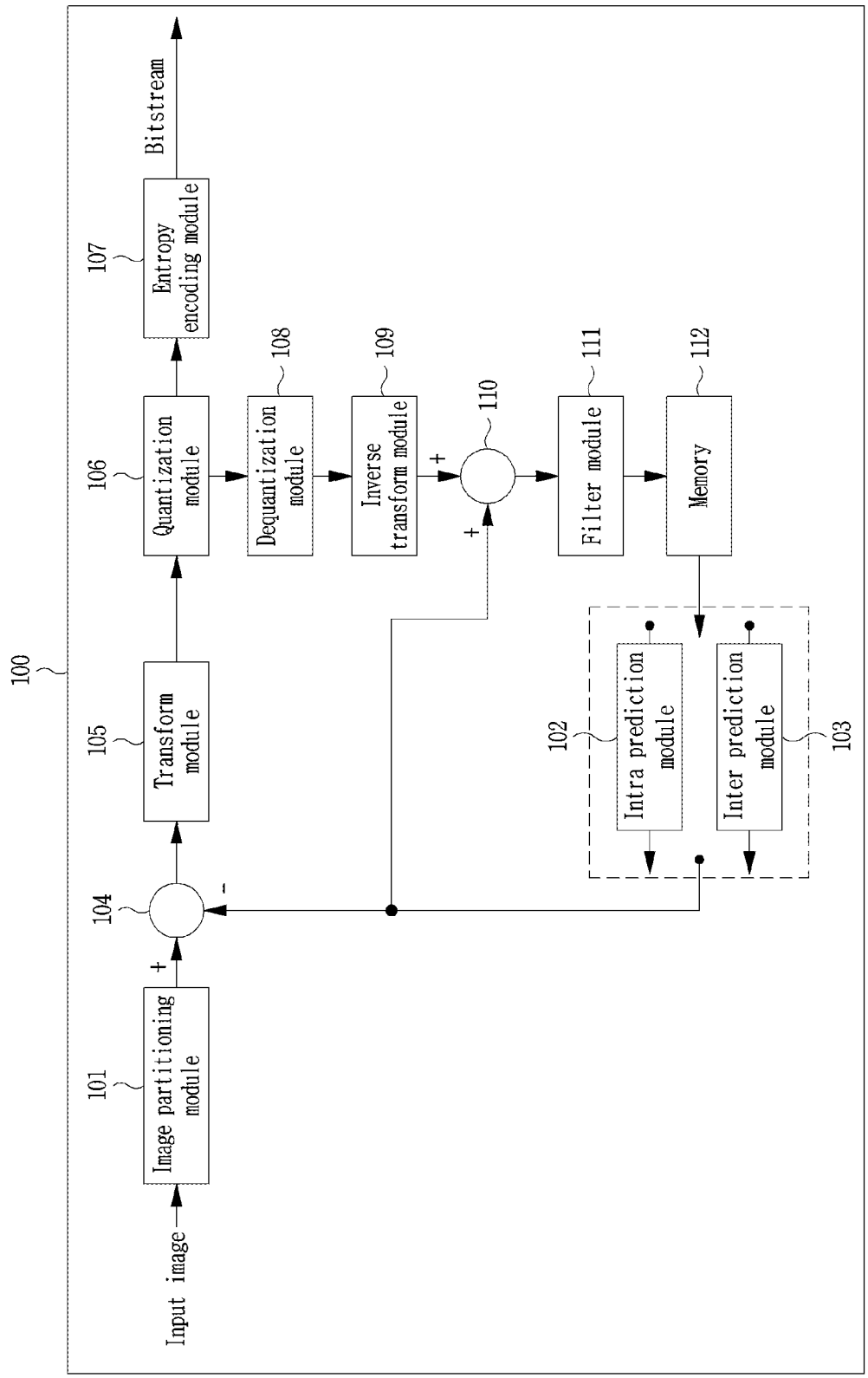
FIG. 1 is a block diagram illustrating an image encoding device according to an embodiment of the present invention.

The present invention may be modified in various ways and implemented by various embodiments, so that specific embodiments are shown in the drawings and will be described in detail. However, the present invention is not limited thereto, and the exemplary embodiments can be construed as including all modifications, equivalents, or substitutes in a technical concept and a technical scope of the present invention. The similar reference numerals refer to the similar elements described in the drawings.

Terms "first", "second", etc. can be used to describe various elements, but the elements are not to be construed as being limited to the terms. The terms are only used to differentiate one element from other elements. For example, the "first" element may be named the "second" element without departing from the scope of the present invention, and similarly the "second" element may also be named the "first" element. The term "and/or" includes a combination of a plurality of items or any one of a plurality of terms.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it will be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, embodiments of the present invention will be described in detail with reference to the accompanying drawings. Hereinafter, the same elements in the drawings are denoted by the same reference numerals, and a repeated description of the same elements will be omitted.

FIG. 1 is a block diagram illustrating an image encoding device according to an embodiment of the present invention.

Referring to FIG. 1, an image encoding device 100 may include an image partitioning module 101, an intra prediction module 102, an inter prediction module 103, a subtractor 104, a transform module 105, a quantization module 106, an entropy encoding module 107, a dequantization module 108, an inverse transform module 109, an adder 110, a filter module 111, and a memory 112.

The constituents shown in FIG. 1 are independently shown so as to represent different distinctive functions in the image encoding device, which does not mean that each constituent is constituted as separated hardware or a single software constituent unit. In other words, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constituents for implementing the essence of the present invention except the constituents used in improving performance. The structure including only the indispensable constituents except the selective constituents used in improving only performance is also included in the scope of the present invention.

The image partitioning module 101 may partition an input image into one or more blocks. Here, the input image may have various shapes and sizes, such as a picture, a slice, a tile, a segment, and the like. A block may mean a coding unit (CU), a prediction unit (PU), or a transform unit (TU). The partitioning may be performed on the basis of at least one among a quadtree and a binary tree. Quadtree partitioning is a method of partitioning a parent block into four child blocks of which the width and the height are half of those of the parent block. Binary tree partitioning is a method of partitioning a parent block into two child blocks of which either the width or the height is half of that of the parent block. Through the above-described partitioning based on binary tree, a block may be in a square shape as well as a non-square shape.

Hereinafter, in the embodiment of the present invention, the coding unit may mean a unit of performing encoding or a unit of performing decoding.

The prediction modules 102 and 103 may include the intra prediction module 102 performing intra prediction and the inter prediction module 103 performing inter prediction. Whether to perform inter prediction or intra prediction on the prediction unit may be determined, and detailed information (for example, an intra prediction mode, a motion vector, a reference picture, and the like) depending on each prediction method may be determined. Here, a processing unit on which prediction is performed may be different from a processing unit in which the prediction method and the detailed content are determined. For example, the prediction method, the prediction mode, and the like may be determined on a per-prediction unit basis, and prediction may be performed on a per-transform unit basis.

A residual value (residual block) between the generated prediction block and an original block may be input to the transform module 105. Further, prediction mode information used for prediction, motion vector information, and the like may be encoded with the residual value by the entropy encoding module 107 and then may be transmitted to a decoder. When a particular encoding mode is used, the original block is intactly encoded and transmitted to the decoding module without generating a prediction block by the prediction module 102, 103.

The intra prediction module 102 may generate a prediction block on the basis of information on a reference pixel around the current block, which is information on a pixel within a current picture. When the prediction mode of the neighboring block of the current block on which intra prediction is to be performed is inter prediction, a reference pixel included in the neighboring block to which inter prediction has been applied is replaced by a reference pixel within another neighboring block to which intra prediction has been applied. That is, when the reference pixel is unavailable, at least one reference pixel among available reference pixels is used instead of information on the unavailable reference pixel.

Prediction modes in intra prediction may include a directional prediction mode using the information on the reference pixel depending on a prediction direction and a non-directional prediction mode not using directivity information in performing prediction. A mode for predicting luma information may be different from a mode for predicting chroma information, and in order to predict the chroma information, intra prediction mode information used to predict the luma information or predicted luma signal information may be utilized.

The intra prediction module 102 may include an adaptive intra smoothing (AIS) filter, a reference pixel interpolation module, and a DC filter. The AIS filter is a filter performing filtering on a reference pixel of the current block, and may adaptively determine whether to apply the filter depending on a prediction mode of a current prediction unit. When the prediction mode of the current block is a mode in which AIS filtering is not performed, the AIS filter is not applied.

When the intra prediction mode of the prediction unit is a prediction mode in which intra prediction is performed on the basis of a pixel value obtained by interpolating the reference pixel, the reference pixel interpolation module of the intra prediction module 102 interpolates the reference pixel to generate a reference pixel at a position on a per-fraction basis. When the prediction mode of the current prediction unit is a prediction mode in which the prediction block is generated without interpolating the reference pixel, the reference pixel is not interpolated. The DC filter generates the prediction block through filtering when the prediction mode of the current block is a DC mode.

The inter prediction module 103 generates the prediction block using a pre-reconstructed reference image stored in the memory 112 and motion information. The motion information may contain, for example, a motion vector, a reference picture index, a list 1 prediction flag, a list 0 prediction flag, and the like.

In the image encoding device, there are two typical methods of generating motion information.

Figure 2:
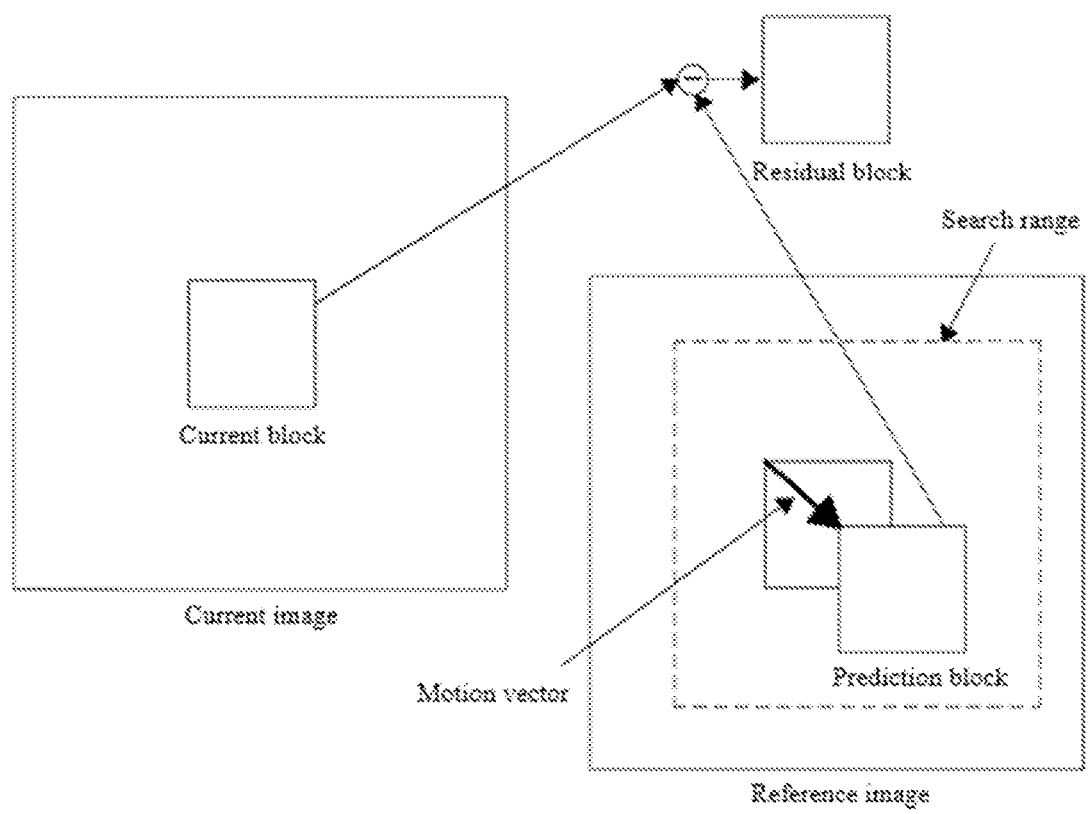
FIG. 2 is a diagram illustrating a method of generating motion information by using motion estimation according to the conventional technology.

The first method is a method in which motion information (a motion vector, a reference image index, an inter prediction direction, and the like) is generated using a motion estimation process. FIG. 2 is a diagram illustrating a method of generating motion information by using motion estimation according to the conventional technology. Motion estimation is a method of generating motion information such as, a motion vector, a reference image index, and an inter prediction direction of a current image region to be encoded using the decoded reference image after being encoded. It is possible that motion estimation is performed in the entire reference image or that in order to reduce the complexity, a search range is set and motion estimation is performed only within the search range.

The second method of generating the motion information is a method in which motion information of neighboring blocks of the current image block to be encoded is used.

Figure 3:
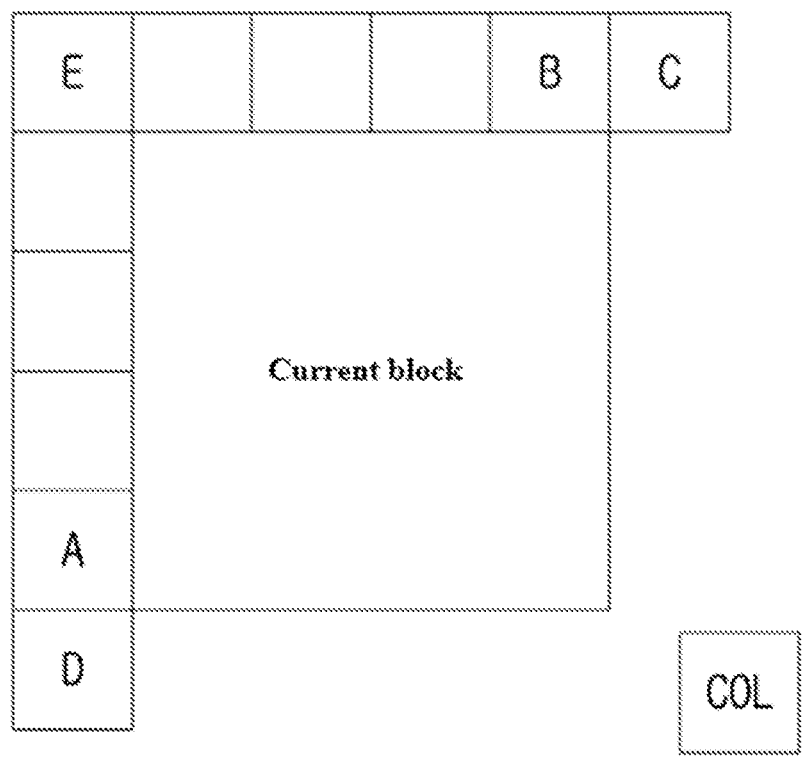
FIG. 3 is a diagram illustrating an example of neighboring blocks that may be used to generate motion information of a current block.

FIG. 3 is a diagram illustrating an example of neighboring blocks that may be used to generate motion information of a current block. FIG. 3 shows an example of spatial candidate blocks A to E and a temporal candidate block COL as neighboring blocks that may be used to generate the motion information of the current block. The spatial candidate blocks A to E are present in the same image as the current block, but the temporal candidate block COL is present in an image that is different from the image to which the current block belongs.

One piece of motion information of the spatial candidate blocks A to E and the temporal candidate block COL which neighbor the current block, may be selected as the motion information of the present block. Here, an index may be defined that indicates which block has the motion information used as the motion information of the current block. This index information also belongs to the motion information. In the image encoding device, using the above methods, the motion information may be generated and the prediction block may be generated through motion compensation.

A residual block may be generated that includes residual value information which is a difference value between the prediction unit generated by the prediction module 102, 103 and the original block of the prediction unit. The generated residual block may be input to the transform module 105 for transform.

The inter prediction module 103 may derive the prediction block on the basis of information on at least one picture among the previous picture and the subsequent picture of the current picture. Further, the prediction block of the current block may be derived on the basis of information on a partial region with encoding completed within the current picture. The inter prediction module 103 according to an embodiment of the present Invention may include a reference picture interpolation module, a motion prediction module, and a motion compensation module.

The reference picture interpolation module may receive reference picture information from the memory and may generate information on a pixel equal to or smaller than an integer pixel in the reference picture. In the case of a luma pixel, a DCT-based 8-tap interpolation filter having different filter coefficients may be used to generate information on a pixel equal to or smaller than an integer pixel on a per-1/4 pixel basis. In the case of a chroma signal, a DCT-based 4-tap interpolation filter having different filter coefficients may be used to generate information on a pixel equal to or smaller than an integer pixel on a per-1/8 pixel basis.

The motion prediction module may perform motion prediction on the basis of the reference picture interpolated by the reference picture interpolation module. As methods of calculating the motion vector, various methods, such as a full search-based block matching algorithm (FBMA), a three step search (TSS) algorithm, a new three-step search (NTS) algorithm, and the like, may be used. The motion vector may have a motion vector value on a per-1/2 or 1/4 pixel basis on the basis of the interpolated pixel. The motion prediction module may predict the prediction block of the current block by using different motion prediction methods. As motion prediction methods, various methods, such as a skip method, a merge method, an advanced motion vector prediction (AMVP) method, and the like, may be used.

The subtractor 104 performs subtraction on the block to be currently encoded and on the prediction block generated by the intra prediction module 102 or the inter prediction module 103 so as to generate the residual block of the current block.

The transform module 105 may transform the residual block containing residual data, using a transform method, such as DCT, DST, Karhunen-Loeve transform (KLT), and the like. Here, the transform method may be determined on the basis of the intra prediction mode of the prediction unit that is used to generate the residual block. For example, depending on the intra prediction mode, DCT may be used in the horizontal direction, and DST may be used in the vertical direction.

The quantization module 106 may quantize values transformed into a frequency domain by the transform module 105. Quantization coefficients may vary according to a block or importance of an image. The value calculated by the quantization module 106 may be provided to the dequantization module 108 and the entropy encoding module 107.

The transform module 105 and/or the quantization module 106 may be selectively included in the image encoding device 100. That is, the image encoding device 100 may perform at least one of transform and quantization on residual data of the residual block, or may encode the residual block by skipping both transform and quantization. Even though the image encoding device 100 does not perform either transform or quantization or does not perform both transform and quantization, the block that is input to the entropy encoding module 107 is generally referred to as a transform block. The entropy encoding to module 107 entropy encodes the input data. Entropy encoding may use various encoding methods, for example, exponential Golomb coding, context-adaptive variable length coding (CAVLC), and context-adaptive binary arithmetic coding (CABAC).

The entropy encoding module 107 may encode a variety of information, such as residual value coefficient information of a coding unit, block type Information, prediction mode information, partitioning unit information, prediction unit information, transmission unit information, motion vector information, reference frame information, block interpolation information, filtering information, and the like, from the prediction module 102, 103. In the entropy encoding module 107, the coefficient of the transform block may be encoded on a per-partial block basis within the transform block on the basis of various types of flags indicating a non-zero coefficient, a coefficient of which the absolute value is higher than one or two, the sign of the coefficient, and the like may be encoded. A coefficient that is not encoded only with the flags may be encoded through the absolute value of the difference between the coefficient encoded through the flag and the actual coefficient of the transform block. The dequantization module 108 dequantizes the values quantized by the quantization module 106, and the inverse transform module 109 inversely transforms the values transformed by the transform module 105. The residual value generated by the dequantization module 108 and the inverse transform module 109 may be combined with the prediction unit predicted through a motion estimation module included in the prediction module 102, 103, the motion compensation module, and the intra prediction module 102 such that a reconstructed block is generated. The adder 110 adds the prediction block generated by the prediction module 102, 103 and the residual block generated by the inverse transform module 109 so as to generate a reconstructed block.

The filter module 111 may include at least one of a deblocking filter, an offset correction module, and an adaptive loop filter (ALF).

The deblocking filter may remove block distortion that occurs due to boundaries between the blocks in the reconstructed picture. In order to determine whether to perform deblocking, whether to apply the deblocking filter to the current block may be determined on the basis of the pixels included in several rows and columns in the block. When the deblocking fitter is applied to the block, a strong filter or a weak filter is applied depending on required deblocking filtering strength. Further, in applying the deblocking filter, when performing horizontal direction filtering and vertical direction filtering, horizontal direction filtering and vertical direction filtering are configured to be processed in parallel.

The offset correction module may correct an offset from the original image on a per-pixel basis with respect to the image subjected to deblocking. In order to perform offset correction on a particular picture, it is possible to use a method of separating pixels of the image into the predetermined number of regions, determining a region to be subjected to offset, and applying the offset to the determined region, or a method of applying an offset considering edge information of each pixel.

Adaptive loop filtering (ALF) may be performed on the basis of the value obtained by comparing the filtered reconstructed image and the original image. The pixels included in the image may be divided into predetermined groups, a filter to be applied to each of the groups may be determined, and filtering may be individually performed on each group. Information on whether to apply ALF of a luma signal may be transmitted for each coding unit (CU), and the shape and the filter coefficient of the ALF filter to be applied may vary depending on each block. Also, regardless of the characteristic of the application target block, the ALF filter in the same form (fixed form) may be applied.

The memory 112 may store the reconstructed block or picture calculated through the filter module 111, and the stored reconstructed block or picture may be provided to the prediction module 102, 103 when performing inter prediction.

Figure 4:
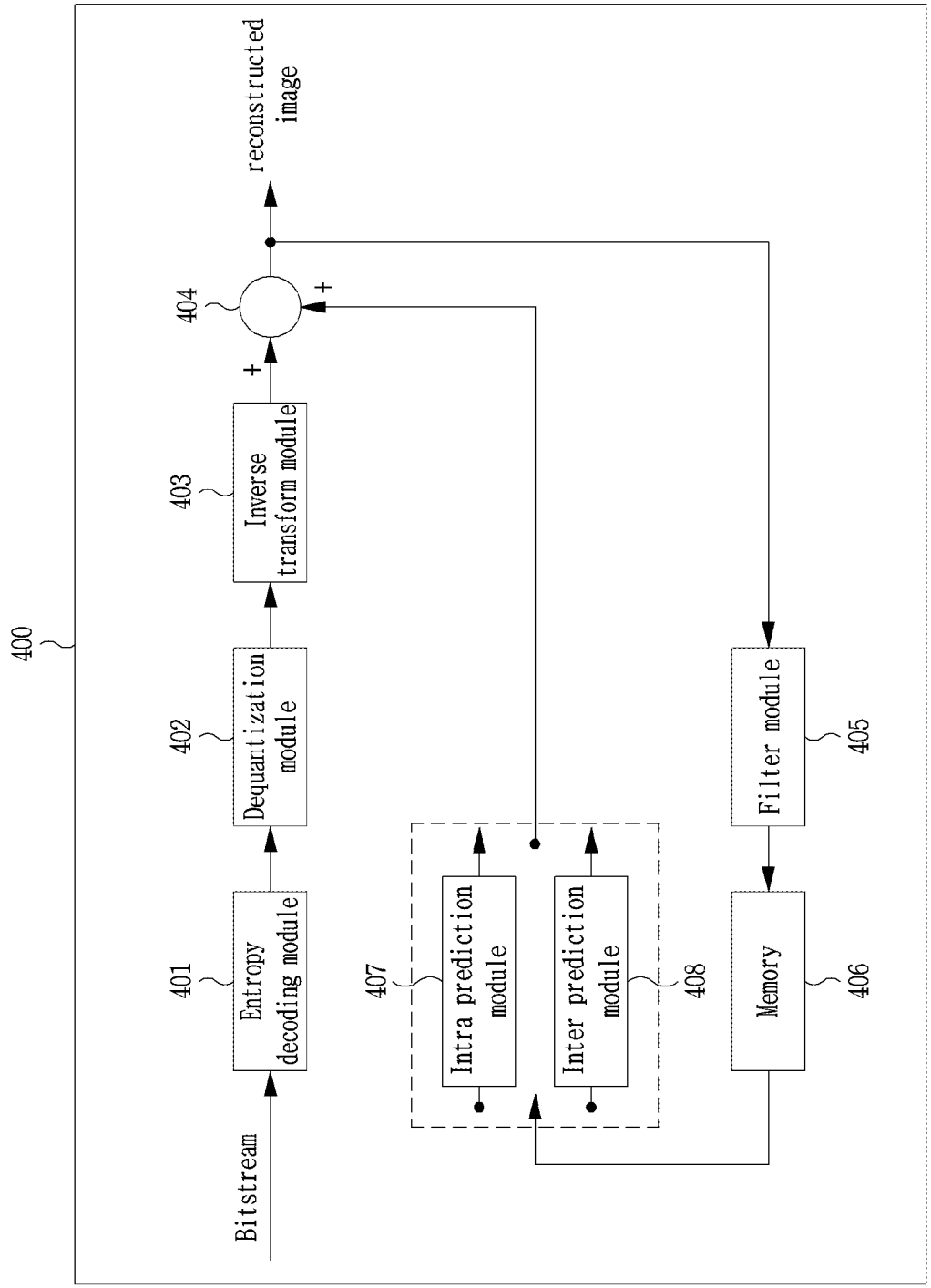
FIG. 4 is a block diagram illustrating an image decoding device according to an embodiment of the present invention.

Next, an image decoding device according to an embodiment of the present invention will be described with reference to the accompanying drawings. FIG. 4 is a block diagram illustrating an image decoding device 400 according to an embodiment of the present invention.

Referring to FIG. 4, the image decoding device 400 may include an entropy decoding module 401, a dequantization module 402, an inverse transform module 403, an adder 404, a filter module 405, a memory 406, and prediction modules 407 and 408.

When an image bitstream generated by the image encoding device 100 is input to the image decoding device 400, the input bitstream is decoded according to a reverse process of the process performed in the image encoding device 100.

The entropy decoding module 401 may perform entropy decoding according to the reverse procedure of the entropy encoding performed by the entropy encoding module 107 of the image encoding device 100. For example, corresponding to the methods performed by the image encoder, various methods, such as exponential Golomb coding, context-adaptive variable length coding (CAVLC), and context-adaptive binary arithmetic coding (CABAC), may be applied. In the entropy decoding module 401, the coefficient of the transform block may be encoded on a per-partial block basis within the transform block on the basis of various types of flags indicating a non-zero coefficient, a coefficient of which the absolute value is higher than one or two, the sign of the coefficient, and the like. A coefficient that is not represented only by the flags may be decoded through the sum of a coefficient represented through the flag and a signaled coefficient.

The entropy decoding module 401 may decode information related to intra prediction and inter prediction performed in the encoder. The dequantization module 402 performs dequantization on the quantized transform block to generate the transform block. This operates substantially in the same manner as the dequantization module 108 in FIG. 1.

The inverse transform module 403 performs inverse transform on the transform block to generate the residual block. Here, the transform method may be determined on the basis of the prediction method (inter or intra prediction), the size and/or the shape of the block, information on the intra prediction mode, and the like. This operates substantially in the same manner as the inverse transform module 109 in FIG. 1.

The adder 404 adds the prediction block generated by the intra prediction module 407 or the inter prediction module 408 and the residual block generated by the inverse transform module 403 so as to generate a reconstructed block. This operates substantially in the same manner as the adder 110 in FIG. 1.

The filter module 405 reduces various types of noises occurring in the reconstructed blocks.

The filter module 405 may include a deblocking filter, an offset correction module, and an ALF.

From the image encoding device 100, it is possible to receive information on whether or not the deblocking litter is applied to the block or picture and information on whether the strong filter is applied or the weak filter is applied when the deblocking filter is applied. The deblocking filter of the image decoding device 400 may receive information related to the deblocking filter from the image encoding device 100, and the image decoding device 400 may perform deblocking filtering on the block.

The offset correction module may perform offset correction on the reconstructed image on the basis of the type of offset correction, offset value information, and the like applied to the image in performing encoding.

The ALF may be applied to the coding unit on the basis of information on whether to apply the ALF, ALF coefficient information, and the like received from the image encoding device 100. The ALF information may be provided by being included in a particular parameter set. The filter module 405 operates substantially in the same manner as the filter module 111 in FIG. 1.

The memory 406 stores the reconstructed block generated by the adder 404. This operates substantially in the same manner as the memory 112 in FIG. 1.

The prediction module 407, 408 may generate a prediction block on the basis of information related to prediction block generated provided from the entropy decoding module 401 and of information on the previously decoded block or picture provided from the memory 406.

The prediction modules 407 and 408 may include the intra prediction module 407 and the inter prediction module 408. Although not shown, the prediction module 407, 408 may further include a prediction unit determination module. The prediction unit determination module may receive a variety of information input from the entropy decoding module 401, such as prediction unit information, prediction mode information of an intra prediction method, information related to motion prediction of an inter prediction method, and the like, may separate a prediction unit in a current coding unit, and may determine whether inter prediction is performed on the prediction unit or intra prediction is performed on the prediction unit. By using information required in inter prediction of the current prediction unit provided from the image encoding device 100, the inter prediction module 408 may perform inter prediction on the current prediction unit on the basis of information included at least one picture among the previous picture and the subsequent picture of the current picture including the current prediction unit. Alternatively, inter prediction may be performed on the basis of information on some pre-reconstructed regions within the current picture including the current prediction unit.

In order to perform inter prediction, on the basis of the coding unit, it may be determined which mode among a skip mode, a merge mode, and an AMVP Mode is used for the motion prediction method of the prediction unit included in the coding unit.

The intra prediction module 407 generates the prediction block using the pre-reconstructed pixels positioned near the block to be currently encoded.

The intra prediction module 407 may include an adaptive intra smoothing (AIS) filter, a reference pixel interpolation module, and a DC filter. The AIS filter is a filter performing filtering on the reference pixel of the current block, and may adaptively determine whether to apply the filter depending on the prediction mode of the current prediction unit. The prediction mode of the prediction unit provided from the image encoding device 100 and the AIS filter information may be used to perform AIS filtering on the reference pixel of the current block. When the prediction mode of the current block is a mode in which AIS filtering is not performed, the AIS filter is not applied.

When the prediction mode of the prediction unit is a prediction mode in which intra prediction is performed on the basis of a pixel value obtained by interpolating the reference pixel, the reference pixel interpolation module of the intra prediction module 407 interpolates the reference pixel to generate a reference pixel at a position on a per-fraction basis. The generated reference pixel on a per-fraction basis may be used as a prediction pixel of a pixel within the current block. When the prediction mode of the current prediction unit is a prediction mode in which a prediction block is generated without interpolating the reference pixel, the reference pixel is not interpolated. The DC filter may generate a prediction block through filtering when the prediction mode of the current block is a DC mode.

The intra prediction module 407 operates substantially in the same manner as the intra prediction module 102 in FIG. 1.

The inter prediction module 408 generates an inter prediction block using a reference picture stored in the memory 408 and motion information. The inter prediction module 408 operates substantially in the same manner as the inter prediction module 103 in FIG. 1.

Hereinafter, various embodiments of the present invention will be described in detail with reference to the drawings.

First Exemplary Embodiment

Figure 5A:
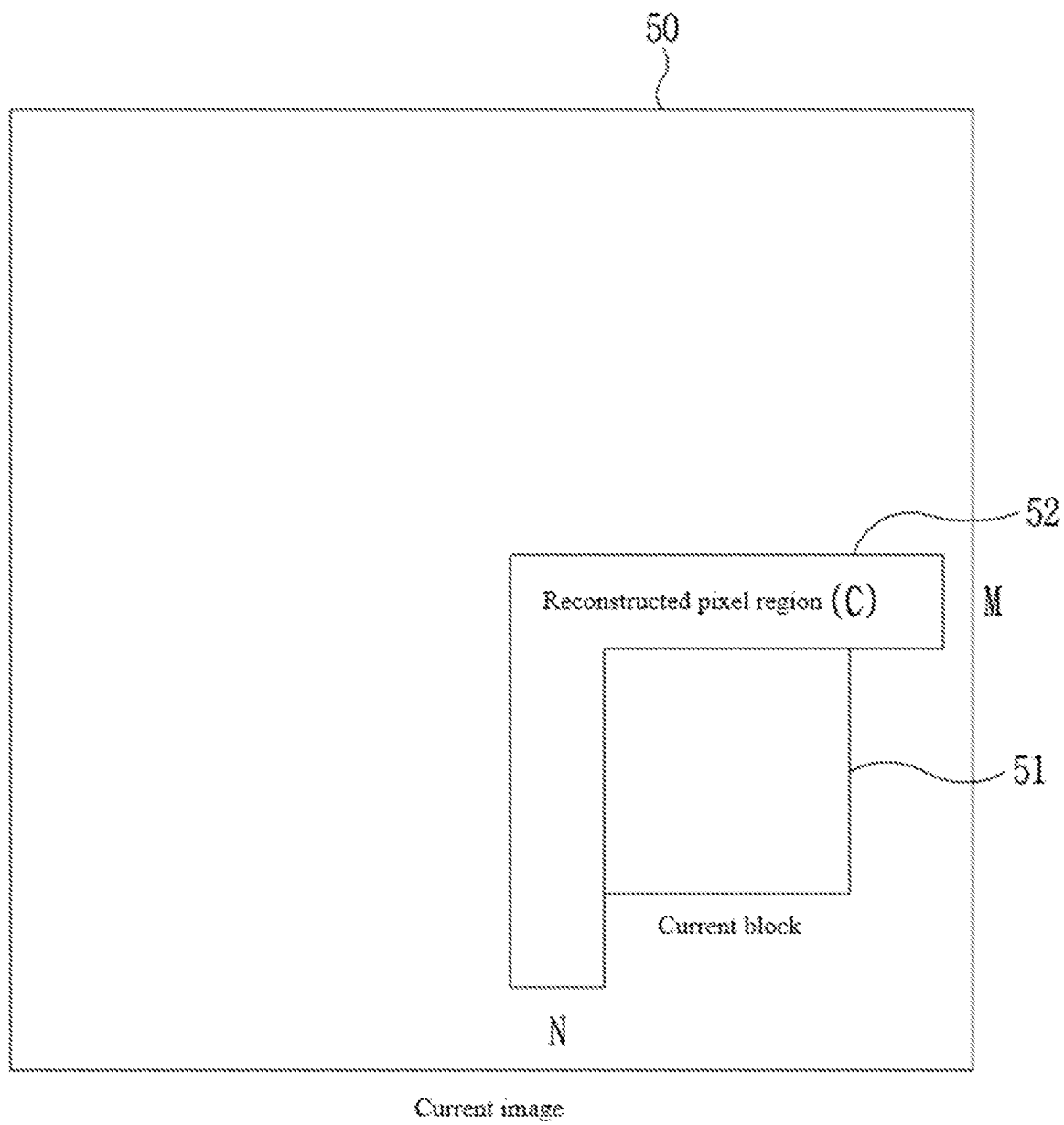
FIGS. 5a and 5b are diagrams illustrating inter prediction using a reconstructed pixel region according to a first exemplary embodiment of the present invention.
Figure 5B:
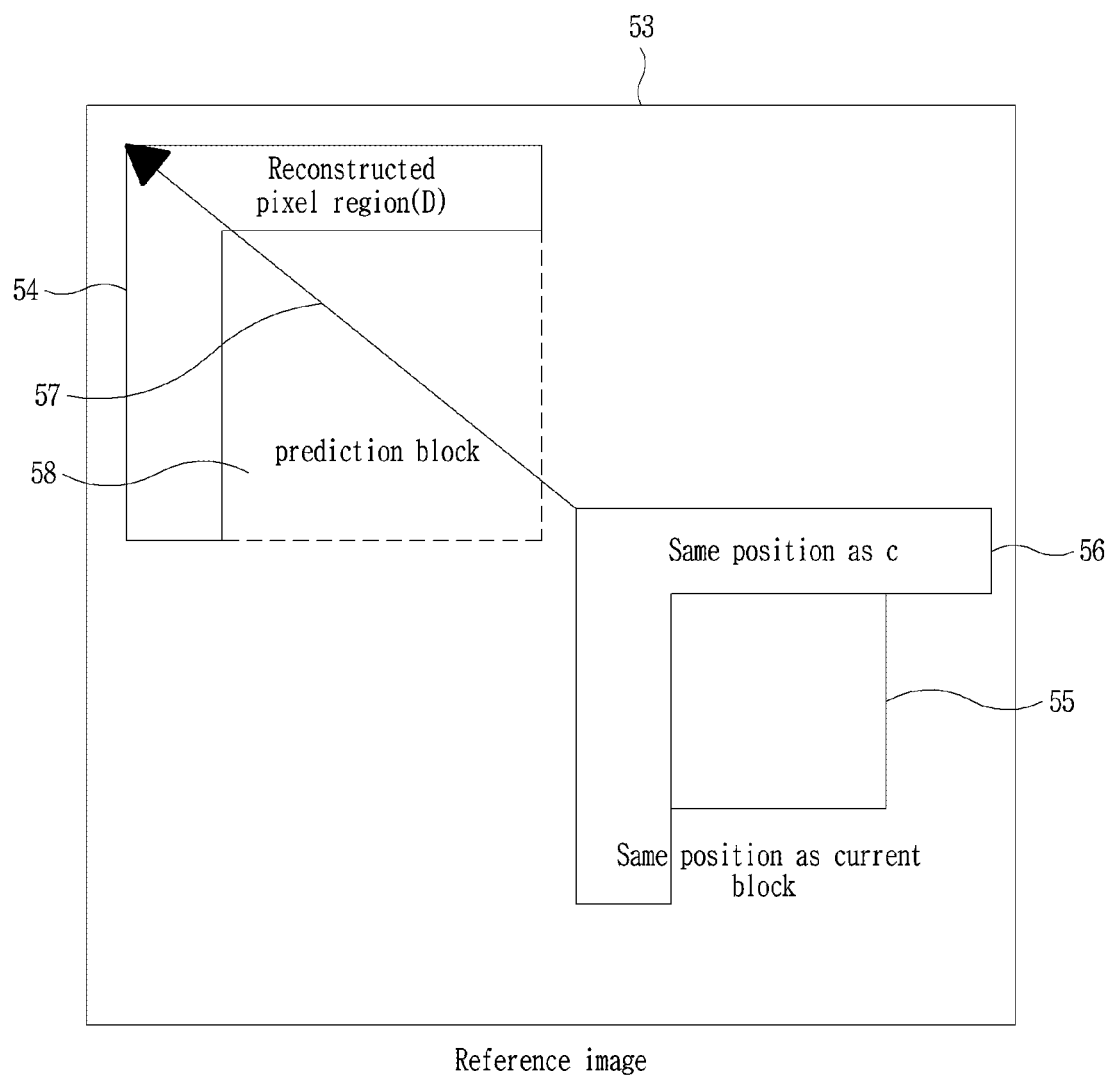

FIGS. 5a and 5b are diagrams illustrating inter prediction using a reconstructed pixel region according to a first exemplary embodiment of the present invention. In the inter prediction using the reconstructed pixel region according to the embodiment, particularly, the motion vector of the current block may be derived using the reconstructed pixel region.

FIG. 5a shows a current block 51 to be encoded or decoded and a pre-reconstructed pixel region C 52 as a region adjacent to the current block 51. The current block 51 and the reconstructed pixel region C 52 are included in the current image 50. The current image 50 may be a picture, a slice, a tile, a coding tree block, a coding block, or other image regions. The reconstructed pixel region C 52 may correspond to a reconstructed pixel region after being encoded before encoding of the current block 51 in terms of encoding, and may be a pre-reconstructed region before decoding of the current block 51 in terms of decoding.

Before encoding or decoding of the current block, the reconstructed pixel region C 52 neighbors the current block 51, and thus the image encoding device 100 and the image decoding device 400 may use the same reconstructed pixel region C 52. Therefore, without encoding the motion information of the current block 51 by the image encoding device 100, the reconstructed pixel region C 52 is used such that the image encoding device 100 and the image decoding device 400 may generate the motion information of the current block 51 and the prediction block in the same manner.

FIG. 5b shows an example of motion estimation and motion compensation using a reconstructed pixel region. A reference image 53 shown in FIG. 5b is searched for a region matched with the reconstructed pixel region C 52 shown in FIG. 5a. When a reconstructed pixel region D 54 that is most similar to the reconstructed pixel region C 52 is determined, a displacement between a region 56, which is at the same position as the reconstructed pixel region C 52, and the reconstructed pixel region D 54 is determined to be a motion vector 57 of the reconstructed pixel region C 52. The motion vector 57 determined as described above is selected as the motion vector of the current block 51, and a prediction block 58 of the current block 51 may be derived using the motion vector 57.

Figure 6:
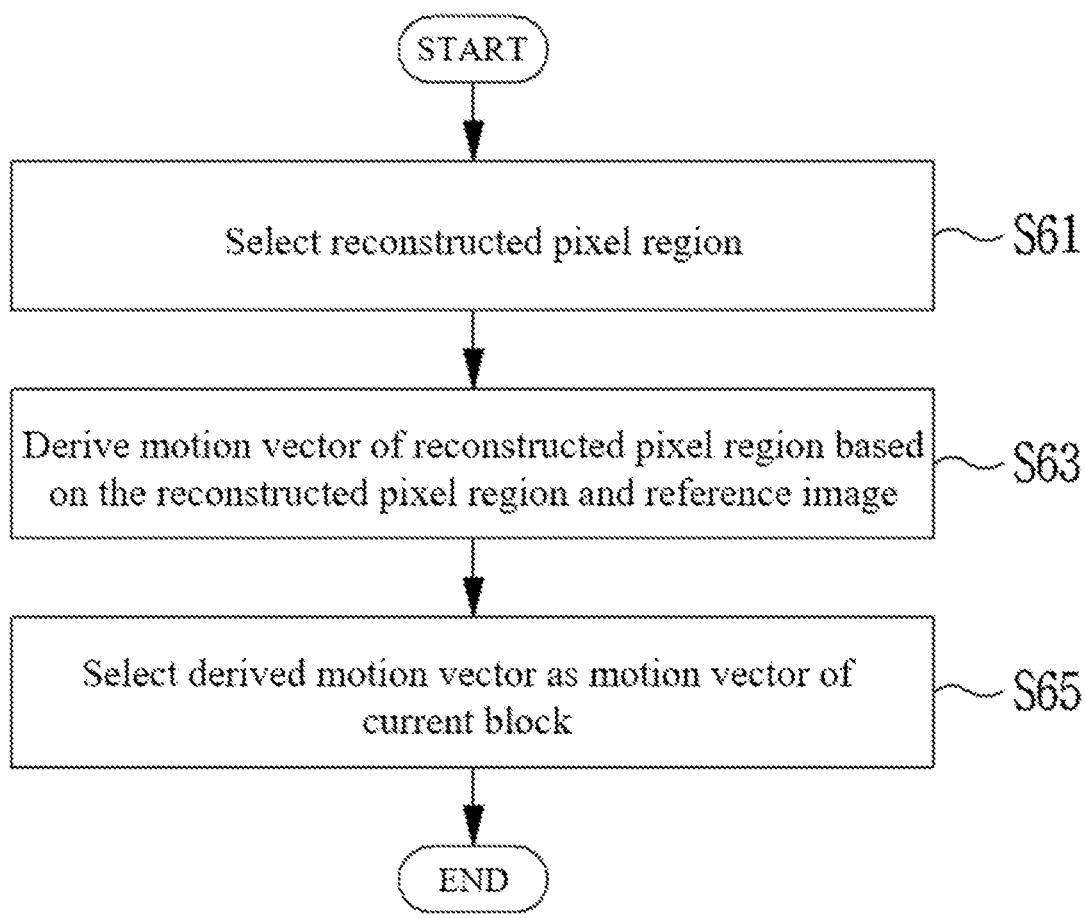
FIG. 6 is a flowchart illustrating an inter prediction method according to the first exemplary embodiment of the present invention.

FIG. 6 is a flowchart illustrating an inter prediction method according to the first exemplary embodiment of the present invention.

Inter prediction according to the embodiment may be performed by the inter prediction module 103 of the image encoding device 100 or by the inter prediction module 408 of the image decoding device 400. Reference images used in inter prediction are stored in the memory 112 of the image encoding device 100 or in the memory 406 of the image decoding device 400. The inter prediction module 103 or the inter prediction module 408 may generate the prediction block of the current block 51 with reference to the reference image stored in the memory 112 or in the memory 406.

Referring to FIG. 6, first, the reconstructed pixel region 52 is selected to be used in deriving of the motion vector of the current block to be encoded or decoded, at step S61. Next, on the basis of the reconstructed pixel region 52 and the reference image of the current block, the motion vector of the reconstructed pixel region 52 is derived at step S63. As described above with reference to FIG. 5b, the reference image 53 shown in FIG. 5b is searched for the region matched with the reconstructed pixel region C 52. When the reconstructed pixel region D 54 most similar to the reconstructed pixel region C 52 is determined, the displacement between the region 56 at the same position as the reconstructed pixel region C 52 and the reconstructed pixel region D 54 is determined to be the motion vector 57 of the reconstructed pixel region C 52.

The image encoding device 100 or the image decoding device 400 selects the motion vector 57 of the reconstructed pixel region C 52, determined as described above, as the motion vector of the current block 51 at step S65. Using this motion vector 57, the prediction block 58 of the current block 51 may be generated.

Figure 7A:
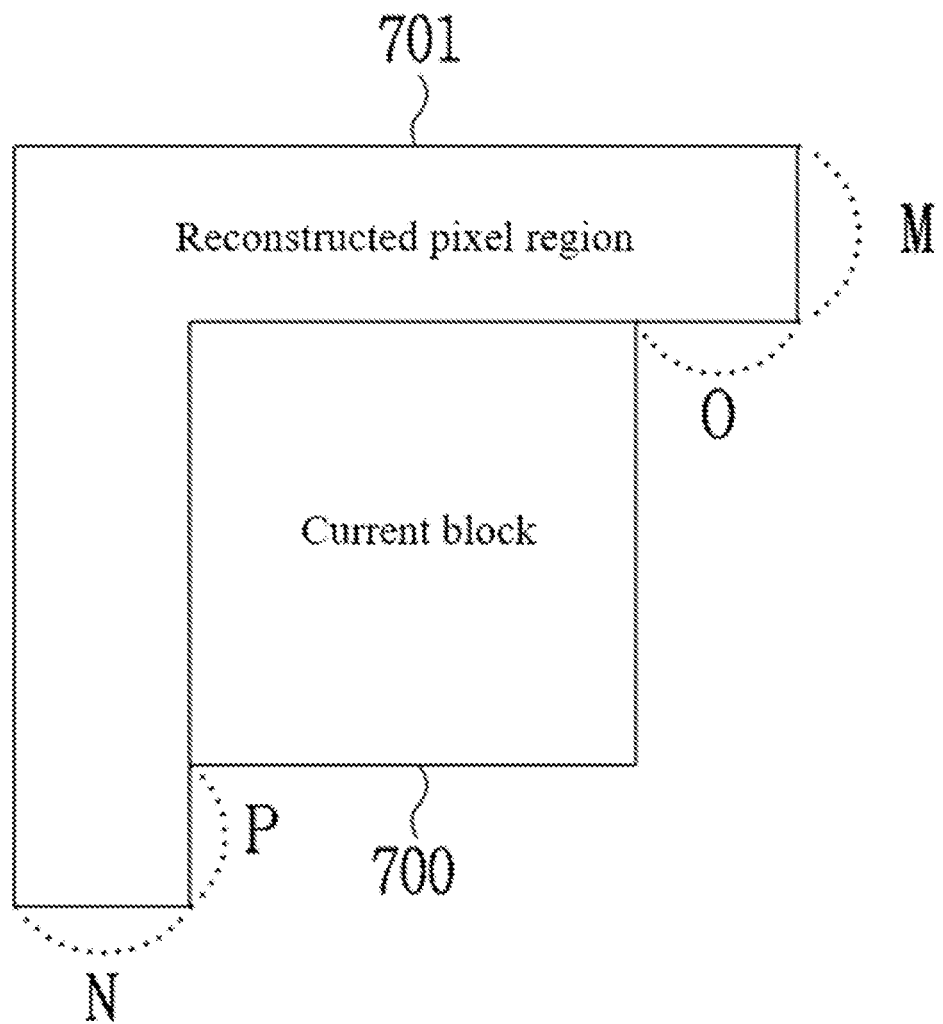
FIGS. 7a to 7c are diagrams illustrating examples of reconstructed pixel regions.
Figure 7B:
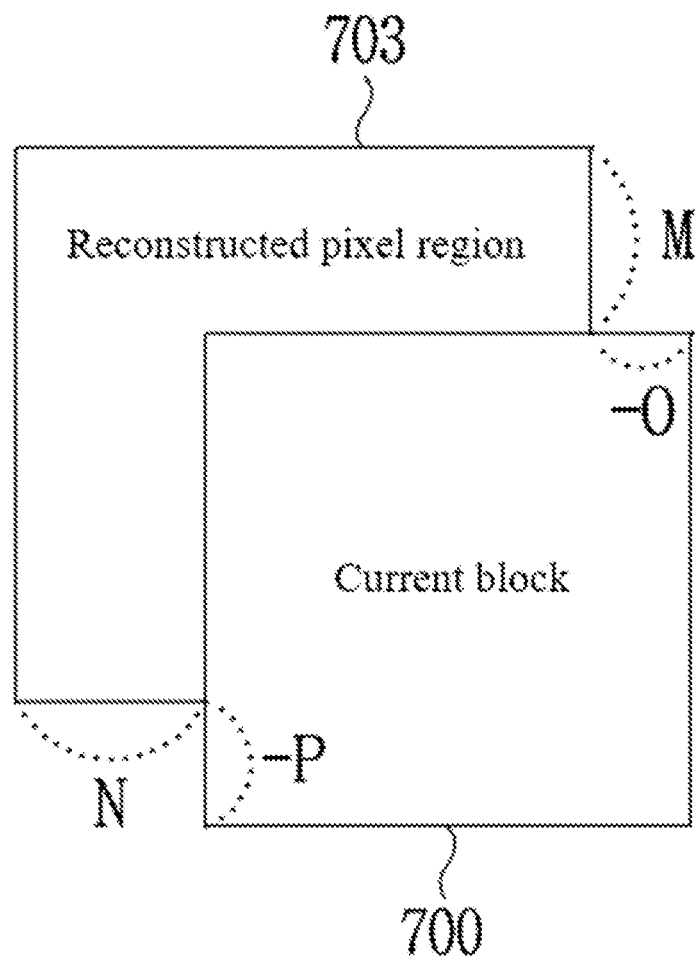
Figure 7C:
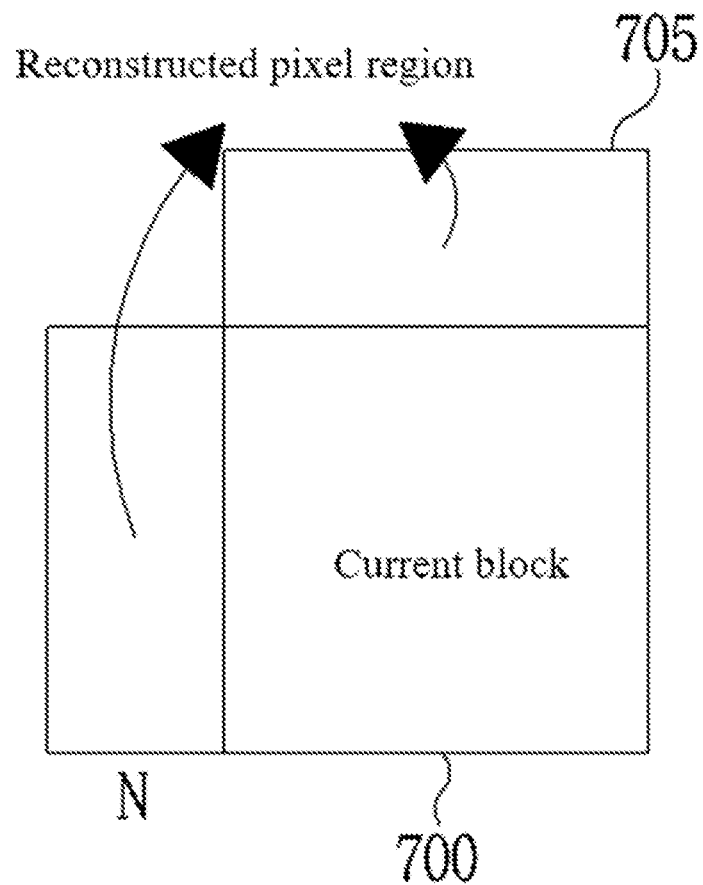

In the meantime, the reconstructed pixel region C 52 may be in various shapes and/or sizes. FIGS. 7a to 7c are diagrams illustrating examples of reconstructed pixel regions. The letters M, N, O, and P shown in FIGS. 7a to 7c denotes pixel intervals, respectively, and it is possible that O and P have negative values assuming that the absolute values of O and P are lower than the horizontal or vertical lengths of the current block, respectively.

Also, it is possible that the reconstructed pixel regions at the upper side and the left side of the current block are used as the reconstructed pixel region C 52 or that the two regions are combined into a single piece to be used as the reconstructed pixel region C 52. Also, it is possible that the reconstructed pixel region C 52 is used by being subjected to subsampling. In this method, only the decoded information around the current block is used to derive the motion information, and thus it is not necessary to transmit the motion information from the encoding device 100 to the decoding device 400.

According to the embodiment of the present invention, the decoding device 400 also performs motion estimation, so that if motion estimation is performed on the entire reference image, the complexity may extremely increase. Therefore, by transmitting the search range on a per-block basis or in the parent header or by fixing the search region to be the same in the encoding device 100 and in the decoding device 400, computational complexity of the decoding device 400 may be reduced.

Figure 8:
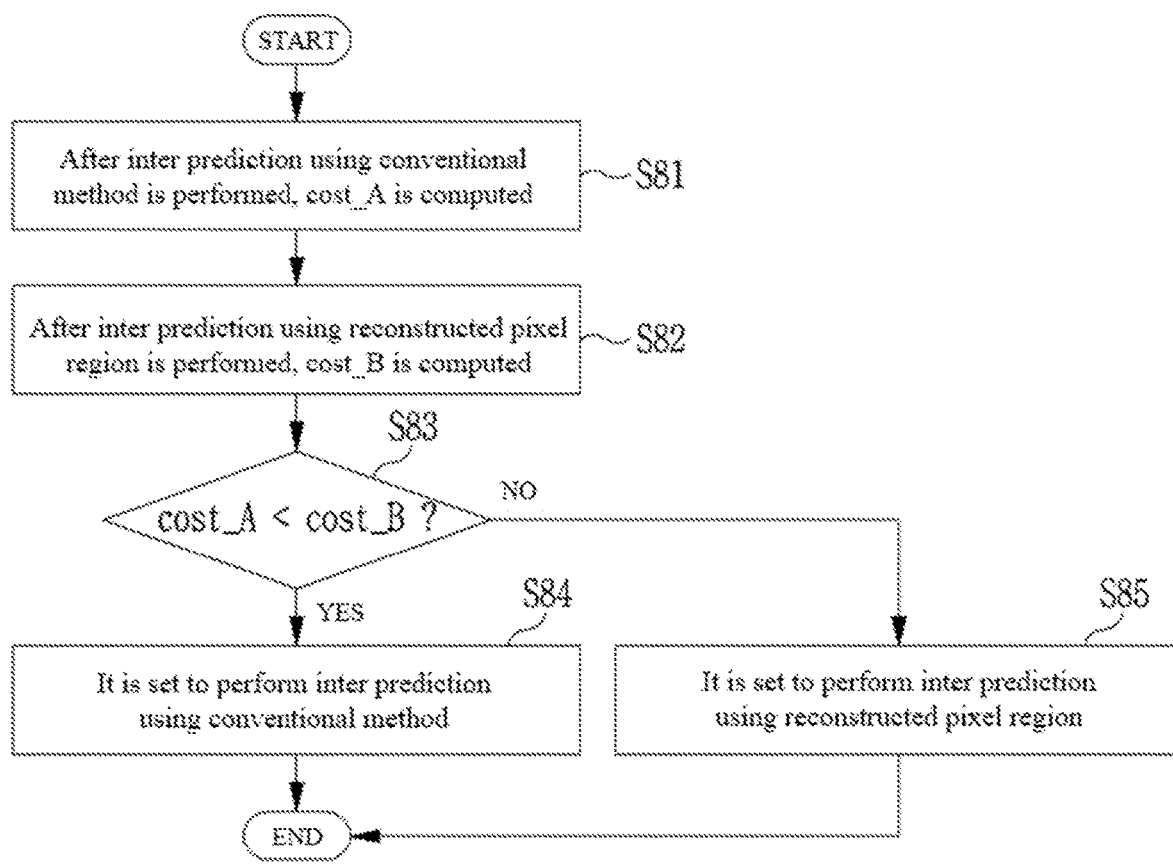
FIG. 8 is a flowchart illustrating a process of determining an inter prediction method according to an embodiment of the present invention.

FIG. 8 is a flowchart illustrating a process of determining an inter prediction method according to an embodiment of the present invention. Among the inter prediction using the reconstructed pixel region according to the present invention and the conventional inter prediction method, the optimum method may be determined through rate-distortion optimization (RDO). The process shown in FIG. 8 may be performed by the image encoding device 100.

Referring to FIG. 8, first, inter prediction according to the conventional method is performed to compute cost_A at step S81, and then as described above, inter prediction using the reconstructed pixel region according to the present Invention is performed to compute cost_B at step S82.

Afterward, cost_A is compared with cost_B to determine which method is optimum to use, at step S83. When cost_A is lower, it is set to perform inter prediction using the conventional method at step S84. Otherwise, it is set to perform inter prediction using the reconstructed pixel region at step S85.

Figure 9:
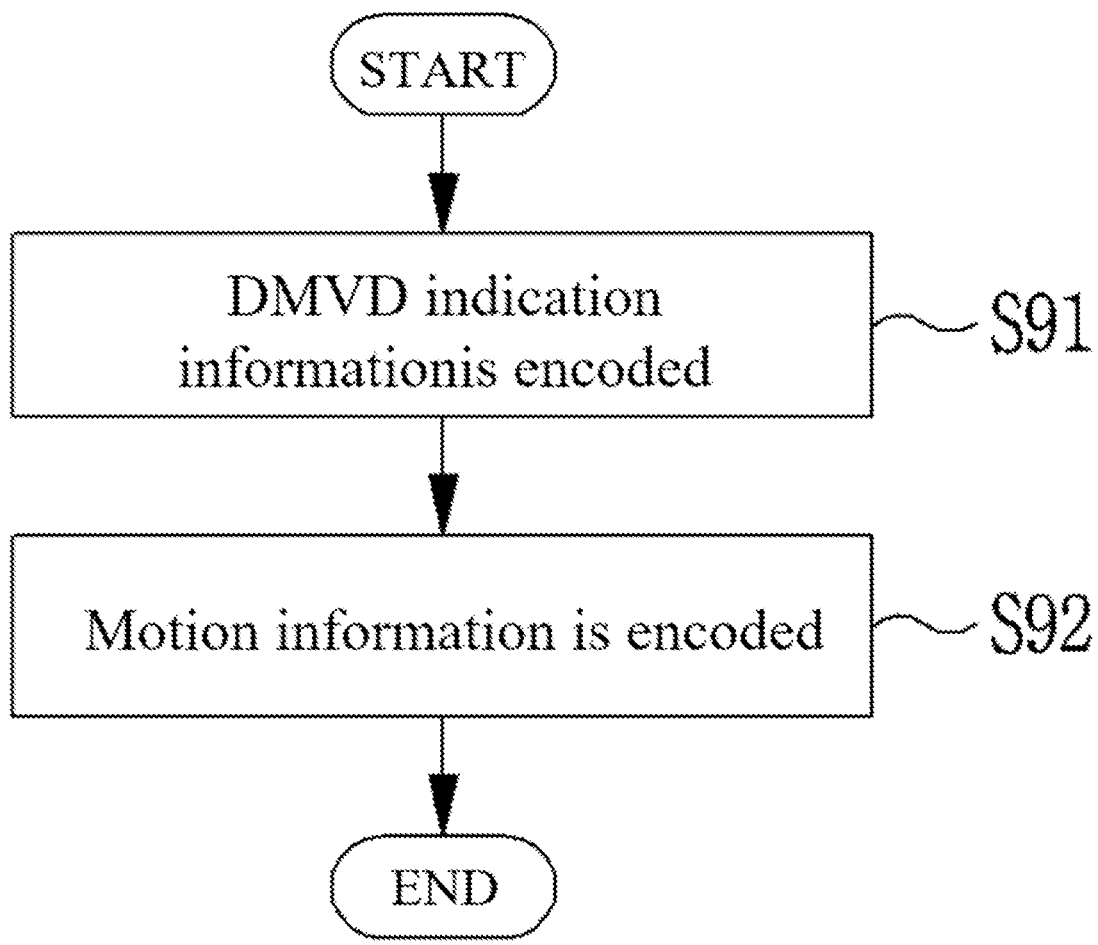
FIG. 9 is a diagram illustrating a process of encoding information that indicates an inter prediction method.

FIG. 9 is a diagram illustrating a process of encoding information that indicates an inter prediction method determined by the process shown in FIG. 8. Hereinafter, the information indicating the inter prediction method determined by the process shown in FIG. 8 is referred to as decoder-side motion vector derivation (DMVD) indication information. The DMVD indication information or decoder-side motion vector derivation indication information may be information indicating whether inter prediction using the conventional method is performed or inter prediction using the reconstructed pixel region is performed.

Referring to FIG. 9, the DMVD indication information indicating the inter prediction method determined by the process shown in FIG. 8 is encoded at step S91. The DMVD indication information may be, for example, a 1-bit flag or one of several indexes. Afterward, the motion information is encoded at step S92, and the algorithm ends.

Alternatively, information indicating whether or not inter prediction using the reconstructed pixel region according to the embodiment of the present invention is used may be generated in the parent header first and then may be decoded. That is, when the information indicating whether or not inter prediction using the reconstructed pixel region is used indicates true, the DMVD indication information is encoded. When the information indicating whether or not inter prediction using the reconstructed pixel region is used indicates false, the DMVD indication information is not present within the bitstream and in this case, the current block is predicted using the conventional inter prediction.

In the meantime, regarding the parent header, the parent header Including the information that indicates whether or not inter prediction using the reconstructed pixel region is used may be transmitted by being included in a block header, a slice header, a tile header, a picture header, or a sequence header.

Figure 10:
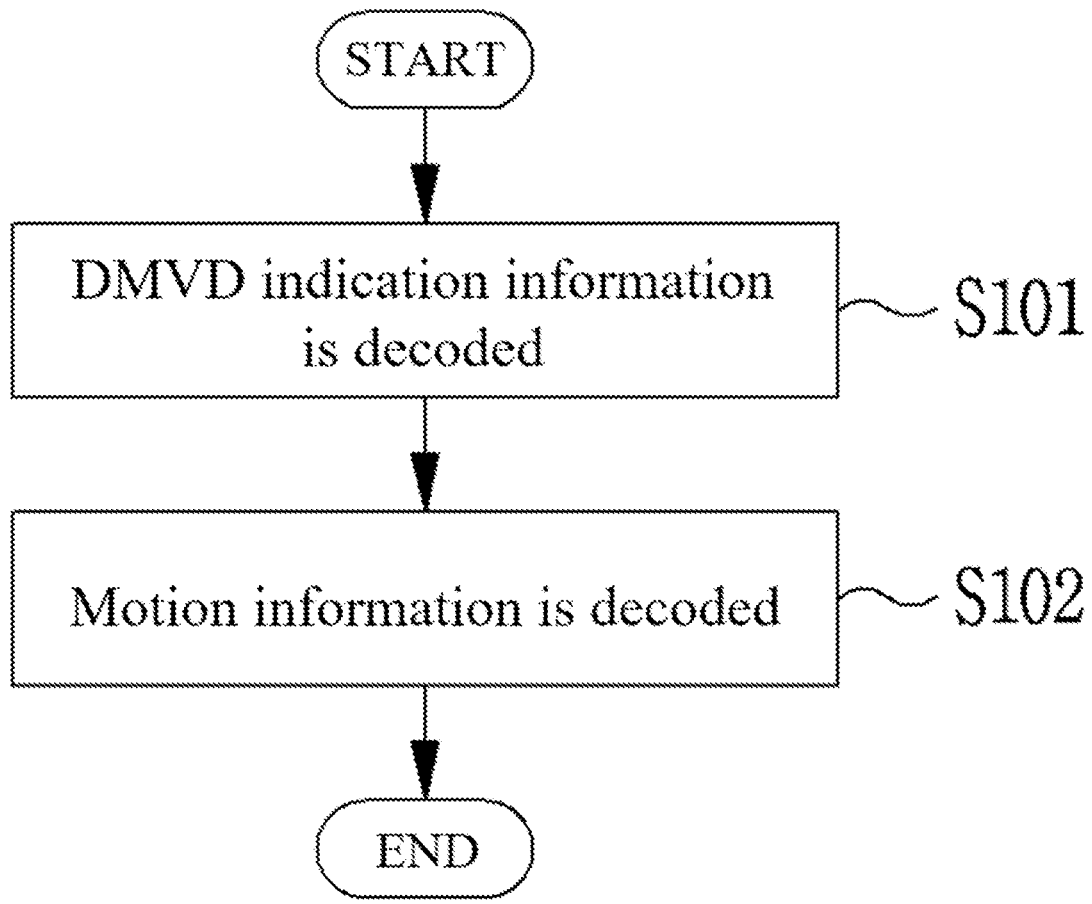
FIG. 10 is a diagram illustrating a process of decoding DMVD indication information encoded as shown in FIG. 9.

FIG. 10 is a diagram illustrating a process of decoding the DMVD indication information encoded as shown in FIG. 9.

The decoding device 400 decodes the DMVD indication information at step S101, decodes the motion information at step S102, and ends the algorithm.

In the case where the information indicating whether or not inter prediction using the reconstructed pixel region is used is present in the parent header of the bitstream, when the information indicating whether or not inter prediction using the reconstructed pixel region is used indicates true, the DMVD indication information is present in the bitstream, when the information indicating whether or not inter prediction using the reconstructed pixel region is used indicates false, the DMVD indication information is not present within the bitstream and in this case, the current block is predicted using the conventional inter prediction.

Regarding the parent header, the parent header including the information that indicates whether or not inter prediction using the reconstructed pixel region is used may be transmitted by being included in a block header, a slice header, a tile header, a picture header, or a sequence header.

Second Exemplary Embodiment

Hereinafter, the second exemplary embodiment of the present invention will be described with reference to the drawings.

In the second exemplary embodiment, the inter prediction using the reconstructed pixel region according to the first exemplary embodiment described above is applied to inter prediction using affine transformation. Specifically, in order to derive a motion vector of a control point used for inter prediction using affine transformation, a motion vector derivation method using the reconstructed pixel region is applied. Hereinafter, for convenience of description, according to the second exemplary embodiment of the present invention, inter prediction using affine transformation is simply referred to as affine inter prediction.

Figure 11:
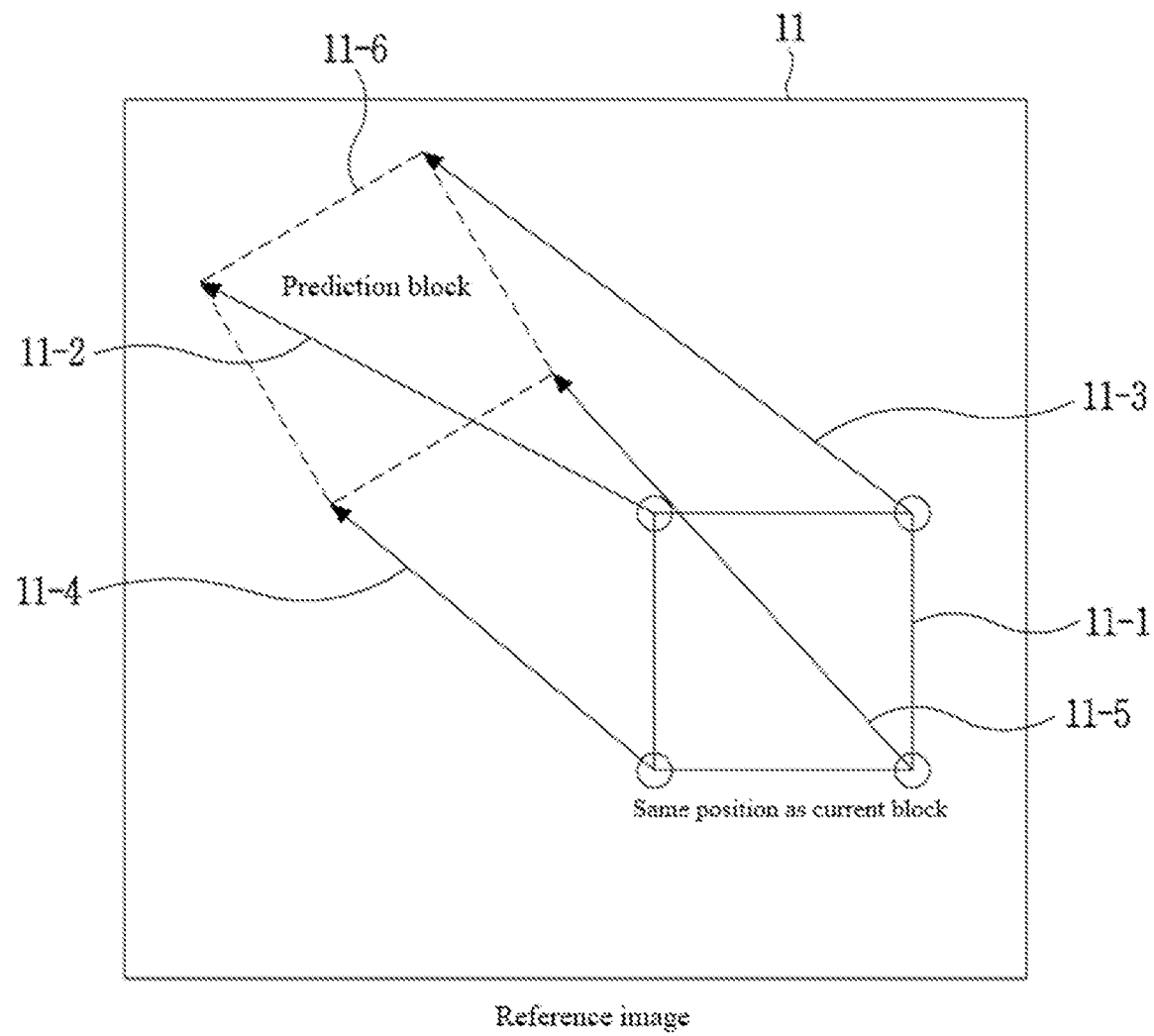
FIG. 11 is a diagram illustrating affine inter prediction.

FIG. 11 is a diagram illustrating affine inter prediction.

In affine inter prediction, motion vectors at four corners of the current block to be encoded or decoded are obtained, and then the motion vectors are used to generate a prediction block. Here, the four corners of the current block may correspond to the control points.

Referring to FIG. 11, a block identified by motion vectors 11-2, 11-3, 11-4, and 11-5 at the four corners (namely, the control points) of the current block (not shown) within the current image may be a prediction block 11-6 of the current block.

This affine inter prediction enables prediction of a block or image region subjected to rotation, zoom-in/zoom-out, translation, reflection, or shear deformation.

Equation 1 below is a general determinant of affine transformation.

$$\begin{bmatrix} x' \\ y' \\ 1 \end{bmatrix} = \begin{bmatrix} a & b & e \\ c & d & f \\ 0 & 0 & 1 \end{bmatrix} \begin{bmatrix} x \\ y \\ 1 \end{bmatrix} \qquad \text{[Equation 1]}$$

Equation 1 is an equation representing transform of two-dimensional coordinates, wherein (x, y) denotes original coordinates. (x', y') denotes destination coordinates, and a, b, c, d, e, and f denote transform parameters.

In order to apply this affine transformation to video codec, transform parameters need to be transmitted to the image decoding device, which results in enormous increase in overhead. For this reason, in the conventional video codec, affine transformation is simply applied using N reconstructed neighboring control points.

Equation 2 below represents a method of deriving a motion vector of an arbitrary sub-block within the current block by using two control points at the top left and the top right of the current block.

$$\begin{cases} MV_x = \dfrac{(MV_{1x} - MV_{0x})}{W}x - \dfrac{(MV_{1y} - MV_{0y})}{W}y + MV_{0x} \\ MV_y = \dfrac{(MV_{1y} - MV_{0y})}{W}x + \dfrac{(MV_{1x} - MV_{0x})}{W}y + MV_{0y} \end{cases} \quad \text{[Equation 2]}$$

In Equation 2, (x, y) denotes the position of the arbitrary sub-block within the current block, W denotes the horizontal length of the current block, ($MV_x$, $MV_y$) denotes the motion vector of the sub-block, ($MV_{0x}$, $MV_{0y}$) denotes the motion vector of the top left control point, and ($MV_{1x}$, $MV_{1y}$) denotes the motion vector of the top right control point.

Next, Equation 3 below represents a method of deriving a motion vector of an arbitrary sub-block within the current block by using three control points at the top left, the top right, and the bottom left of the current block.

$$\begin{cases} MV_x = \dfrac{(MV_{1x} - MV_{0x})}{W}x + \dfrac{(MV_{2x} - MV_{0x})}{H}y + MV_{0x} \\ MV_y = \dfrac{(MV_{1y} - MV_{0y})}{W}x + \dfrac{(MV_{2y} - MV_{0y})}{H}y + MV_{0y} \end{cases} \quad \text{[Equation 3]}$$

In Equation 3, (x, y) denotes the position of the arbitrary sub-block, W and H denote the horizontal length and the vertical length of the current block, respectively, ($MV_x$, $MV_y$) denotes the motion vector of the sub-block within the current block, ($MV_{0x}$, $MV_{0y}$) denotes the motion vector of the top left control point, ($MV_{1x}$, $MV_{1y}$) denotes the motion vector of the top right control point, and ($MV_{2x}$, $MV_{2y}$) denotes the motion vector of the bottom left control point.

In the second exemplary embodiment of the present invention, in order to derive the motion vector of the control point used for affine inter prediction, the motion vector derivation method using the reconstructed pixel region according to the first exemplary embodiment is applied. Therefore, the image encoding device 100 does not need to transmit motion vector information of multiple control points to the image decoding device 400.

Figure 12A:
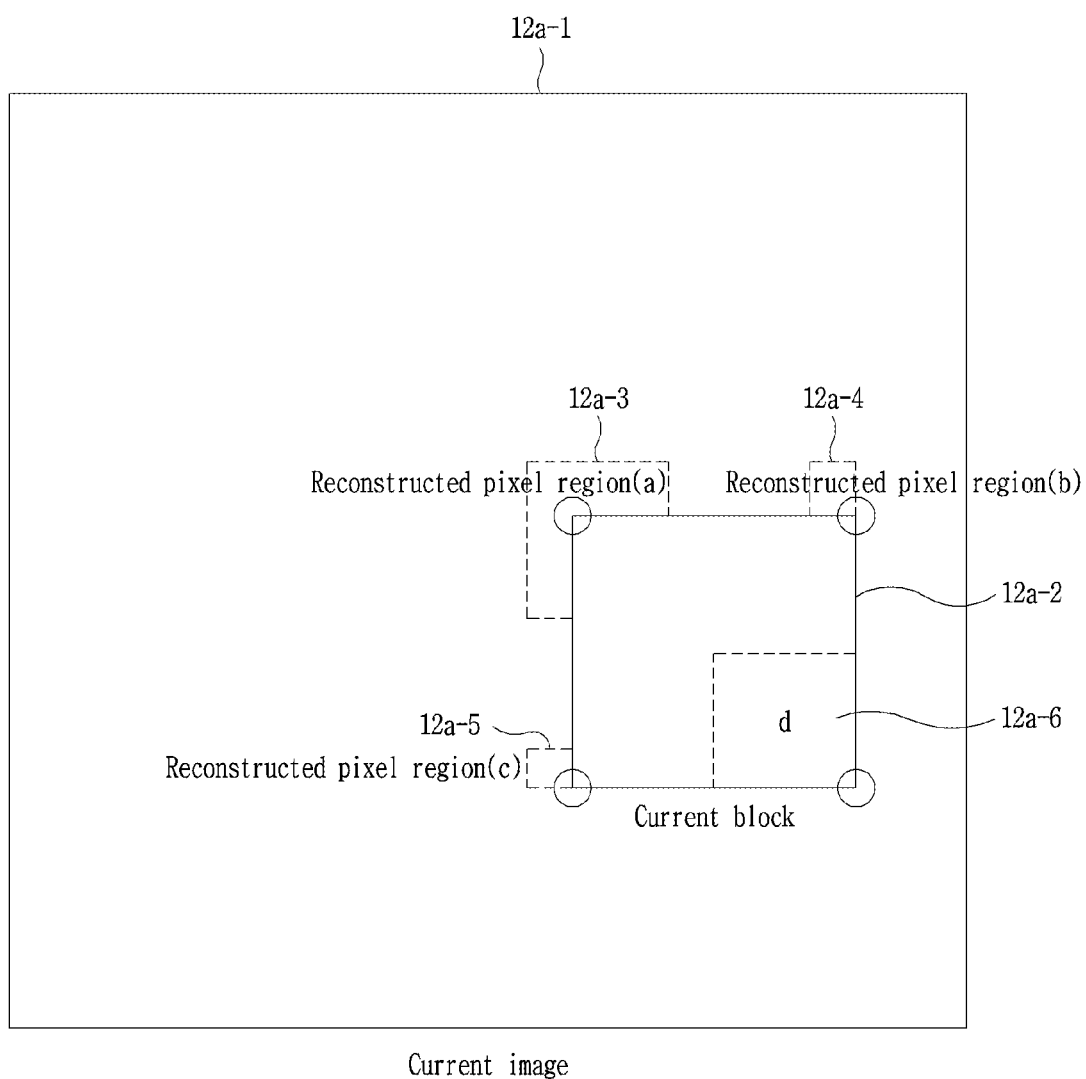
FIGS. 12a and 12b are diagrams illustrating derivation of a motion vector of a control point by using a reconstructed pixel region according to a second exemplary embodiment of the present invention.
Figure 12B:
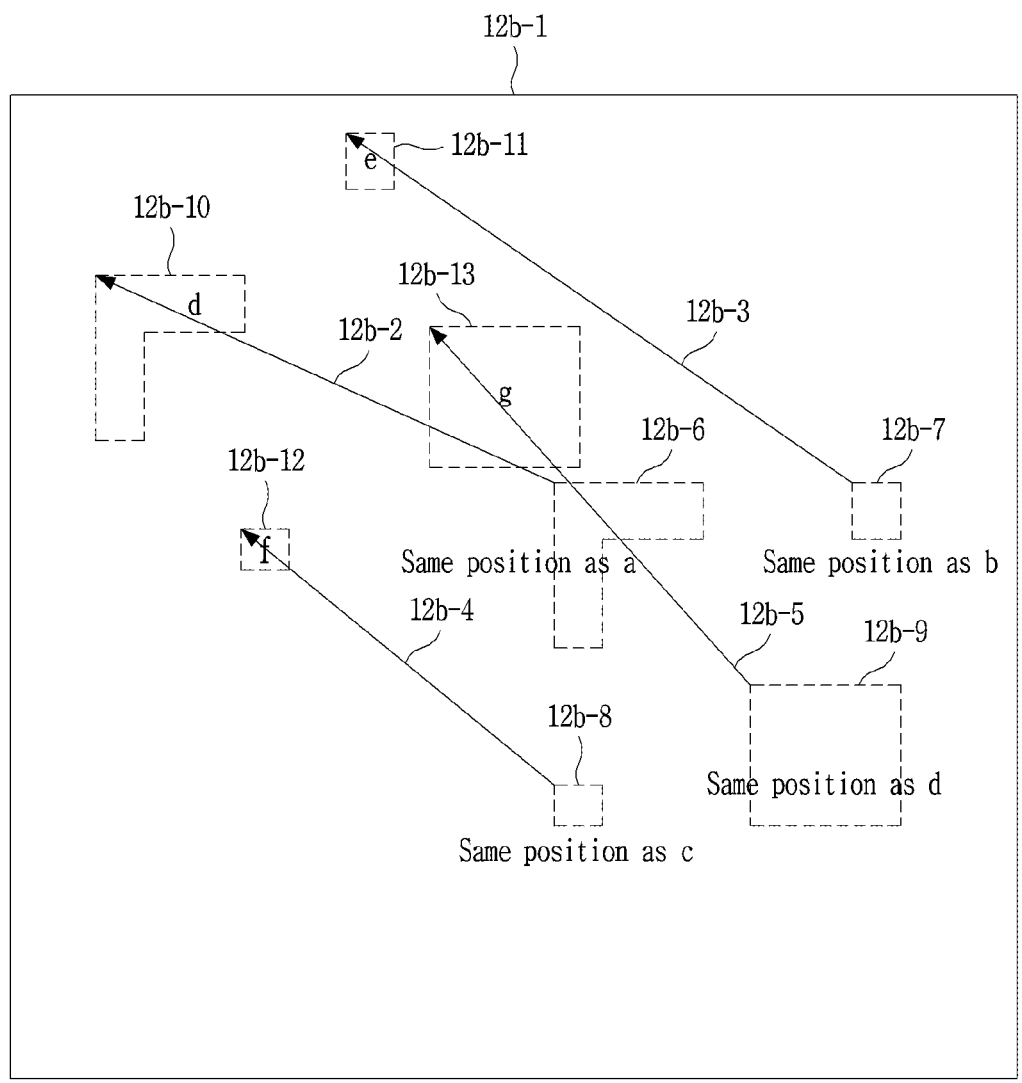

FIGS. 12*a* and 12*b* are diagrams illustrating derivation of the motion vector of the control point by using the reconstructed pixel region according to the second exemplary embodiment of the present invention.

Referring to FIG. 12*a*, a current block 12*a*-2 to be encoded or decoded is included in a current image 12*a*-1. Four control points for affine inter prediction are denoted by circles at four corners of the current block 12*a*-2 in FIG. 12*a*. Also, in this figure, as regions adjacent to three control points at the top left, the top right, and the bottom left, pre-reconstructed pixel regions a 12*a*-3, b 12*a*-4, and c 12*a*-5 are shown.

In the embodiment, motion vectors of three control points at the top left, the top right, and the bottom left are derived using the reconstructed pixel regions a 12*a*-3, b 12*a*-4, and c 12*a*-5 as shown in FIG. 12*b*. However, in the case of the control point at the bottom right of the current block, a reconstructed pixel region may be not present nearby. In this case, by using a sub-block d 12*a*-6 in an arbitrary size, the motion vector of the sub-block d 12*a*-6 obtained using the conventional inter prediction method may be set to be the motion vector of the bottom right control point of the current block.

Referring to FIG. 12*b*, a reference image 12*b*-1 shown in FIG. 12*b* is searched for regions d 12*b*-10, e 12*b*-11, and f 12*b*-12 matched with the reconstructed pixel regions a 12*a*-3, b 12*a*-4, and c 12*a*-5, respectively, shown in FIG. 12*a*. The displacements from the regions 12*b*-6, 12*b*-7, and 12*b*-8, which are at the same position as the reconstructed pixel regions a 12*a*-3, b 12*a*-4, and c 12*a*-5, respectively, are determined to be motion vectors 12*b*-2, 12*b*-3, and 12*b*-4 of the reconstructed pixel regions a 12*a*-3, b 12*a*-4, and c 12*a*-5, respectively. The motion vectors 12*b*-2, 12*b*-3, and 12*b*-4 determined as described above are determined to be the motion vectors of three control points at the top left, the top right, and the bottom left of the current block 12*a*-2. In the meantime, as the motion vector of the control point at the bottom right, the motion vector of the sub-block d 12*a*-6 obtained using the conventional inter prediction method may be used.

By using the motion vectors of the four control points derived as described above, a motion vector of an arbitrary sub-block within the current block may be derived as shown in Equation 4 below.

$$\begin{cases} MV_x = \dfrac{\dfrac{(MV_{1x} - MV_{0x}) + (MV_{3x} - MV_{2x})}{2}}{W}x + \dfrac{\dfrac{(MV_{2x} - MV_{0x}) + (MV_{3x} - MV_{1x})}{2}}{H}y + MV_{0x} \\ MV_y = \dfrac{\dfrac{(MV_{1y} - MV_{0y}) + (MV_{3y} - MV_{2y})}{2}}{W}x + \dfrac{\dfrac{(MV_{2y} - MV_{0y}) + (MV_{3y} - MV_{1y})}{2}}{H}y + MV_{0y} \end{cases} \quad \text{[Equation 4]}$$

In Equation 4, (x, y) denotes the position of the arbitrary sub-block within the current block, W and H denote the horizontal length and the vertical length of the current block, respectively, ($MV_x$, $MV_y$) denotes the motion vector of the sub-block within the current block, ($MV_{0x}$, $MV_{0y}$) denotes the motion vector of the top left control point, ($MV_{1x}$, $MV_{1y}$) denotes the motion vector of the top right control point, ($MV_{2x}$, $MV_{2y}$) denotes the motion vector of the bottom left control point, and ($MV_{3x}$, $MV_{3y}$) denotes the motion vector of the bottom right control point.

In the meantime, the reconstructed pixel regions a 12*a*-3, b 12*a*-4, and c 12*a*-5 may be in various sizes and/or shapes as described above with reference to FIGS. 7*a* to 7*c*. The size and/or the shape of the sub-block d 12*a*-6 may be the same as a preset size and/or a preset shape in the encoding device 100 and the decoding device 400. Also, on a per-block basis or through the parent header, horizontal and/or vertical size information of the sub-block d 12*a*-6 may be transmitted, or size information may be transmitted on a per-exponentiation of two basis.

As described above, when motion vectors are derived from four control points, these vectors are used to derive the motion vector of the current block 12*a*-2 or the motion vector of an arbitrary sub-block within the current block 12*a*-2, and this derived motion vector may be used to derive the prediction block of the current block 12*a*-2 or the prediction block of an arbitrary sub-block within the current block 12*a*-2. Specifically, referring to Equation 4 above, the position of the current block 12*a*-2 is coordinates (0, 0), so that the motion vector of the current block 12*a*-2 is the motion vector ($MV_{0x}$, $MV_{0y}$) of the top left control point. Therefore, the prediction block of the current block 12*a*-2 may be obtained using the motion vector of the top left control point. When the current block is a 8×8 block and is partitioned into four 4×4 sub-blocks, the motion vector of the sub-block at the position (3.0) within the current block is obtained by substituting a value of three for the variable x in Equation 4 above, a value of zero for the variable y, and a value of eight for both variables W and H.

Figure 13:
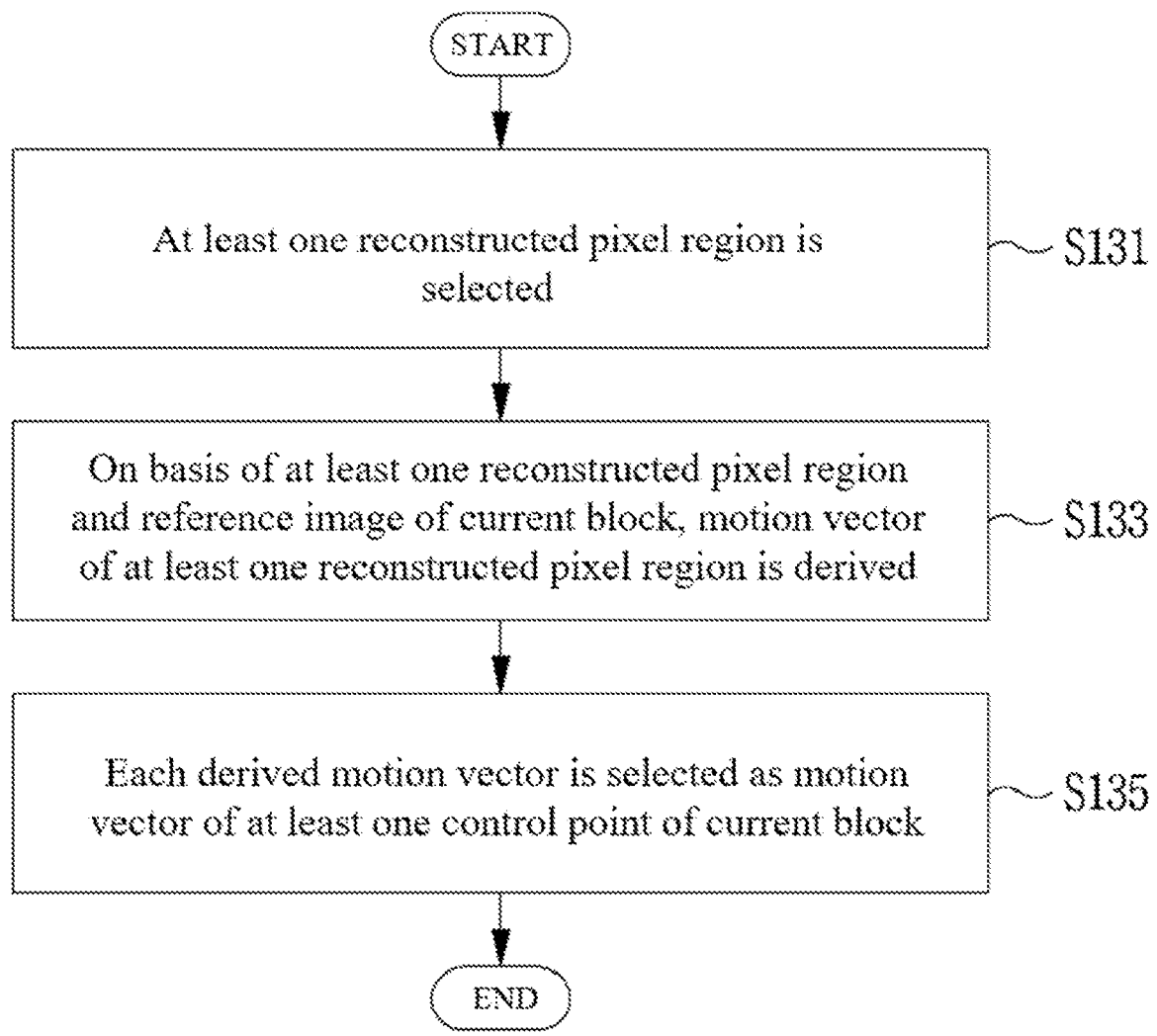
FIG. 13 is a flowchart illustrating an inter prediction method according to the second exemplary embodiment of the present invention.

Next, with reference to FIG. 13, the inter prediction method according to the second exemplary embodiment of the present invention will be described. FIG. 13 is a flowchart illustrating the inter prediction method according to the second exemplary embodiment of the present invention.

Inter prediction according to the embodiment may be performed by the inter prediction module 103 of the image encoding device 100 or the inter prediction module 408 of the image decoding device 400. Reference images used in inter prediction are stored in the memory 112 of the image encoding device 100 or in the memory 406 of the image decoding device 400. The inter prediction module 103 or the inter prediction module 408 may generate the prediction block of the current block 51 with reference to a reference image stored in the memory 112 or the memory 406.

Referring to FIG. 13, first, at least one reconstructed pixel region is selected to be used in deriving a motion vector of at least one control point of the current block to be encoded or decoded, at step S131. In the embodiment shown in FIGS. 12a and 12b, to derive motion vectors of three control points at the top left, the top right, and the bottom left of the current block 12a-2, three reconstructed pixel regions a 12a-3, b 12a-4, and c 12a-5 are selected. However, without being limited thereto, to derive a motion vector of one or two control points among the three control points, one or two reconstructed pixel regions may be selected.

Next, on the basis of the at least one reconstructed pixel region selected at step S131 and the reference image of the current block, a motion vector of at least one reconstructed pixel region is derived at step S133. The image encoding device 100 or the image decoding device 400 selects each motion vector of the reconstructed pixel region C 52, determined as described above, as a motion vector of at least one control point of the current block at step S135. At least one motion vector selected as described above may be used to generate the prediction block of the current block.

Figure 14:
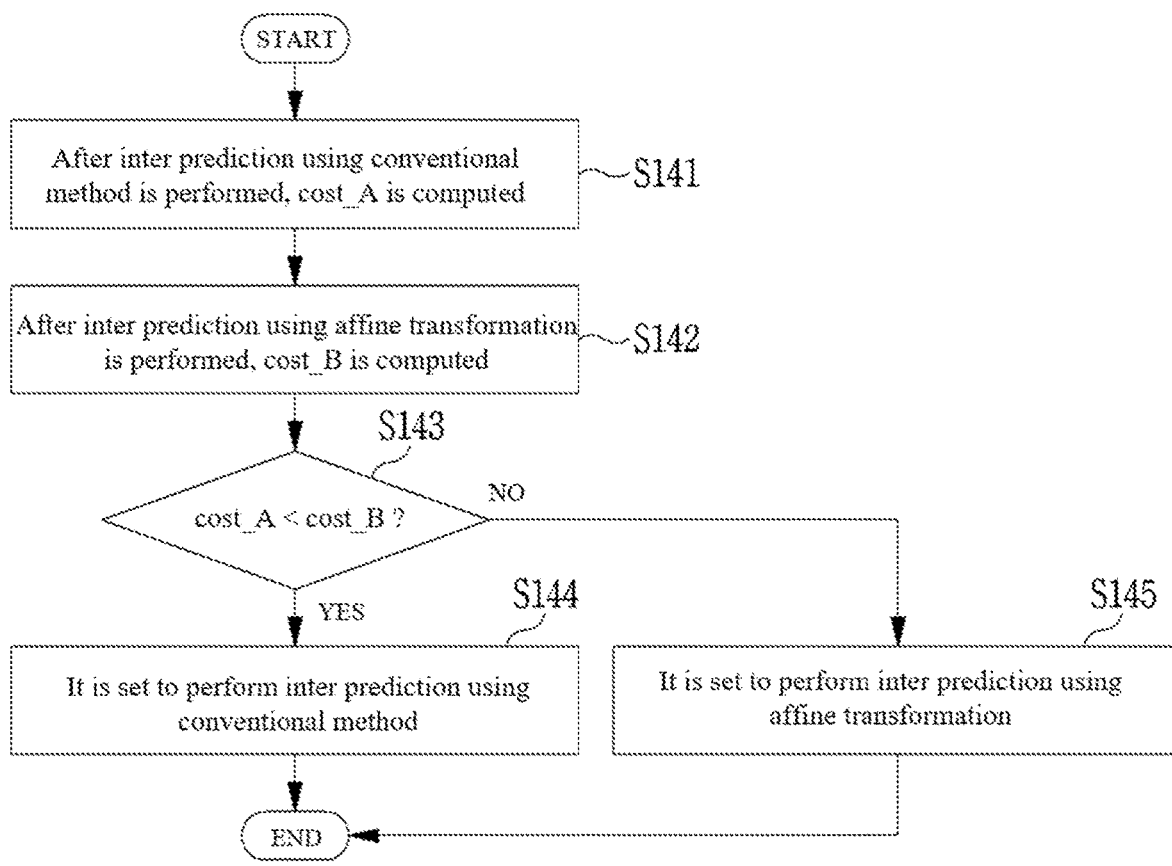
FIG. 14 is a flowchart illustrating a process of determining an inter prediction method according to the second exemplary embodiment of the present invention.

FIG. 14 is a flowchart illustrating a process of determining an inter prediction method according to the second exemplary embodiment of the present Invention. According to the second exemplary embodiment of the present invention, among the affine inter prediction and the conventional inter prediction, the optimum method may be determined through rate-distortion optimization (RDO). The process shown in FIG. 14 may be performed by the image encoding device 100.

Referring to FIG. 14, first, inter prediction is performed using the conventional method to compute cost_A at step S141, and as described above, according to the second exemplary embodiment of the present invention, affine inter prediction is performed to compute cost_B at step S142.

Afterward, cost_A is compared with cost_B to determine which method is optimum to use, at step S143. When cost_A is lower, it is set to perform inter prediction using the conventional method at step S144. Otherwise, it is set to perform affine inter prediction at step S145 according to the second exemplary embodiment of the present invention.

Figure 15:
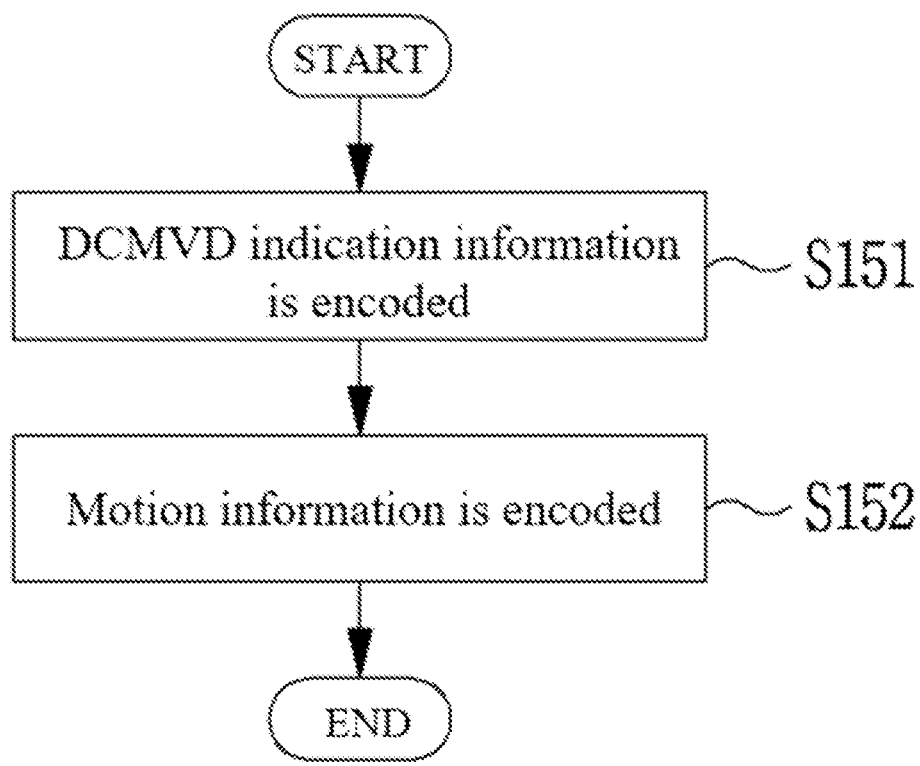
FIG. 15 is a diagram illustrating a process of encoding information that indicates an inter prediction method determined by the process shown in FIG. 14.

FIG. 15 is a diagram illustrating a process of encoding information that indicates an inter prediction method determined by the process shown in FIG. 14. Hereinafter, the information indicating the inter prediction method determined by the process shown in FIG. 14 is referred to as decoder-side control point motion vector derivation (DCMVD) indication information. The DCMVD indication information or decoder-side control point motion vector derivation indication information may be information indicating whether inter prediction using the conventional method is performed or affine inter predction according to the second exemplary embodiment of the present invention is performed.

Referring to FIG. 15, the DCMVD Indication information indicating the inter prediction method determined by the process shown in FIG. 14 is encoded at step S151. The DCMVD indication information may be, for example, a 1-bit flag or one of several indexes. Afterward, the motion information is encoded at step S152, and the algorithm ends.

In the meantime, according to the second exemplary embodiment of the present invention, the information indicating whether or not affine inter prediction is used may be generated in the parent header first and then may be encoded. That is, according to the second exemplary embodiment of the present invention, when the information indicating whether or not affine inter prediction is used indicates true, the DCMVD indication information is encoded. According to the second exemplary embodiment of the present invention, when the information indicating whether or not affine inter prediction is used indicates false, the DCMVD indication information is not present within the bitstream, and in this case, the current block is predicted using the conventional inter prediction.

In the meantime, regarding the parent header, the parent header including the information indicating whether or not affine inter prediction according to the present invention is used may be transmitted by being included in a block header, a slice header, a tile header, a picture header, or a sequence header.

Figure 16:
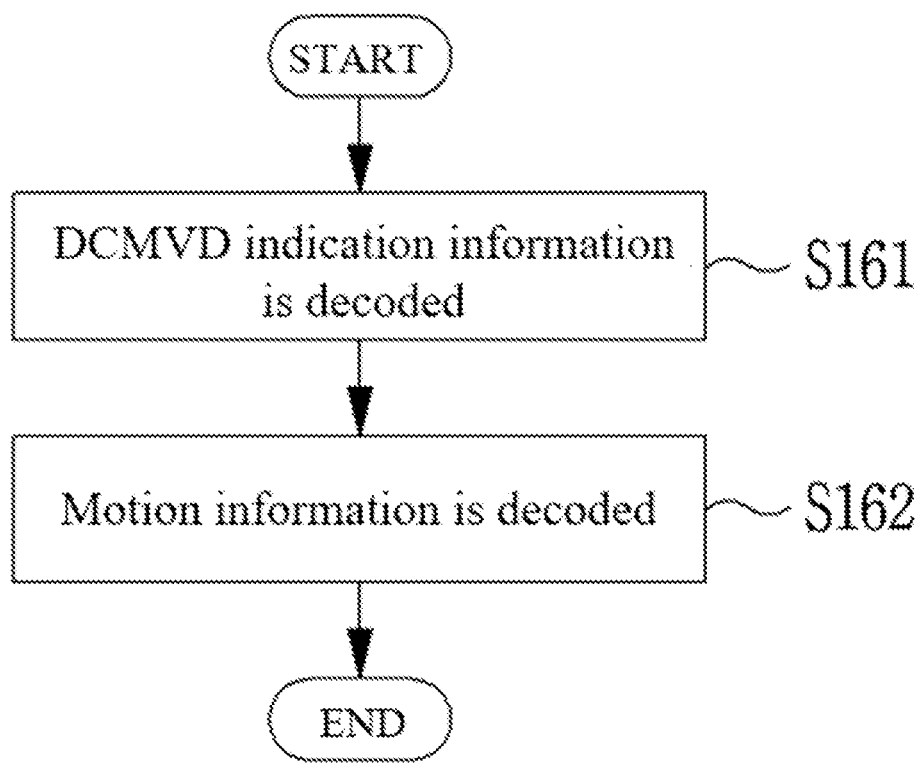

FIG. 16 is a diagram illustrating a process of decoding the DCMVD indication information encoded as shown in FIG. 15.

The decoding device 400 decodes the DCMVD indication information at step S161, decodes the motion information at step S162, and ends the algorithm.

In the case where the information indicating whether or not affine inter prediction according to the second exemplary embodiment of the present invention is used is present in the parent header of the bitstream, when the information indicating whether or not inter prediction using the reconstructed pixel region is used indicates true, the DCMVD indication information is present in the bitstream. According to the second exemplary embodiment of the present invention, when the information indicating whether or not affine inter prediction is used indicates false, the DCMVD indication information is not present within the bitstream, and in this case, the current block is predicted using the conventional inter prediction.

According to the second exemplary embodiment of the present invention, regarding the parent header, the parent header including the information indicating whether or not affine inter prediction is used may be transmitted by being included in a block header, a slice header, a tile header, a picture header, or a sequence header.

Figure 17:
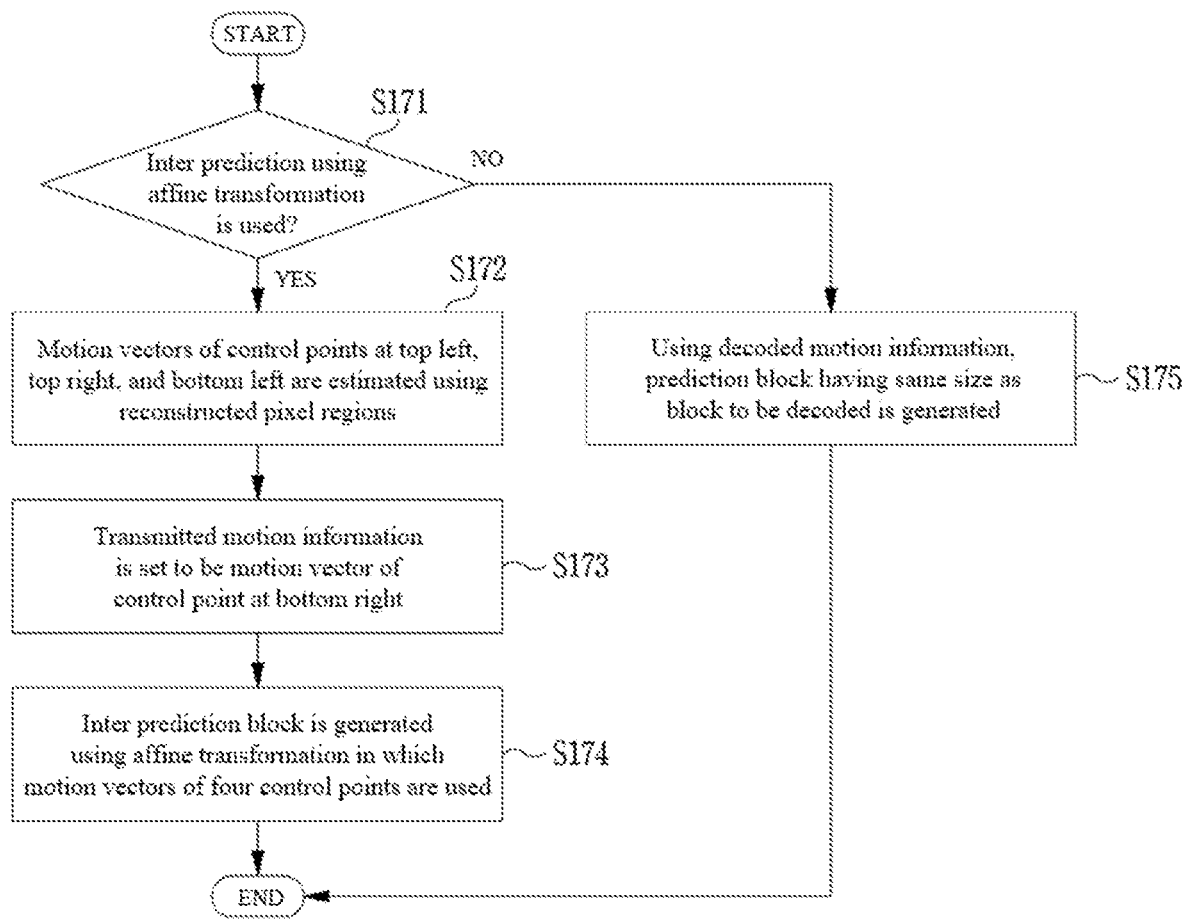
FIG. 17 is a flowchart illustrating an example of an image decoding method in which motion vectors of three control points are derived using a reconstructed pixel region so as to generate a prediction block of a current block.

FIG. 17 is a flowchart illustrating an example of an image decoding method in which motion vectors of three control points are derived using a reconstructed pixel region so as to generate a prediction block of a current block. The process shown in FIG. 17 relates to the embodiment shown in FIGS. 12a and 12b.

To derive motion vectors of three control points at the top left, the top right, and the bottom left of the current block 12a-2, three reconstructed pixel regions a 12a-3, b 12a-4, and c 12a-5 are selected. However, without being limited thereto, to derive a motion vector of one or two control points among the three control points, one or two reconstructed pixel regions may be selected.

The image decoding device 400 may determine, on the basis of the DCMVD indication information, which inter prediction is to be performed. When the DCMVD indication information indicates use of affine inter prediction according to the present invention at step S171, the motion vectors of the control points at the top left, the top right, and the bottom left of the current block are estimated and selected using the respective reconstructed pixel regions at step S172.

Afterward, the motion vector obtained by decoding the transmitted motion information in the bitstream is set to be the motion vector of the control point at the bottom right at step S173. Using affine transformation in which the motion vectors of the four control points derived through steps S172 and S173 are used, an inter prediction block of the current block is generated at step S174. When affine inter prediction is not used, the prediction block of the current block is generated at step S175 according to the conventional inter prediction in which the motion information is decoded and the decoded motion information is used.

Third Exemplary Embodiment

Figure 18:
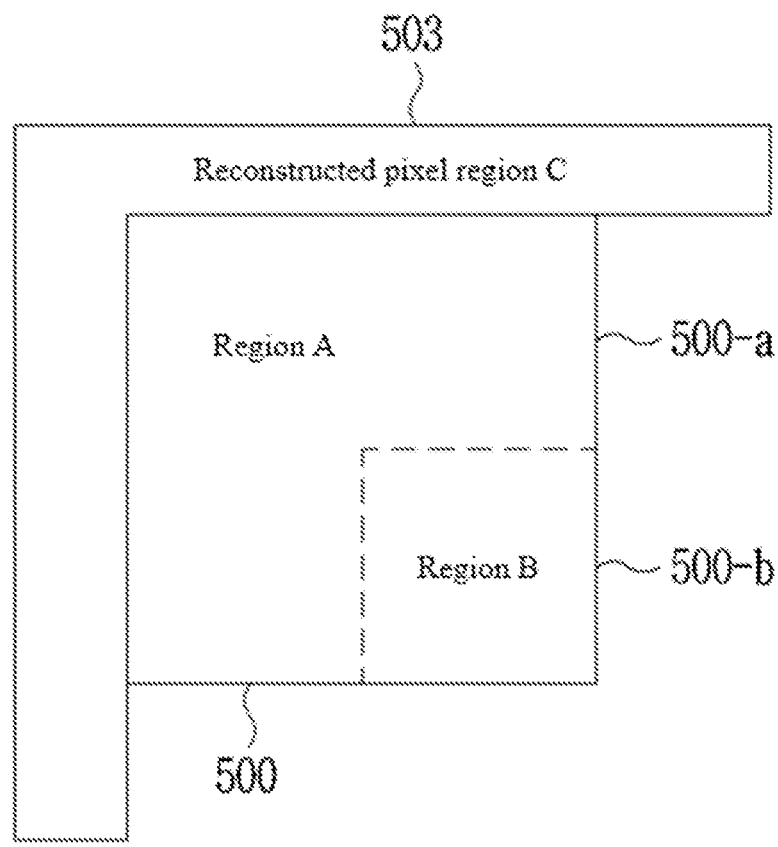
FIG. 18 is a diagram illustrating a process of decoding DCMVD indication information encoded as shown in FIG. 15.

FIG. 18 is a diagram illustrating a current block partitioned into multiple regions for inter prediction according to a third exemplary embodiment of the present invention.

FIG. 18 shows a current block 500 to be encoded or decoded and a pre-reconstructed pixel region C 503 as a region adjacent to the current block 500. The current block 500 is partitioned into region A 500-a and region B 500-b.

Due to correlation between pixels, the pixels within the reconstructed pixel region C 503 is likely to be similar to the pixels included in the region A 500-a, but is unlikely to be similar to the pixels included in the region B 500-b. Therefore, in inter prediction on the region A 500-a, motion estimation and motion compensation using the reconstructed pixel region C 503 are performed to find accurate motion while preventing increase in overhead. In the meantime, as the inter prediction method for the region B 500-b, the conventional inter prediction may be applied.

Figure 19:
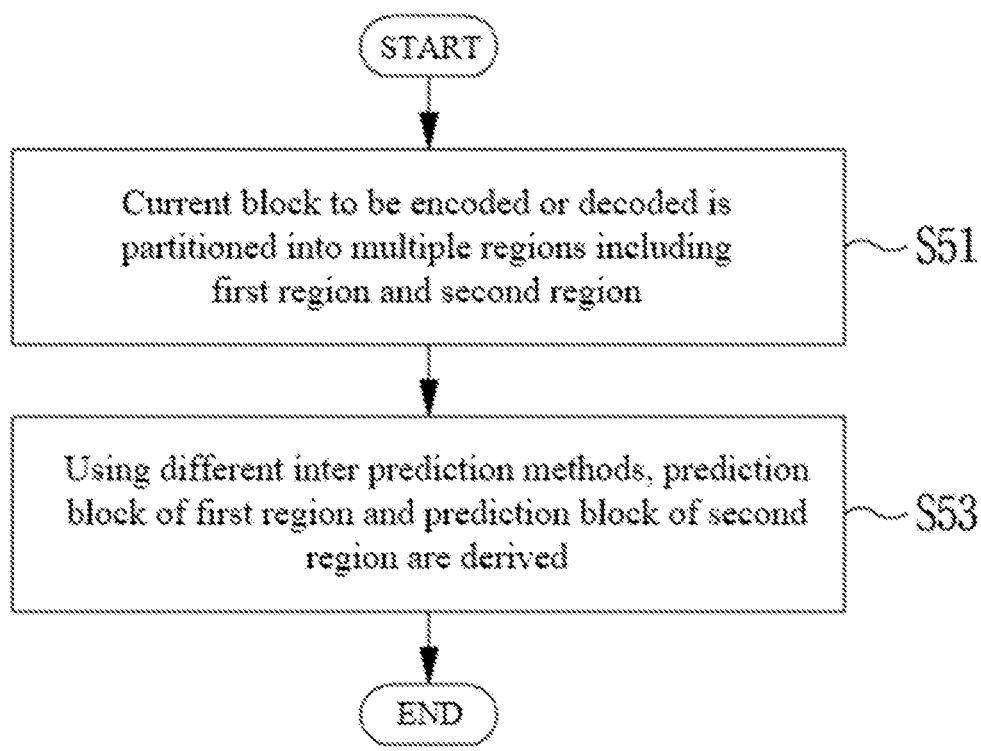
FIG. 19 is a flowchart illustrating an inter prediction method according to the third exemplary embodiment of the present invention.

FIG. 19 is a flowchart illustrating an inter prediction method according to a third exemplary embodiment of the present invention.

Inter prediction according to the embodiment may be performed by the inter prediction module 103 of the image encoding device 100 or by the inter prediction module 408 of the image decoding device 400. The reference images used in inter prediction are stored in the memory 112 of the image encoding device 100 or the memory 408 of the image decoding device 400. The inter prediction module 103 or the inter prediction module 408 may generate, with reference to the reference image stored in the memory 112 or the memory 406, the prediction block of the region A 500-a and the prediction block of the region B 500-b within the current block.

First, as shown in FIG. 18, the current block to be encoded or decoded is partitioned into multiple regions including a first region and a second region at step S51. Here, the first region and the second region may correspond to the region A 500-a and the region B 500-b shown in FIG. 5, respectively. The current block 500 shown in FIG. 18 is partitioned into two regions, the region A 500-a and the region B 500-b, but may be partitioned into three or more regions and may be partitioned into regions in various sizes and/or shapes.

Next, using different inter prediction methods, a prediction block of the first region and a prediction block of the second region are obtained at step S53. Here, the inter prediction method for the region A 500-a may be, as described above, the method in which motion estimation and motion compensation using the reconstructed pixel region C 503 are performed. As the inter prediction method for the region B 500-b, the conventional inter prediction may be applied.

As in the embodiment, a method in which the current block is partitioned into multiple regions and the prediction blocks of the respective regions are derived using different inter prediction methods is referred to as a mixed inter prediction.

Figure 20:
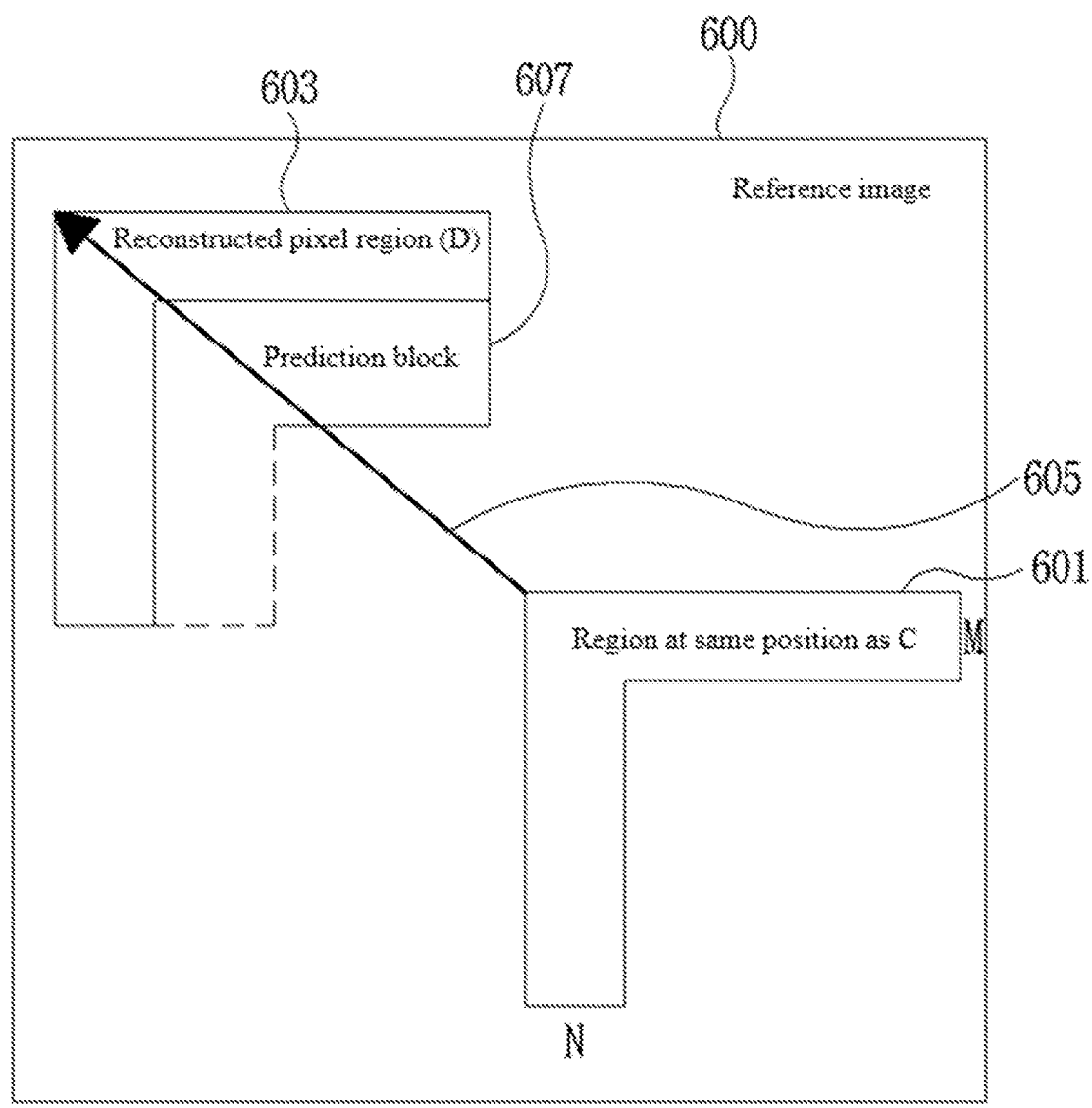
FIG. 20 is a diagram illustrating an example of motion estimation and motion compensation using a reconstructed pixel region.

FIG. 20 is a diagram illustrating an example of motion estimation and motion compensation using a reconstructed pixel region.

Referring to FIG. 20, a reference image 600 is searched for a region matched with the reconstructed pixel region C 503 shown in FIG. 18. As shown in FIG. 20, when a reconstructed pixel region D 603 that is most similar to the reconstructed pixel region C 503 is determined, a displacement between a region 601, which is at the same position as the reconstructed pixel region C 503, and the reconstructed pixel region D 603 is selected as the motion vector 605 of the region A 500-a.

That is, the motion vector 605 estimated using the reconstructed pixel region C 503 is selected as the motion vector of the region A 500-a of the current block. Using the motion vector 605, the prediction block of the region A 500-a is generated.

In the meantime, as shown in FIGS. 7a to 7c, the reconstructed pixel region C 503 may be in various shapes and/or sizes. Also, it is possible that the upper and left sides of the reconstructed pixel region are separated for use. Also, it is possible that the reconstructed pixel region is used by being subjected to subsampling. In this method, only the decoded information around the current block is used to derive the motion information, and thus it is not necessary to transmit the motion information from the encoding device 100 to the decoding device 400.

According to the embodiment of the present invention, the decoding device 400 also performs motion estimation, so that if motion estimation is performed on the entire reference image, the complexity may extremely increase. Therefore, by transmitting the search range on a per-block basis or in the parent header or by fixing the search range to be the same in the encoding device 100 and in the decoding device 400, computational complexity of the decoding device 400 may be reduced.

In the meantime, when estimating and encoding the motion vector of the region B 500-b shown in FIG. 18, the motion information of the decoded block within the reconstructed pixel region C 503 is used to predict the motion vector of the region B 500-b and the residual vector corresponding to the difference between the motion vector of the region B 500-b and the prediction motion vector is encoded.

Alternatively, it is possible that the motion vector 605 estimated as the motion vector of the region A 500-a is used to predict the motion vector of the region B 500-b and the residual vector is encoded.

Alternatively, it is possible that the motion vector of the decoded block within the reconstructed pixel region C 503 and the estimated motion vector 605 of the region A 500-a are used to constitute a motion vector prediction set, the motion vector of the region B 500-*b* is predicted, and the residual vector is encoded.

Alternatively, it is possible that among the blocks adjacent to the current block, motion information is taken from a preset position to perform block merging. Here, block merging means that neighboring motion information is intactly applied to a block to be encoded. Here, it is also possible that after setting several preset positions, an index indicating at which position block merging is performed is used.

Further, possibly, the size of the region B 500-*b* is encoded by the encoding device 100 to be transmitted to the decoder on a per-block basis or through the parent header, or uses the same preset value or ratio in the encoding device 100 and the decoding device 400.

Figure 21:
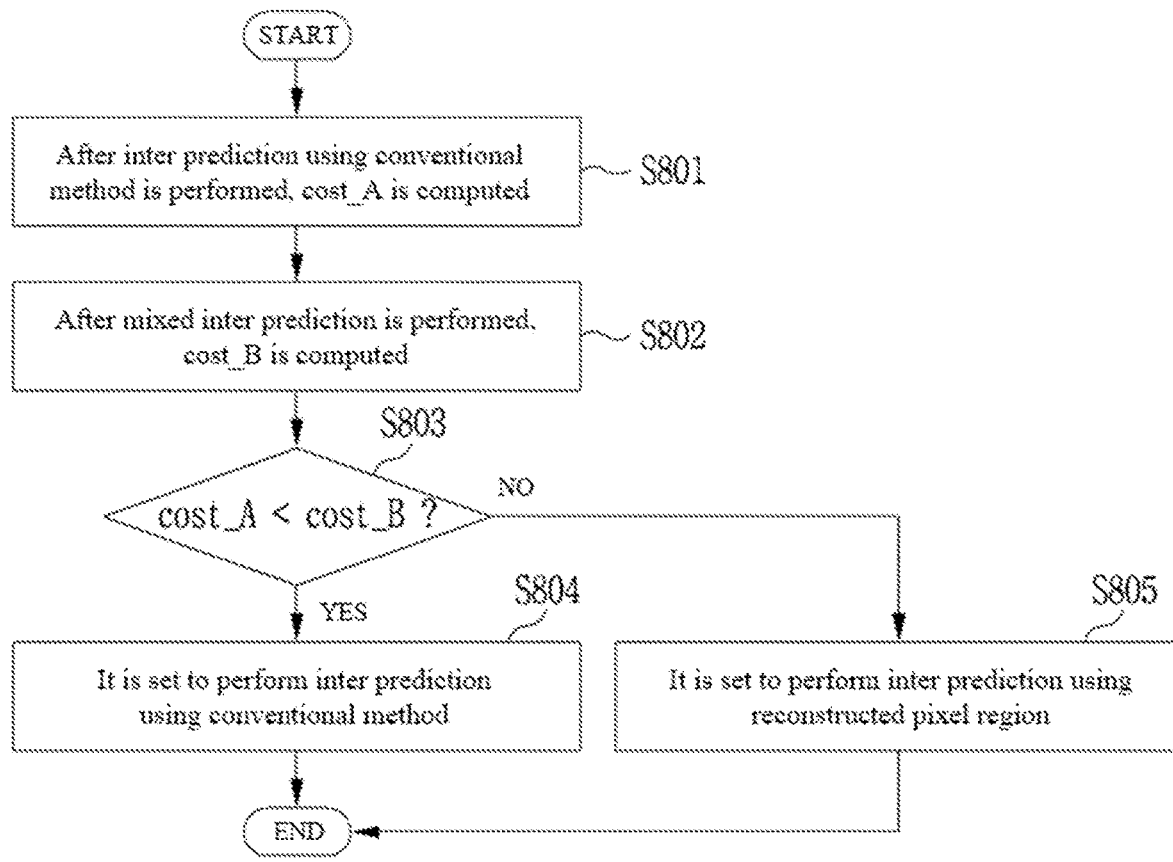
FIG. 21 is a flowchart illustrating a process of determining an inter prediction method according to an embodiment of the present invention.

FIG. 21 is a flowchart illustrating a process of determining an inter prediction method according to an embodiment of the present invention. Among the mixed inter prediction according to the present invention and the conventional inter prediction method, the optimum method may be determined through rate-distortion optimization (RDO). The process shown in FIG. 21 may be performed by the image encoding device 100.

Referring to FIG. 21, first, inter prediction is performed using the conventional method to compute cost_A at step S801, and as described above, the mixed inter prediction according to the present invention, the current block is partitioned into at least two regions to be subjected to inter prediction individually, is performed to compute cost_B at step S802.

Afterward, cost_A and cost_B are computed to determine which method is optimum to use, at step S803. When cost_A is lower, it is set to perform the inter prediction using the conventional method at step S804. Otherwise, it is set to perform the mixed inter prediction at step S805.

Figure 22:
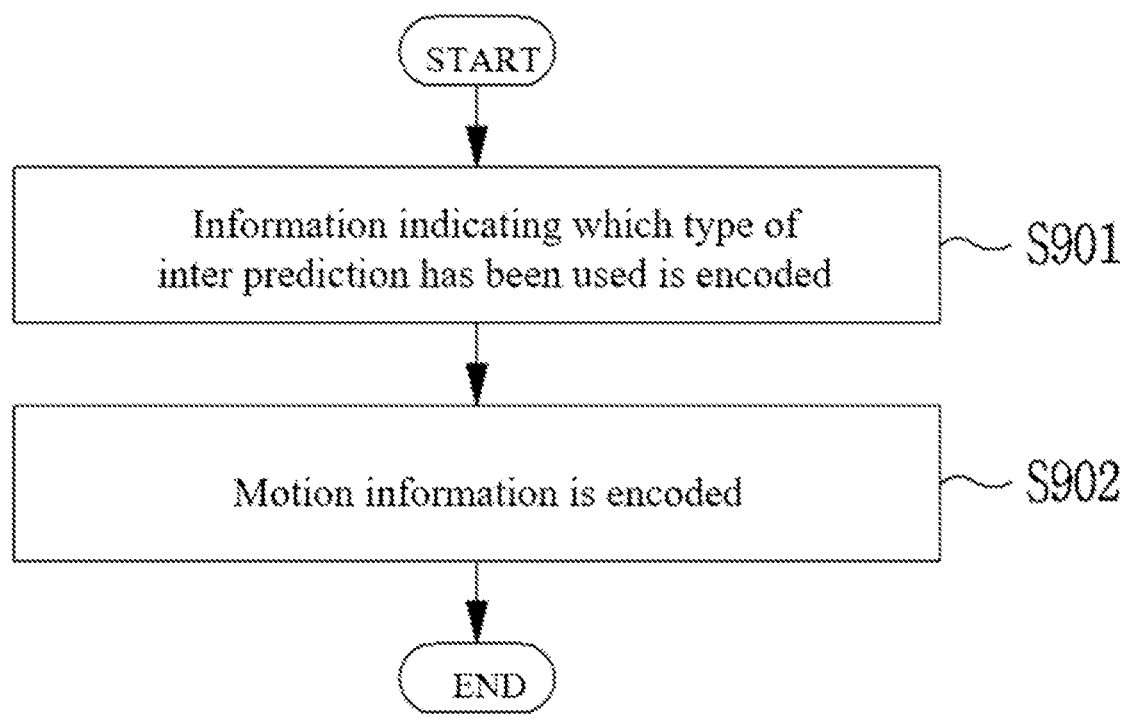
FIG. 22 is a diagram illustrating a process of transmitting, to an image decoding device, information that indicates an inter prediction method.

FIG. 22 is a diagram illustrating a process of transmitting, to the decoding device 400, information that indicates the inter prediction method determined by the process shown in FIG. 21.

Information indicating which type of inter prediction has been used for the block to be currently encoded is encoded at step S901. This information may be, for example, a 1-bit flag or one of several indexes. Afterward, the motion information is encoded at step S902, and the algorithm ends.

Alternatively, the information indicating whether or not the mixed inter prediction according to the embodiment of the present invention is used may be generated in the parent header first and then may be encoded. That is, when in the parent header, the information indicating whether or not the mixed inter prediction is used indicates true, the information indicating which type of inter prediction has been used for the block to be currently encoded is encoded. When the information indicating whether or not the mixed inter prediction is used indicates false, the information indicating which type of inter prediction has been used is not present within the bitstream, and in this case, the current block is not partitioned into multiple regions and the current block is predicted using the conventional inter prediction.

In the meantime, regarding the parent header, the parent header including the information indicating whether or not the mixed inter prediction is used may be transmitted by being included in a block header, a slice header, a tile header, a picture header, or a sequence header.

Figure 23:
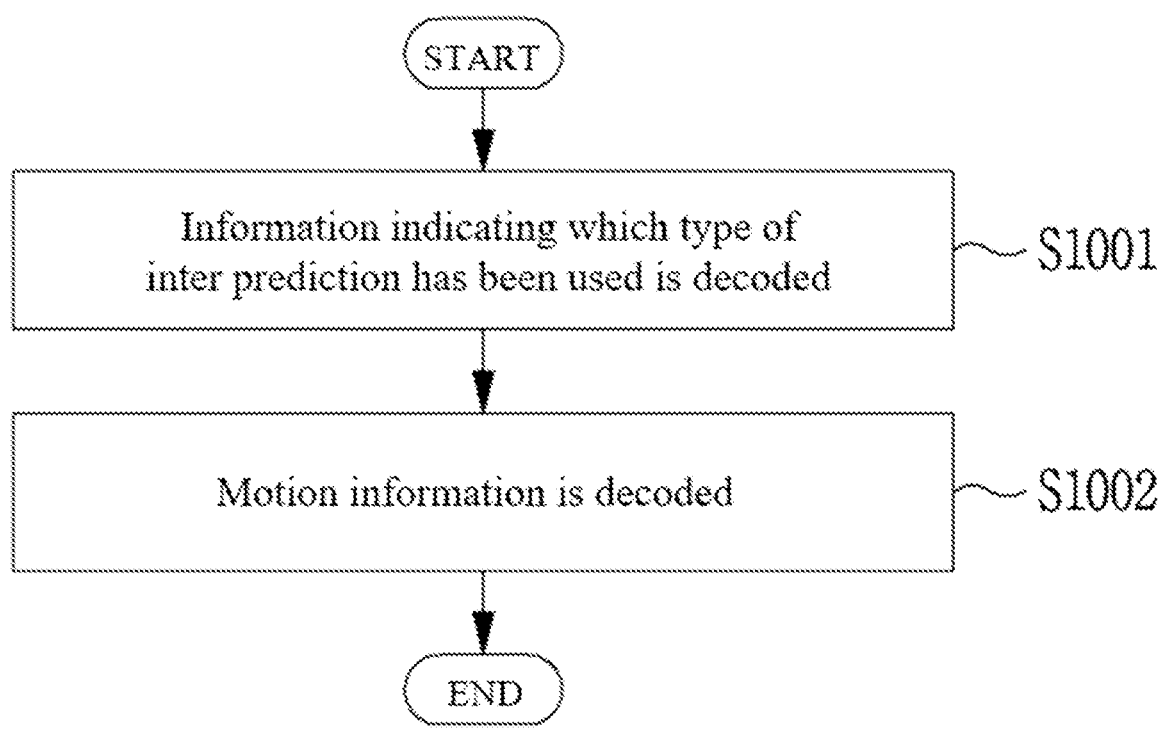
FIG. 23 is a diagram illustrating a process of decoding information that indicates which type of inter prediction has been used.

FIG. 23 is a diagram illustrating a process of decoding information encoded in the manner shown in FIG. 21, namely, the information indicating which type of inter prediction has been used for the block to be currently encoded.

The decoding device 400 decodes the information indicating which type of inter prediction has been used for the block to be currently encoded, at step S1001, decodes the motion information at step S1002, and ends the algorithm.

In the case where the information indicating whether or not the mixed inter prediction is used is present in the parent header of the bitstream, when the information indicating whether or not the mixed inter prediction is used indicates true, the information indicating which type of inter prediction has been used for the block to be currently encoded is present in the bitstream. When the information indicating whether or not the mixed inter prediction is used indicates false, the information indicating which type of inter prediction has been used is not present within the bitstream, and in this case, the current block is not partitioned into multiple regions and the current block is predicted using the conventional inter prediction.

The parent header including the Information indicating whether or not the mixed inter prediction is used may be a block header, a slice header, a tile header, a picture header, or a sequence header. In the parent header, the information indicating whether or not the mixed inter prediction is used may be transmitted by being included in a block header, a slice header, a tile header, a picture header, or a sequence header.

Figure 24:
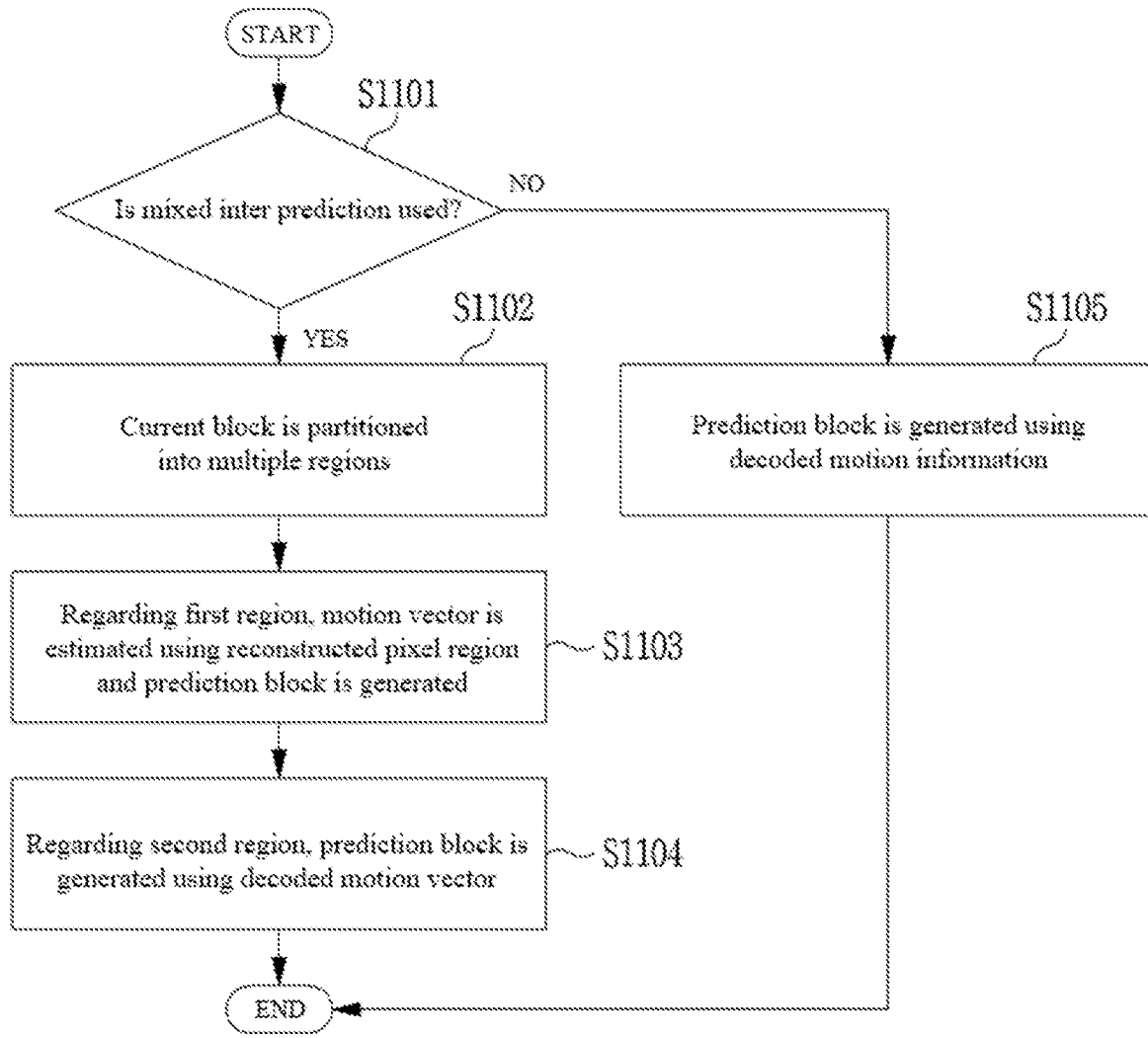
FIG. 24 is a flowchart illustrating a method of generating an inter prediction block by using information that indicates which type of inter prediction has been used.

FIG. 24 is a flowchart Illustrating a method of generating an inter prediction block by using the information indicating which type of inter prediction has been used. The method shown in FIG. 24 may be performed by the decoding device 400.

First, it is determined at step S1101 whether or not the information indicating which type of inter prediction has been used indicates use of the mixed inter prediction. When the mixed inter prediction is used for the current block to be decoded, the current block is partitioned into multiple regions at step S1102. For example, the current block may be partitioned into the region A 500-*a* and the region B 500-*b* as shown in FIG. 5.

Here, it is possible that that the size of each region resulting from the partitioning is signaled from the encoding device 100 to the decoding device 400 on a per-block basis or through the parent header or is set to a preset value.

Afterward, according to the method shown in FIG. 20, a motion vector of a first region, for example, the region A 500-*a*, is estimated, and a prediction block is generated at step S1103.

Next, regarding a second region, for example, the region B 500-*b*, the decoded motion vector is used to generate a prediction block at step S1104, and the algorithm ends.

When the information indicating which type of inter prediction has been used indicates that the mixed inter prediction is not used or when the information, included in the parent header, indicating whether or not the mixed inter prediction is used indicates false, the conventional inter prediction is applied as the prediction method of the current block 500. That is, the decoded motion information is used to generate the prediction block of the current block 500 at step S1105, and the algorithm ends. The size of the prediction block is the same as the size of the current block 500 to be decoded.

Fourth Exemplary Embodiment

Hereinafter, the fourth exemplary embodiment of the present invention will be described with reference to the drawings. The fourth exemplary embodiment relates to a method to reduce blocking artifacts that may occur at the boundary of the block when the mixed inter prediction according to the third exemplary embodiment is performed.

Figure 25:
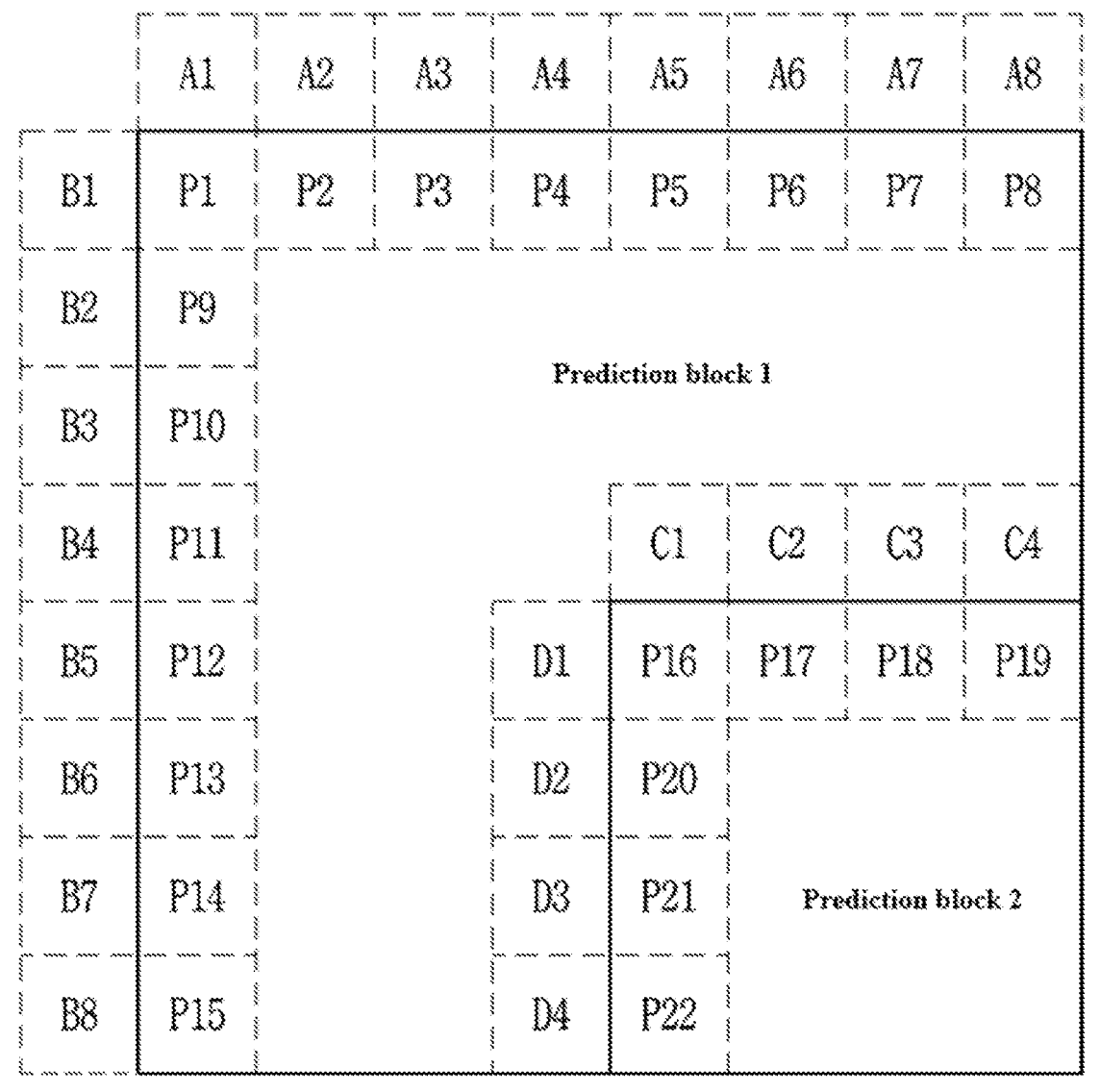

FIG. 25 is a diagram illustrating a method of reducing blocking artifacts that may occur when the mixed inter prediction according to the present invention is performed. Prediction block 1 and prediction block 2 shown in FIG. 25 may correspond to the prediction block of the region A 500-*a* and the prediction block of the region B 500-*b* shown in FIG. 18, respectively.

To summarize the fourth exemplary embodiment of the present invention, first, the regions positioned at the boundaries of the prediction block are partitioned into sub-blocks in a predetermined size. Afterward, the motion information of the sub-block around the sub-block of the prediction block is applied to the sub-block of the prediction block so that a new prediction block is generated. Afterward, a weighted sum of the sub-block of the prediction block and the new prediction block is obtained so that the final sub-block of the prediction block is generated. This is referred to as overlapped block motion compensation (OBMC).

Figure 26:
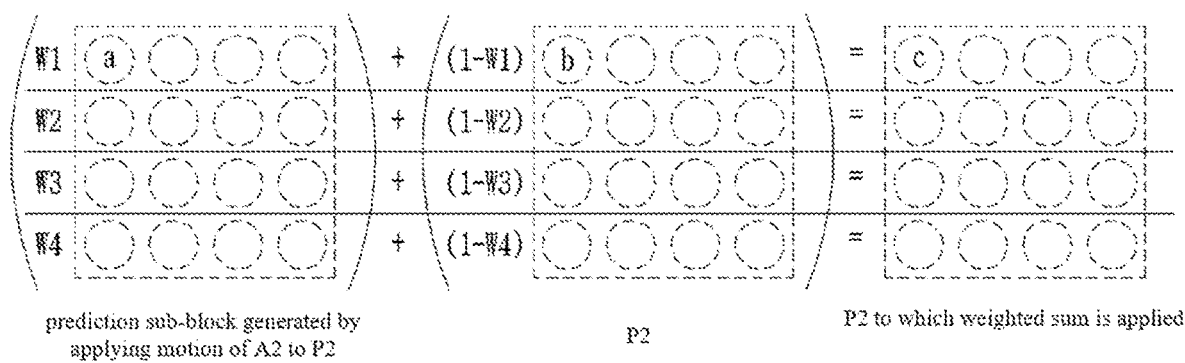
FIG. 26 is a diagram illustrating a method of applying a weighted sum of a sub-block within a prediction block and a sub-block adjacent to the upper side thereof.

Referring to FIG. 25, in the case of a sub-block P2 present in the prediction block 1 in FIG. 25, the motion information of the neighboring sub-block A2 is applied to the sub-block P2 to generate a new prediction block of the sub-block P2, and then the weighted sum is applied as shown in FIG. 26 to generate the final sub prediction block.

For convenience of description, it is assumed that the size of each sub-block shown in FIG. 25 is 4×4; that there are the prediction block 1, eight sub-blocks A1 to A8 adjacent to the upper side thereof, and eight sub-blocks B1 to B8 adjacent to the left side thereof; and that there are the prediction block 2, four sub-blocks C1 to C4 adjacent to the upper side thereof, and four sub-blocks D1 to D8 adjacent to the left side thereof.

For convenience of description, although the horizontal and vertical lengths of each sub-block are assumed to be four, other various values may be encoded on a per-block basis or through the parent header and may be then signaled to the decoding device 400. Accordingly, the encoding device 100 and the decoding device 400 may set the size of the sub-block to be the same. Alternatively, it is possible that the encoding device 100 and the decoding device 400 use sub-blocks in a preset same size.

FIG. 26 is a diagram illustrating a method of applying a weighted sum of the sub-block within the prediction block and the sub-block adjacent to the upper side thereof.

Referring to FIG. 26, the final prediction pixel c is generated using Equation below.

$$c = W1 \times a + (1 - W1) \times b \quad \text{[Equation 5]}$$

In addition to the prediction pixel c, the remaining 15 pixels may be computed in a manner similar to the above. P2 to P8 in FIG. 13 are replaced by new prediction pixels to which the weighted sum is applied through the process shown in FIG. 26.

Figure 27:
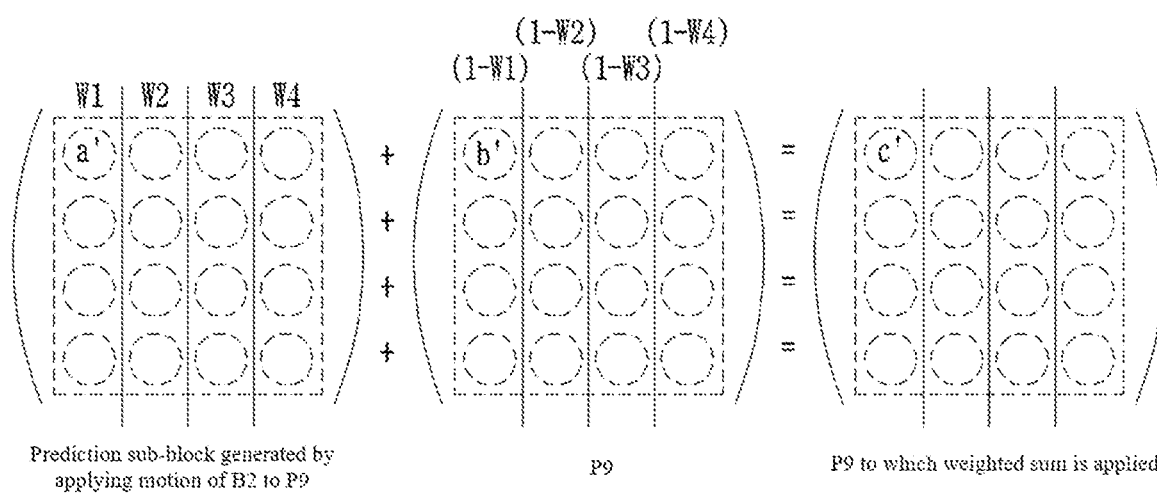
FIG. 27 is a diagram illustrating a method of applying a weighted sum of a sub-block within a prediction block and a sub-block adjacent to the left side thereof.

FIG. 27 is a diagram illustrating a method of applying a weighted sum of a sub-block within a prediction block and a sub-block adjacent to the left side thereof. The sub-blocks P9 to P15 are replaced by new prediction pixel values to which the weighted sum is applied as shown in FIG. 27.

Referring to FIG. 26, the same weighting factors are applied to the pixels on a per-row basis, and referring to FIG. 27, the same weighting factors are applied to the pixels on a per-column basis.

In the case of the sub-block P1 in FIG. 25, the weighted sum with the pixels within the neighboring sub-block A1 is performed as shown in FIG. 26, and then the weighted sum with the pixels within the sub-block 81 is performed as shown in FIG. 27, thereby obtaining final prediction values.

Also in the case of the su-blocks P16 to P22 present in the prediction block 2 shown in FIG. 25, the weighted sum calculation method shown in FIG. 26 or FIG. 27 is used to obtain the final prediction values. Here, the neighboring sub-blocks used for the weighted sum are C1 to C4 or D1 to D4.

In the meantime, not only the pixel values of the sub-blocks P16 to P22 are replaced, but also the pixel values of the neighboring sub-blocks C1 to C4, D1 to D4 may be replaced by new values through the weighted sum calculation. For example, in the case of the sub-block C2, the motion information of the sub-block P17 is applied to the sub-block C2 to generate a prediction sub-block, and then the pixel values within the prediction sub-block and the pixel values of the sub-block C2 are subjected to the weighted sum so that the pixel values of the sub-block C2 to which the weighted sum is applied is generated.

Figure 28:
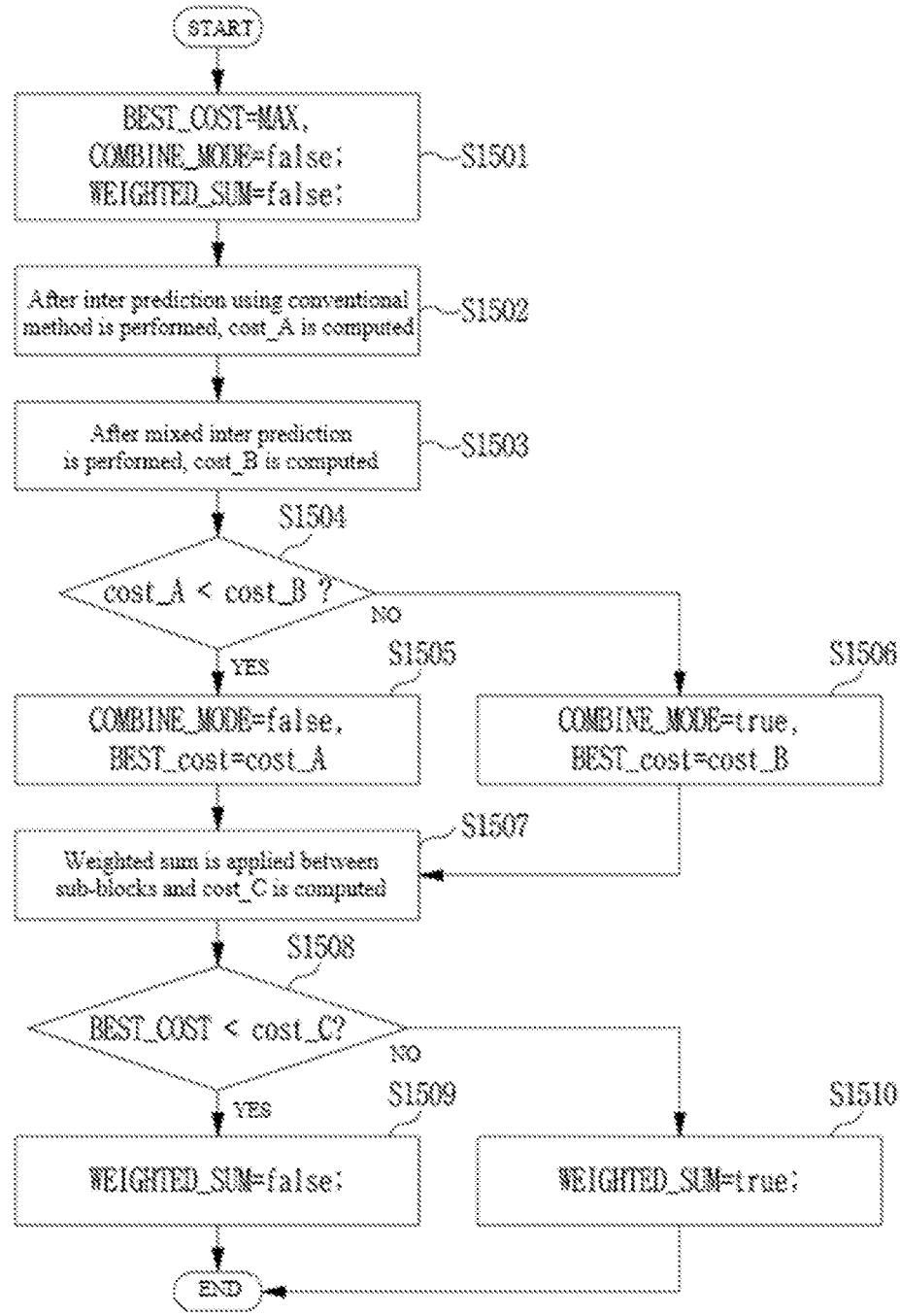
FIG. 28 is a flowchart illustrating a process of determining whether or not a weighted sum is applied between sub-blocks.

FIG. 28 is a flowchart illustrating a process of determining whether or not the weighted sum is applied between sub-blocks at the boundary of the block, when the mixed inter prediction according to the present invention is performed.

The variable BEST_COST storing the optimum cost is initialized to the maximum value, COMBINE_MODE storing whether or not the mixed inter prediction is used is initialized to false, and WEIGHTED_SUM storing whether or not the weighted sum is used between sub-blocks is initialized to false at step S1501. Afterward, inter prediction using the conventional method is performed, and then cost_A is computed at step S1502. The mixed inter prediction is performed, and then cost_B is computed at step S1503 After comparing the two costs at step S1504, when the value of cost_A is lower, COMBINE_MODE is set to false to indicate that the mixed inter prediction is not used and BEST_COST stores cost_A at step S1505.

When the value of cost_B is lower, COMBINE_MODE is set to true to indicate that the mixed inter prediction is used and BEST_COST stores cost_B at step S1506. Afterward, the weighted sum is applied between the sub-blocks and cost_C is computed at step S1507. After comparing BEST_COST with cost_C at step S1508, when BEST_COST is lower than cost_C, the variable WEIGHTED_SUM is set to false to indicate that the weighted sum is not applied between the sub-blocks at step S1509. Otherwise, the variable WEIGHTED_SUM is set to true to indicate that the weighted sum is applied between the sub-blocks at step S1510 and the algorithm ends.

Figure 29:
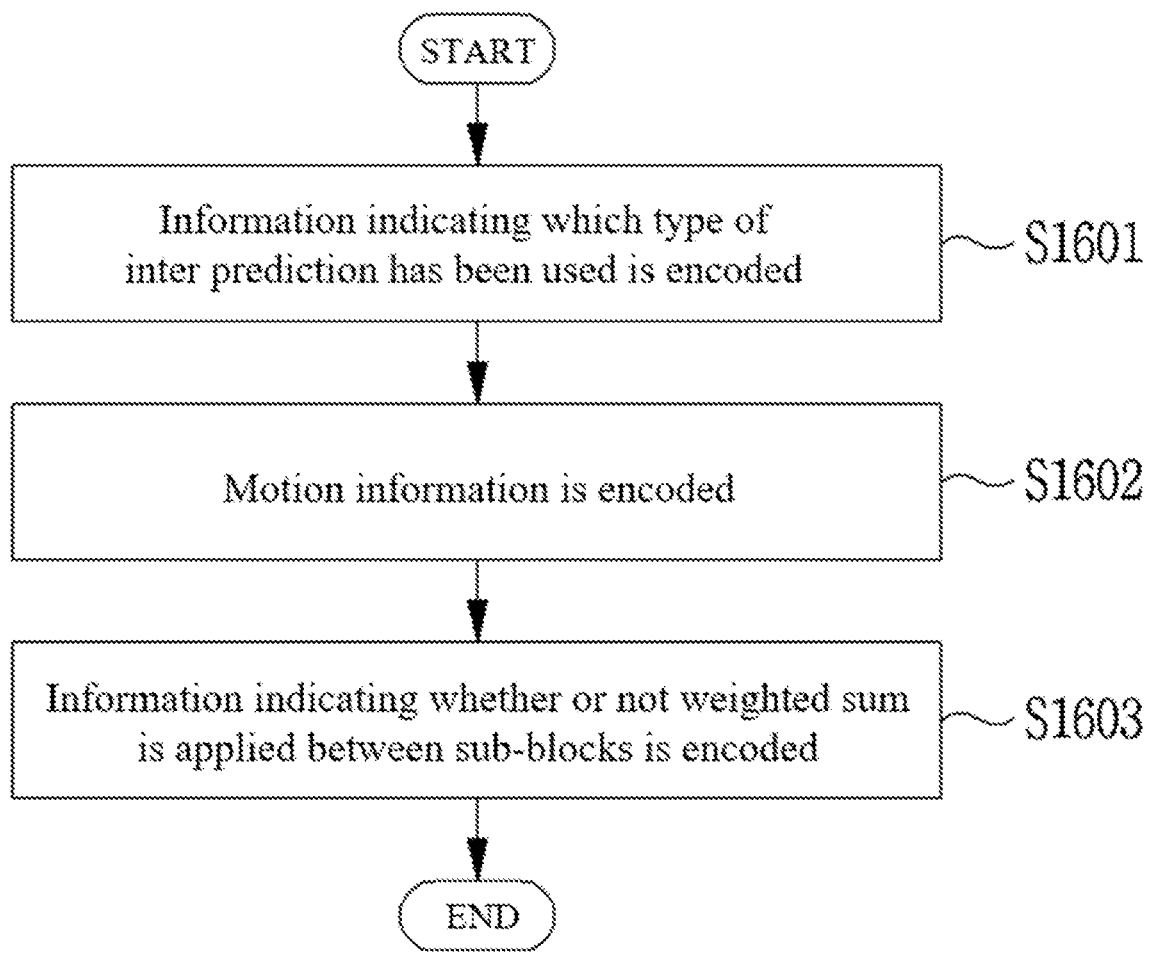
FIG. 29 is a flowchart illustrating a process of encoding information that indicates whether or not a weighted sum is applied between sub-blocks.

FIG. 29 is a flowchart illustrating a process of encoding information determined by the method in FIG. 27, namely, information indicating whether or not a weighted sum is applied between sub-blocks. The process shown in FIG. 29 may be performed by the image encoding device 100. First, the encoding device 100 encodes the information indicating which type of inter prediction has been used at step S1601, and encodes the motion information at step S1602. Afterward, the information indicating whether or not the weighted sum is applied between the sub-blocks is encoded at step S1603.

When the information indicating whether or not the mixed inter prediction is used is present in the parent header of the bitstream, and when the information indicating whether or not the mixed inter prediction is used indicates true, the information indicating whether or not the weighted sum is applied between the sub-blocks is encoded and then included in the bitstream. However, when the information, included in the parent header, indicating whether or not the mixed inter prediction is used indicates false, the information indicating whether or not the weighted sum is applied between the sub-blocks is not present within the bitstream.

Figure 30:
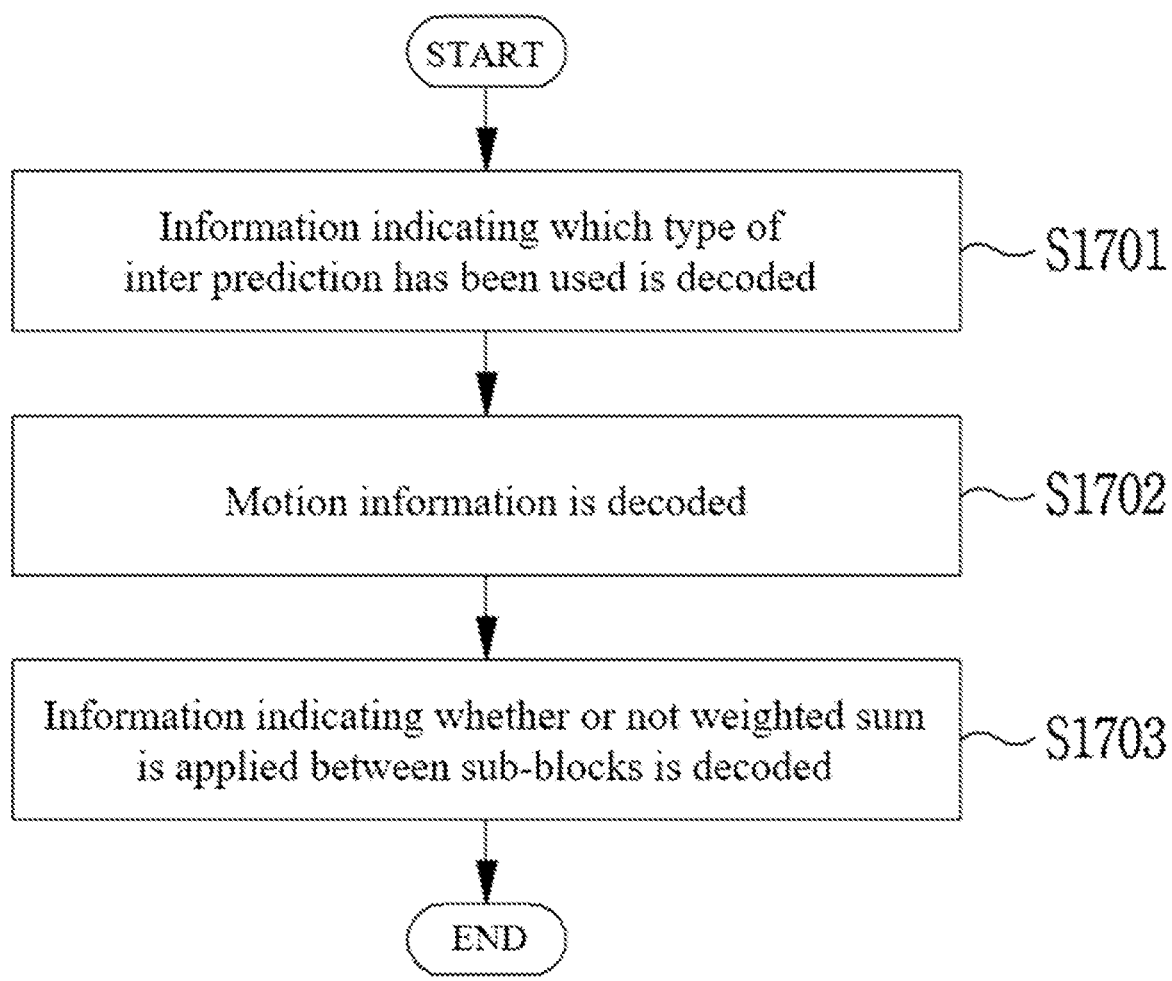
FIG. 30 is a flowchart illustrating a process of decoding information that indicates whether or not a weighted sum is applied between sub-blocks.

FIG. 30 is a flowchart illustrating a process of decoding information indicating to whether or not a weighted sum is applied between sub-blocks. The process shown in FIG. may be performed by the image decoding device 400. First, the decoding device 400 decodes the information indicating which type of inter prediction has been used at step S1701, and decodes the motion information at step S1702. Afterward, the information indicating whether or not the weighted sum is applied between the sub-blocks is decoded at step S1703.

When the information indicating whether or not the mixed inter prediction is used is present in the parent header of the bitstream, and when the information indicating whether or not the mixed inter prediction is used indicates true, the information indicating whether or not the weighted sum is applied between the sub-blocks is encoded and then included in the bitstream.

However, when the information, included in the parent header, indicating whether or not the mixed inter prediction is used indicates false, the information indicating whether or not the weighted sum is applied between the sub-blocks is not present within the bitstream. In this case, it may be inferred that the Information indicating whether or not the weighted sum is applied between the sub-blocks indicates that the weighted sum is not applied between the sub-blocks.

Fifth Exemplary Embodiment

Figure 31B:
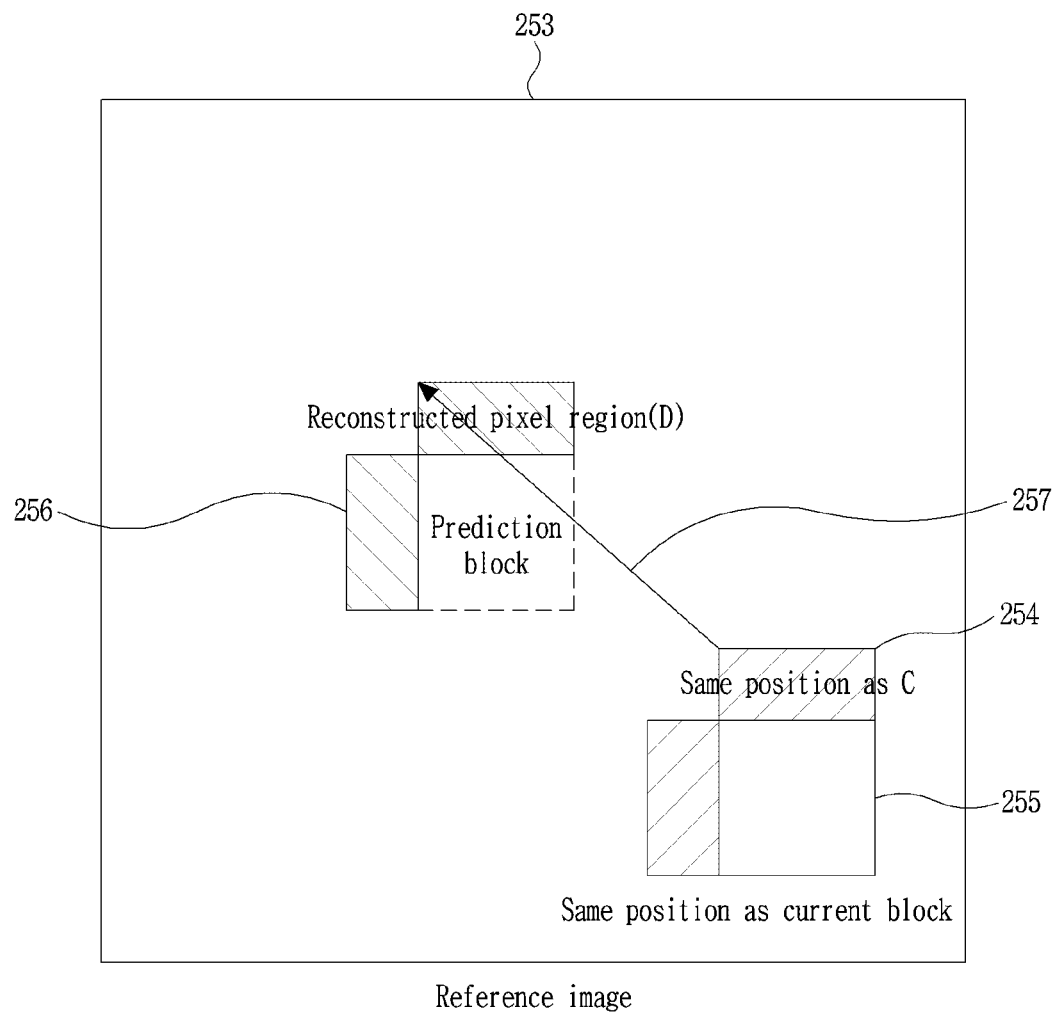

FIGS. 31a and 31b are diagrams illustrating inter prediction using a reconstructed pixel region according to the fifth exemplary embodiment of the present invention. In the inter prediction using the reconstructed pixel region according to the present invention, particularly, the reconstructed pixel region may be used to derive the motion vector of the current block.

FIG. 31a shows a current block 252 to be encoded or decode and a pre-reconstructed pixel region C 251 as a region adjacent to the current block 252. The reconstructed pixel region C 251 includes two regions, regions at the left side and the upper side of the current block 252. The current block 252 and the reconstructed pixel region C 251 are included within the current image 250. The current image 250 may be a picture, a slice, a tile, a coding tree block, a coding block, or other image regions. The reconstructed pixel region C 251 may correspond to a reconstructed pixel region after being encoded before encoding of the current block 252 in terms of encoding, and may correspond to a pre-reconstructed pixel region before decoding of the current block 252 in terms of decoding.

Before encoding or decoding of the current block, the reconstructed pixel region C 251 neighbors the current block 252, and thus the image encoding device 100 and the image decoding device 400 may use the same reconstructed pixel region C 251. Therefore, without encoding the motion information of the current block 252 by the image encoding device 100, the reconstructed pixel region C 251 is used such that the image encoding device 100 and the image decoding device 400 may generate the motion information of the current block 252 and the prediction block in the same manner.

Figure 32:
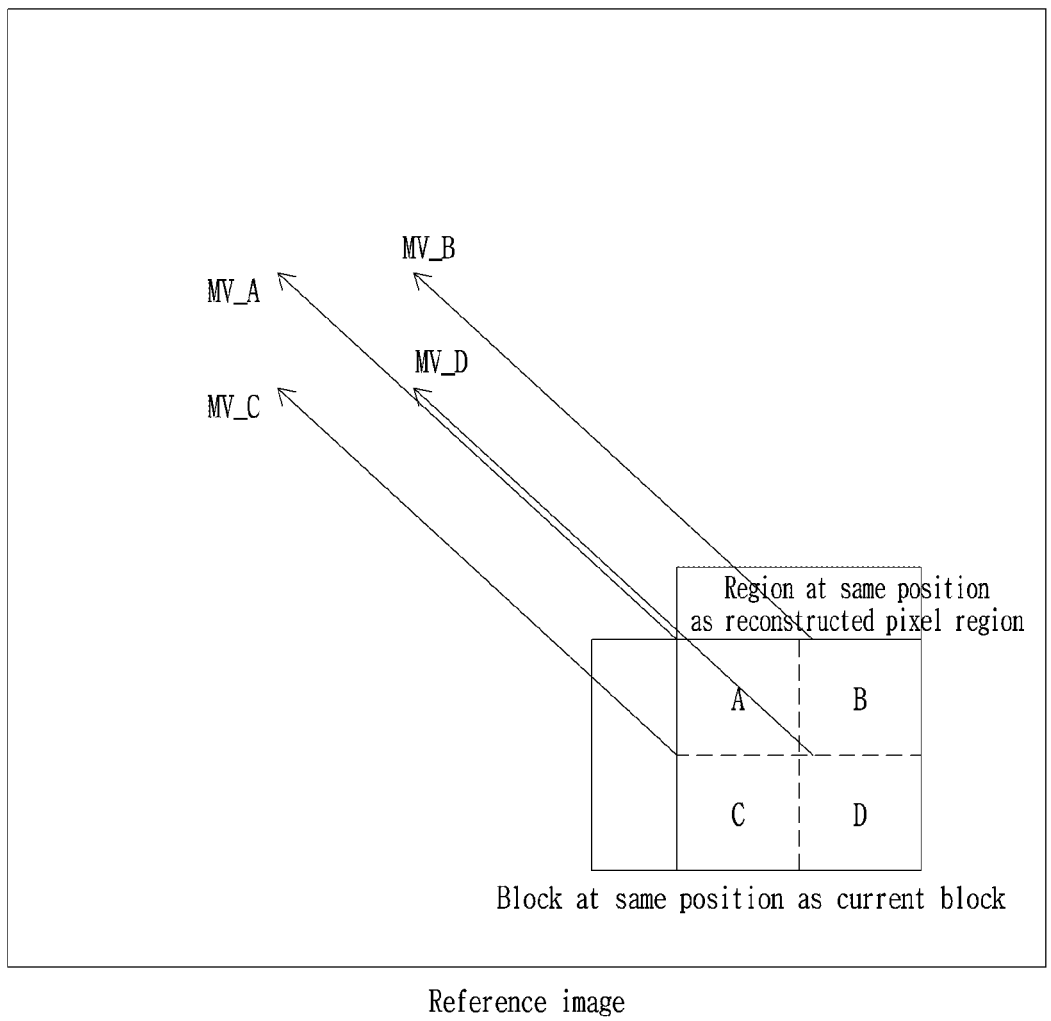
FIG. 32 is a diagram illustrating an example of a case where motion estimation is further performed on a current block on a per-sub-block basis.

FIG. 31b shows an example of motion estimation and motion compensation using a reconstructed pixel region. A reference image 253 shown in FIG. 31b is searched for a region matched with the reconstructed pixel region C 251 shown in FIG. 31a. When a reconstructed pixel region D 256 that is most similar to the reconstructed pixel region C 251 is determined, a displacement between a region 254, which is at the same position as the reconstructed pixel region C 251, and the reconstructed pixel region D 258 is determined to be a motion vector 257 of the reconstructed pixel region C 251. The motion vector 257 determined as described above is selected as the motion vector of the current block 252, and a prediction block of the current block 252 may be derived using the motion vector 257, FIG. 32 is a diagram illustrating an example of a case where the motion vector 257 estimated as shown in FIG. 31b is set as an initial motion vector, the current block 252 is partitioned into multiple sub-blocks A to D. and then motion estimation is further performed on a per-sub-block basis.

The sub-blocks A to D may be in an arbitrary size. MV_A to MV_D shown in FIG. 32 are the initial motion vectors of the sub-blocks A to D, respectively, and are the same as the motion vector 257 shown in FIG. 31b.

The size of each sub-block may be encoded on a per-block basis or through the parent header and may be transmitted to the decoding device 400. Alternatively, it is possible that the encoding device 100 and the decoding device 400 use the same preset size value of the sub-block.

In the meantime, as shown in FIGS. 7a to 7c, the reconstructed pixel region C 251 may be in various shapes and/or sizes. Also, it is possible that the reconstructed pixel regions at the upper side and the left side of the current block are used as the reconstructed pixel region C or that as shown in FIGS. 31a to 31b, the two regions are combined into a single piece to be used as the reconstructed pixel region C 251. Also, it is possible that the reconstructed pixel region C 251 is used by being subjected to subsampling.

Here, for convenience of description, the description is given assuming that the reconstructed pixel region C 251 as shown in FIGS. 31a and 31b is used as a reconstructed pixel region.

Figure 33:
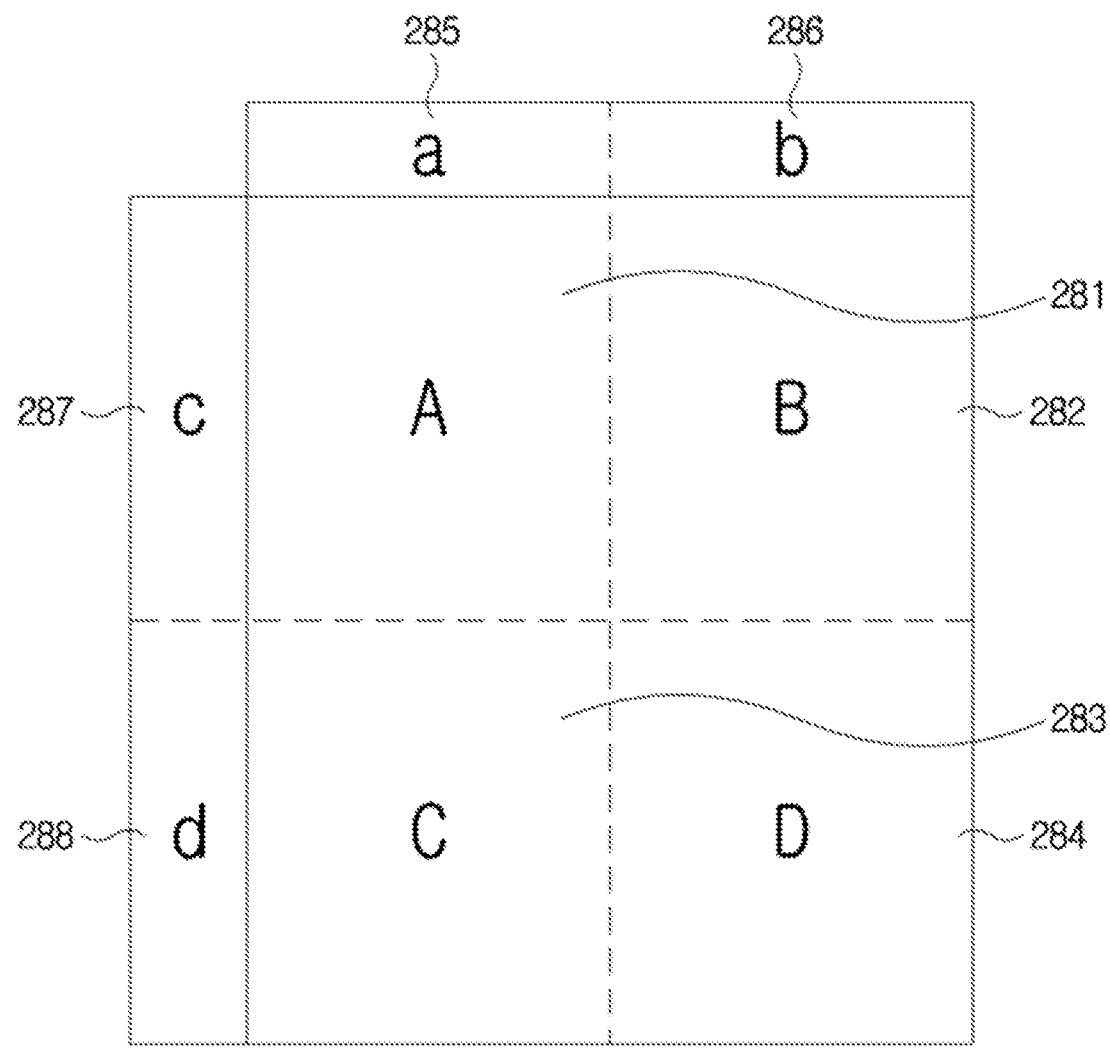
FIG. 33 is a diagram illustrating an example in which a reconstructed pixel region and a current block are partitioned on a per-sub-block basis.

FIG. 33 is a diagram illustrating an example in which the reconstructed pixel region C 251 and the current block are partitioned on a per-sub-block basis. Referring to FIG. 33, the reconstructed pixel region C 251 is partitioned into sub-blocks a 285, b 286, c 287, and d 288, and the current block is partitioned in to sub-blocks A 281, B 282, C 283, and D 284.

As the reconstructed pixel regions for the sub-block A 281, the sub-blocks a 285 and c 287 may be used. As the reconstructed pixel regions for the sub-block B 282, the sub-blocks b 288 and c 287 may be used. As the reconstructed pixel regions for the sub-block C 283, the sub-blocks a 285 and d 288 may be used. As the reconstructed pixel regions for the sub-block D 284, the sub-blocks b 286 and d 288 may be used.

Figure 34:
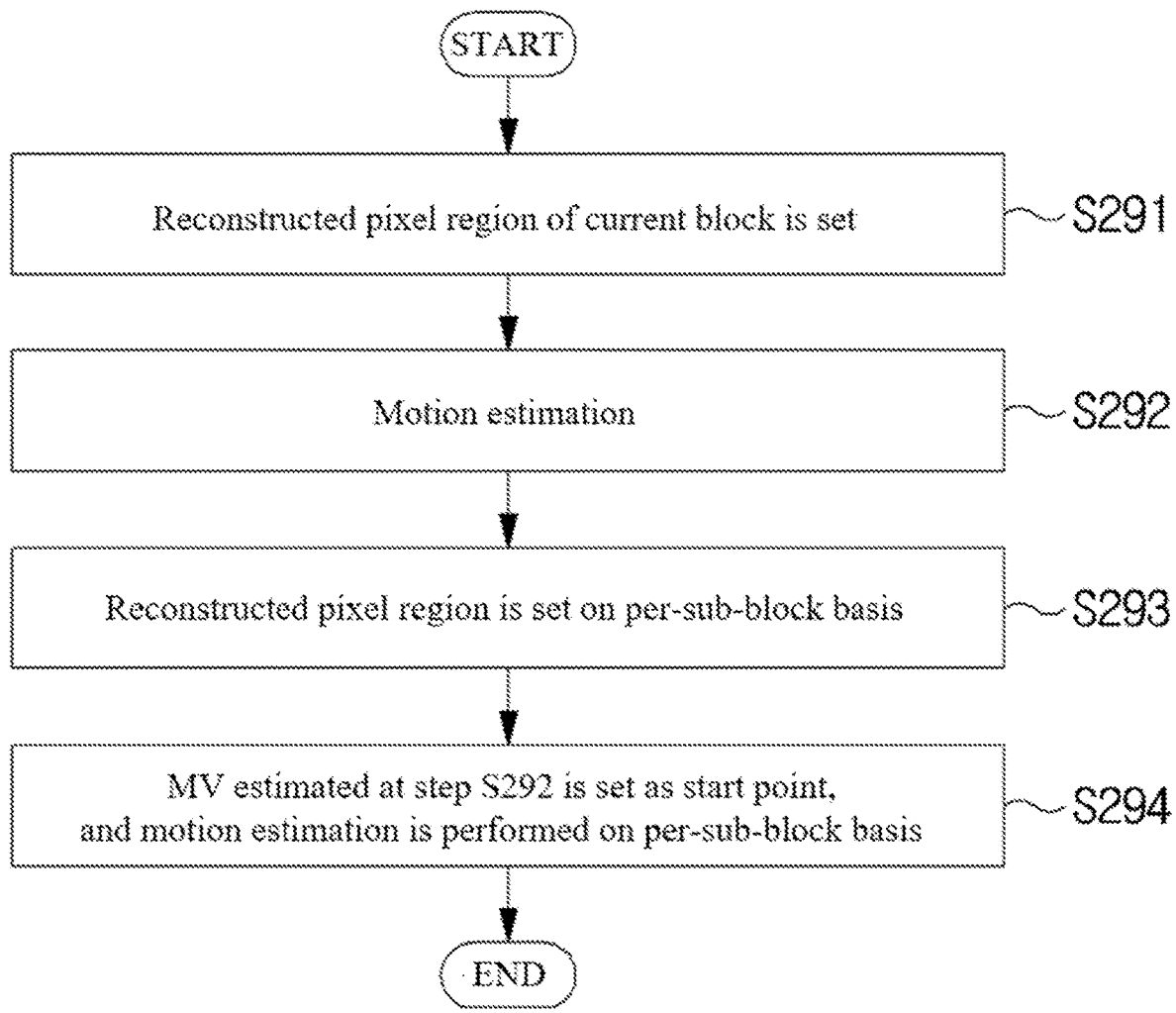
FIG. 34 is a flowchart illustrating an example of an inter prediction method using a reconstructed pixel region.

FIG. 34 is a flowchart illustrating an example of an inter prediction method using a reconstructed pixel region. Referring to FIGS. 31a and 31b, the reconstructed pixel region 251 of the current block 252 is set at step S291, and then the reconstructed pixel region 251 is used to perform motion estimation on the reference image 253 at step S292. As the result of the motion estimation, the motion vector 257 of the reconstructed pixel region 251 is obtained. Afterward, as shown in FIG. 33, the reconstructed pixel region is set on a per-sub-block basis at step S293, the motion vector 257 estimated at step S292 is set as a start point, and then motion is estimated on a per-sub-block basis of the current block at step S294.

Figure 35:
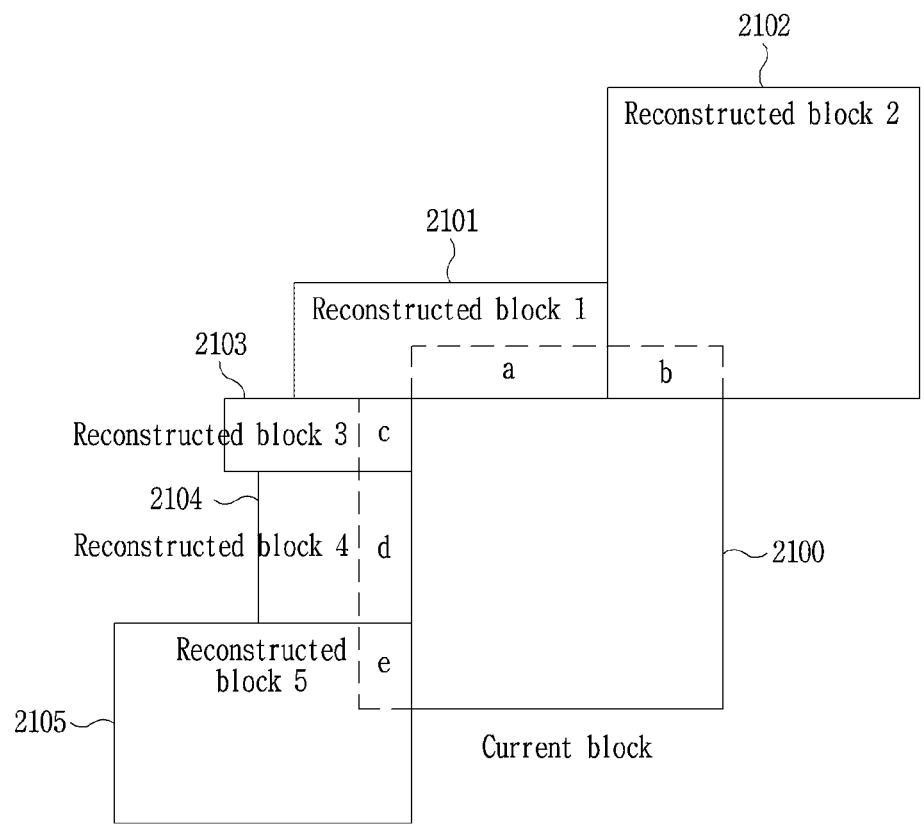
FIG. 35 is a diagram illustrating an example in which reconstructed blocks neighboring a current block are used to partition a reconstructed pixel region into sub-blocks according to the present invention.

FIG. 35 is a diagram illustrating an example of partitioning a reconstructed pixel region into sub-blocks by using reconstructed blocks neighboring a current block according to the present invention.

According to the embodiment of the present invention, the reconstructed neighboring pixel region used for prediction of the current block may be partitioned on the basis of a partitioning structure of reconstructed neighboring blocks. In other words, on the basis of at least one among the number of the reconstructed neighboring blocks, the sizes of the reconstructed neighboring blocks, the shapes of the reconstructed neighboring blocks, and the boundaries between the reconstructed neighboring blocks, the reconstructed pixel region may be partitioned.

Referring to FIG. 35, there are reconstructed block 1 2101 to reconstructed block 5 2105 around the current block 2100 to be encoded or decoded. When the reconstructed pixel region is set as shown in FIG. 5a, efficiency in motion estimation may decrease due to the dramatic difference in pixel values, which may be present at each of the boundaries of the reconstructed block 1 2101 to the reconstructed block 5 2105. Therefore, as shown in FIG. 35, it may be efficient to partition the reconstructed pixel region into sub-blocks a to e for use. Depending on how the pre-reconstructed blocks around the current block 2100 are partitioned, the reconstructed pixel region shown in FIG. 35 may be partitioned.

Specifically, the number of reconstructed neighboring blocks may be considered in partitioning of the reconstructed pixel region. Referring to FIG. 35, two reconstructed blocks, the reconstructed block 1 2101 and the reconstructed block 2 2102, are present at the upper side of the current block 2100. Three reconstructed blocks, the reconstructed block 3 2103 to the reconstructed block 5 2105, are present at the left side of the current block 2100. Considering this point, the reconstructed pixel region at the upper side of the current block 2100 is partitioned into two sub-blocks, the sub-blocks a and b. The reconstructed pixel region at the left side of the current block 2100 is partitioned into three sub-blocks, the sub-blocks c to e.

Alternatively, the sizes of the reconstructed neighboring blocks may be considered in partitioning of the reconstructed pixel region. For example, the height of the sub-block c of the reconstructed pixel region at the left side of the current block 2100 is the same as that of the reconstructed block 3 2103. The height of the sub-block d is the same as that of the reconstructed block 4 2104. The height of the sub-block e corresponds to a value obtained by subtracting the height of the sub-block c and the height of the sub-block d from the height of the current block 2100.

Alternatively, the boundaries between the reconstructed neighboring blocks may be considered in partitioning of the reconstructed pixel region. Considering the boundary between the reconstructed block 1 2101 and the reconstructed block 2 2102 at the upper side of the current block 2100, the reconstructed pixel region at the upper side of the current block 2100 is partitioned into two sub-blocks, the sub-blocks a and b. Considering to the boundary between the reconstructed block 3 2103 and the reconstructed block 4 2104 and the boundary between the reconstructed block 4 2104 and the reconstructed block 5 2105 at the left side of the current block 2100, the reconstructed pixel region at the left side of the current block 2100 is partitioned into three sub-blocks, the sub-blocks c to e.

In the meantime, there may be various conditions with respect to which region of the sub-blocks a to e is used to perform motion estimation. For example, it is possible that motion estimation is performed using only one reconstructed pixel region having the largest area, or it is possible that m reconstructed pixel regions from the top and n reconstructed pixel regions from the left side are selected according to the priority and used for motion estimation. Alternatively, it is also possible that a filter such as a low-pass filter is applied between the sub-blocks a to e to relieve the dramatic difference in pixel values and then one reconstructed pixel region 251 as shown in FIG. 5a is used.

Figure 36:
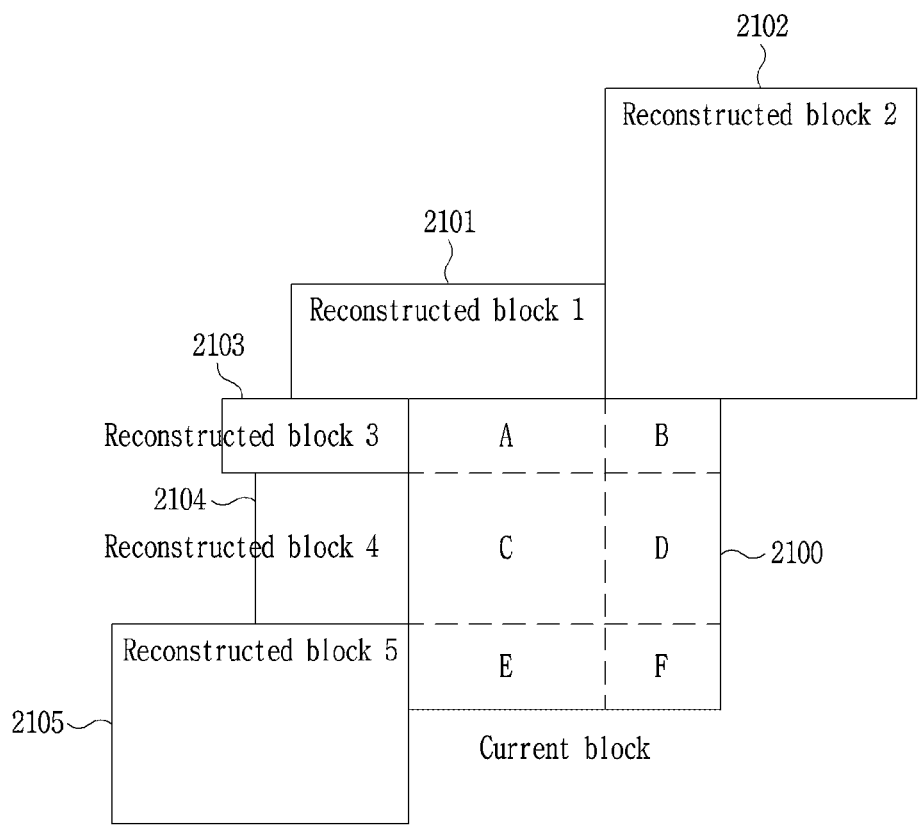

FIG. 36 is a diagram illustrating an example of partitioning a current block into multiple sub-blocks by using reconstructed blocks neighboring the current block according to the present invention.

The method of partitioning the current block shown in FIG. 36 into multiple sub-blocks is similar to the method of partitioning the reconstructed pixel region shown in FIG. 35. That is, the current block to be encoded or decoded may be partitioned on the basis of a partitioning structure of reconstructed neighboring blocks. In other words, on the basis of at least one among the number of the reconstructed neighboring blocks, the sizes of the reconstructed neighboring blocks, the shapes of the reconstructed neighboring blocks, and the boundaries between the reconstructed neighboring blocks, the current block may be partitioned.

The current block shown in FIG. 36 is partitioned into multiple sub-blocks A to F. Inter prediction may be performed on a per-sub-block basis, wherein the sub-blocks result from the partitioning. Here, inter prediction may be performed using reconstructed regions a and c in FIG. 10 for the sub-block A, using reconstructed regions b and c for the sub-block B, using reconstructed regions a and d for the sub-block C, using reconstructed regions b and d for the sub-block D, using reconstructed regions a and e for the sub-block E, and using reconstructed regions b and a for the sub-block F.

Alternatively, it is possible that priority is set depending on the sizes of the sub-blocks and the reconstructed pixel regions. For example, in the case of the sub-block A shown in FIG. 36, because the length is longer than the height, it is possible that the reconstructed region a has priority over the reconstructed region c and inter prediction is performed only using the reconstructed region a. Alternatively, conversely, it is possible that the reconstructed region c has priority depending on the situation, such as image characteristics, and the like.

Figure 37:
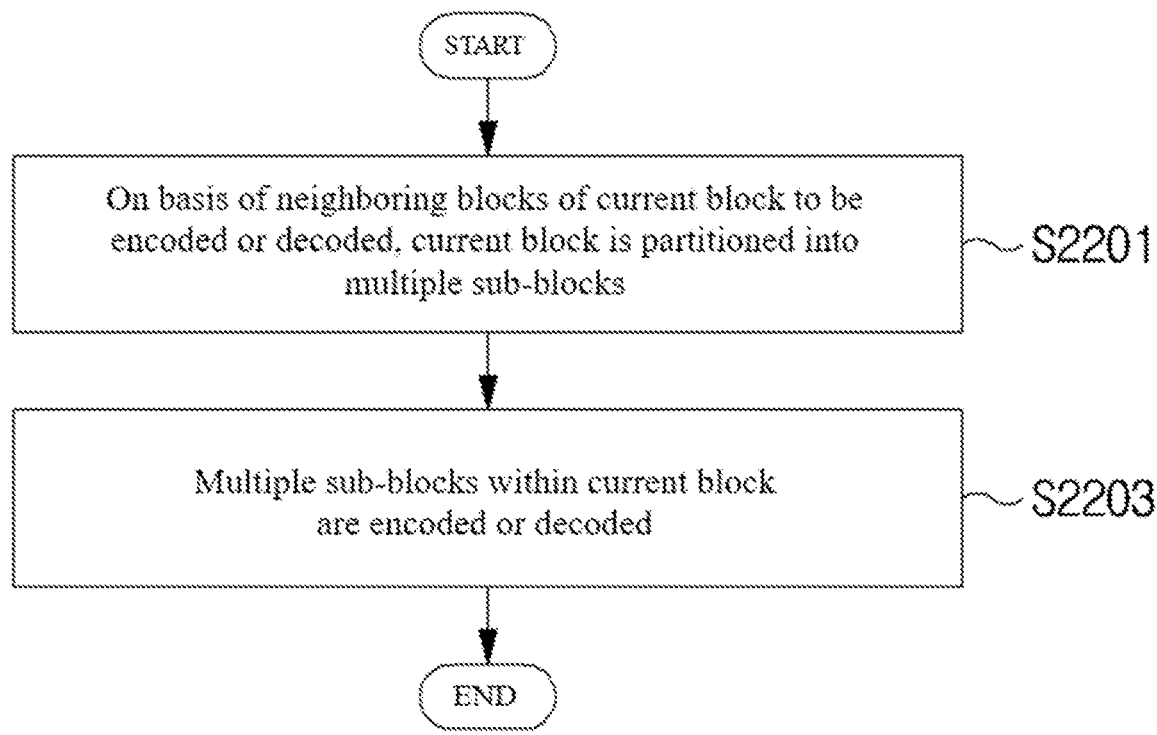
FIG. 37 is a flowchart Illustrating a method of partitioning a current block into multiple sub-blocks according to an embodiment of the present invention.

FIG. 37 is a flowchart illustrating a method of partitioning a current block into multiple sub-blocks according to an embodiment of the present invention.

Referring to FIG. 37, first, on the basis of the neighboring blocks of the current block to be encoded or decoded, the current block is partitioned into multiple sub-blocks at step S2201. The neighboring blocks of the current block are pre-reconstructed blocks as shown in FIG. 36. As described above referring to FIG. 36, the current block to be encoded or decoded may be partitioned on the basis of a partitioning structure of reconstructed neighboring blocks. That is, on the basis of at least one among the number of the reconstructed neighboring blocks, the sizes of the reconstructed neighboring blocks, the shapes of the reconstructed neighboring blocks, and the boundaries between the reconstructed neighboring blocks, the current block may be partitioned.

Next, multiple sub-blocks within the current block are encoded or decoded at step S2203. According to the embodiment of the present invention, as described above, each of the sub-blocks A to F of the current block shown in FIG. 36 may be encoded or decoded using inter prediction. Here, inter prediction may be performed using reconstructed regions a and c in FIG. 35 for the sub-block A, using reconstructed regions b and c for the sub-block B, using reconstructed regions a and d for the sub-block C, using reconstructed regions b and d for the sub-block D, using reconstructed regions a and e for the sub-block E, and using reconstructed regions b and e for the sub-block F. Information related to inter prediction, such as sub_block information indicating whether or not partitioning into sub-blocks is performed, which is obtained by performing inter prediction on each of the sub-blocks A to F, motion information, or the like, may be encoded or decoded.

The method shown in FIG. 37 may be performed by the inter prediction module 103 of the image encoding device 100 or by the inter prediction module 408 of the image decoding device 400. The reference images used in inter prediction are stored in the memory 112 of the image encoding device 100 or in the memory 406 of the image decoding device 400. The inter prediction module 103 or the inter prediction module 408 may generate, with reference to the reference image stored in the memory 112 or the memory 406, the prediction block of the current block 51.

Figure 38:
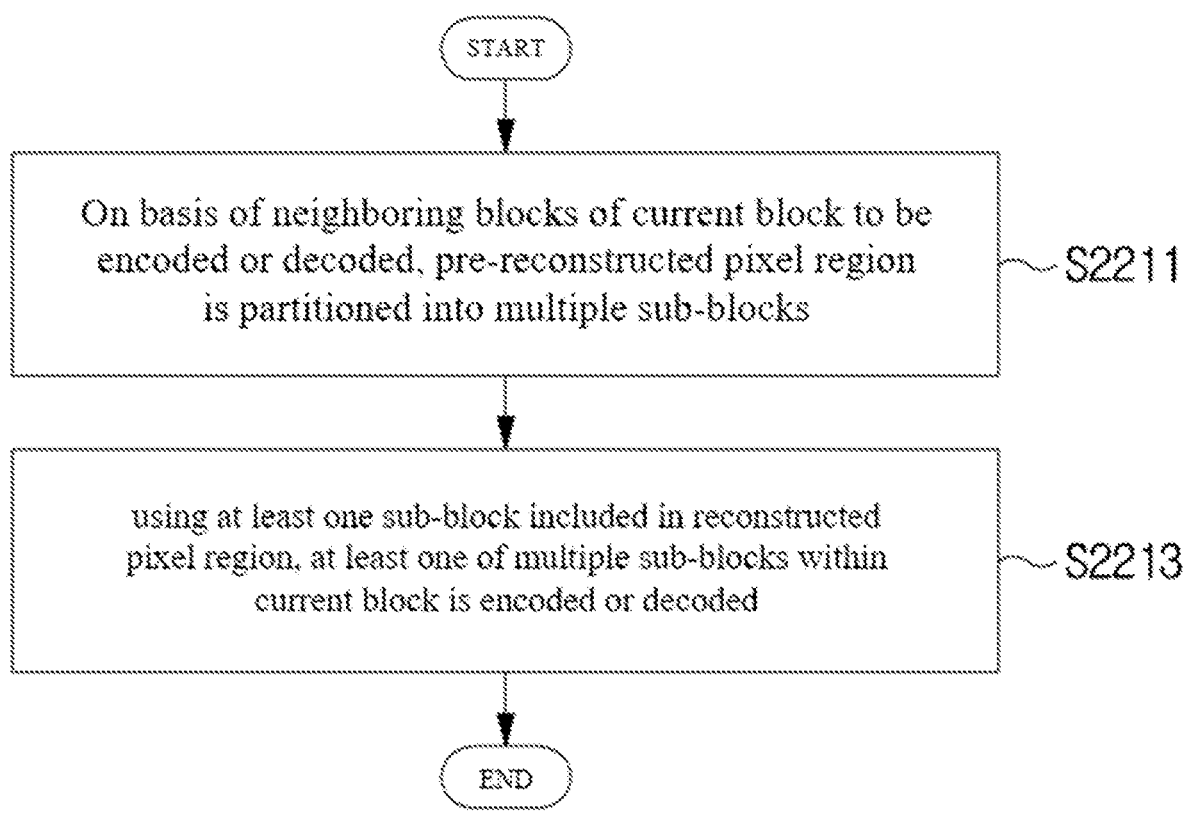
FIG. 38 is a diagram illustrating an example in which reconstructed blocks neighboring a current block are used to partition a current block into multiple sub-blocks according to the present invention.

FIG. 38 is a flowchart illustrating a method of partitioning a reconstructed region used in encoding or decoding of a current block into multiple sub-blocks according to an embodiment of the present invention.

Referring to FIG. 13, first, on the basis of the neighboring blocks of the current block to be encoded or decoded, the pre-reconstructed pixel region is partitioned into multiple sub-blocks at step S2211. As described above referring to FIG. 35 and/or FIG. 38, the reconstructed neighboring pixel region used for prediction of the current block may be partitioned on the basis of a partitioning structure of reconstructed neighboring blocks. In other words, on the basis of at least one among the number of the reconstructed neighboring blocks, the sizes of the reconstructed neighboring blocks, the shapes of the reconstructed neighboring blocks, and the boundaries between the reconstructed neighboring blocks, the reconstructed pixel region may be partitioned.

Next, using at least one sub-block included in the reconstructed pixel region, at least one among the multiple sub-blocks within the current block is encoded or decoded at step S2213. For example, as described above referring to FIG. 38, inter prediction may be performed using reconstructed regions a and c in FIG. 35 for the sub-block A, using reconstructed regions b and c for the sub-block B, using reconstructed regions a and d for the sub-block C, using reconstructed regions b and d for the sub-block D, using reconstructed regions a and e for the sub-block E, and using reconstructed regions b and e for the sub-block F. Information related to inter prediction, such as sub_block information indicating whether or not partitioning into sub-blocks is performed, which is obtained by performing inter prediction on each of the sub-blocks A to F, motion information, or the like, may be encoded or decoded.

The method shown in FIG. 38 may be performed by the inter prediction module 103 of the image encoding device 100 or by the inter prediction module 408 of the image decoding device 400. The reference images used in inter prediction is stored in the memory 112 of the image encoding device 100 or in the memory 406 of the image decoding device 400. The inter prediction module 103 or the inter prediction module 408 may generate, with reference to the reference image stored in the memory 112 or in the memory 406, the prediction block of the current block 51.

Figure 39:
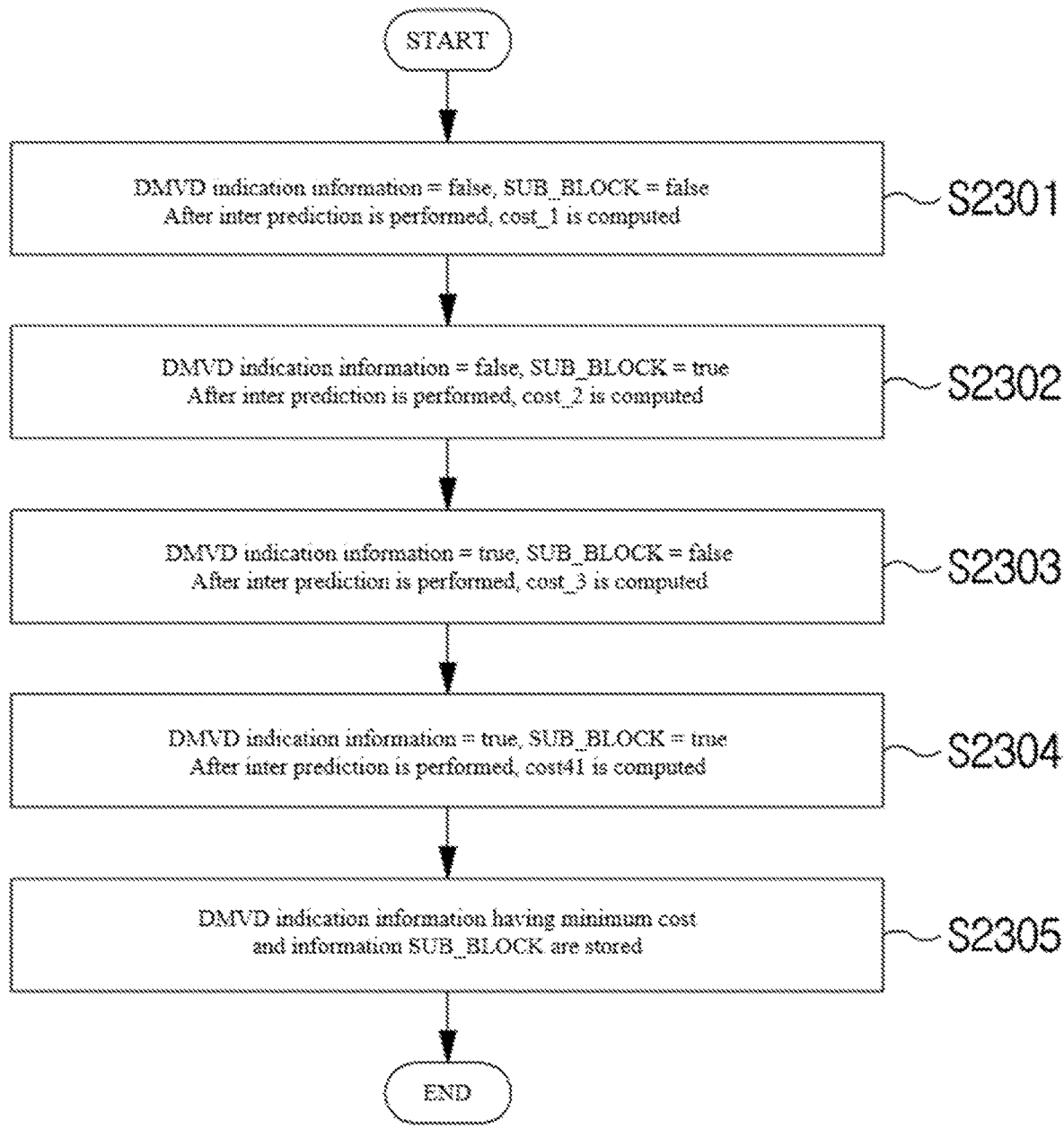
FIG. 39 is a flowchart illustrating an example of an inter prediction method using the sub-blocks of the current block partitioned as shown in FIG. 36.

FIG. 39 is a flowchart illustrating an example of an inter prediction method using the sub-blocks of the partitioned current block as shown in FIG. 36. The method shown in FIG. 39 may be performed by the inter prediction module 103 of the image encoding device 100.

First, two variables used in this method, DMVD indication information and SUB_BLOCK will be described. The decoder-side motion vector derivation (DMVD) indication information or decoder-side motion vector derivation indication information is information indicating whether the inter prediction using the conventional method is performed or the above-described inter prediction using the reconstructed pixel region according to the present invention is performed. When the DMVD indication information indicates false, it is indicates that the inter prediction using the conventional method is performed. When the DMVD indication information indicates true, it indicates that the inter prediction using the reconstructed pixel region according to the present invention is performed.

The variable SUB_BLOCK indicates whether or not the current block is partitioned into sub-blocks. When the value of SUB_BLOCK indicates false, it indicates that the current block is not partitioned into sub-blocks. Conversely, when the value of SUB_BLOCK indicates true, it indicates that the current block is partitioned into sub-blocks.

Referring to FIG. 39, first, the variable DMVD indication information, which indicates whether or not the inter prediction using the reconstructed pixel region is performed, is set to false and the variable SUB_BLOCK, which indicates whether or not partitioning into sub-blocks is performed, is set to false, and then inter prediction is performed on the current block and cost_1 is computed at step S2301.

Afterward. SUB_BLOCK is set to true and inter prediction is performed, and then cost_2 is computed at step S2302. Next, the DMVD indication information is set to true and SUB_BLOCK is set to false, and then inter prediction is performed and cost_3 is computed at step S2303. Last, the DMVD indication information and SUB_BLOCK are set to true, and then inter prediction is performed and cost_4 is computed at step S2304. The calculated cost_1 to cost_4 are compared with each other, and then the optimum inter prediction method is determined. The DMVD indication information and the SUB_BLOCK information related to the determined optimum inter prediction method are stored, and then the algorithm ends.

Figure 40:
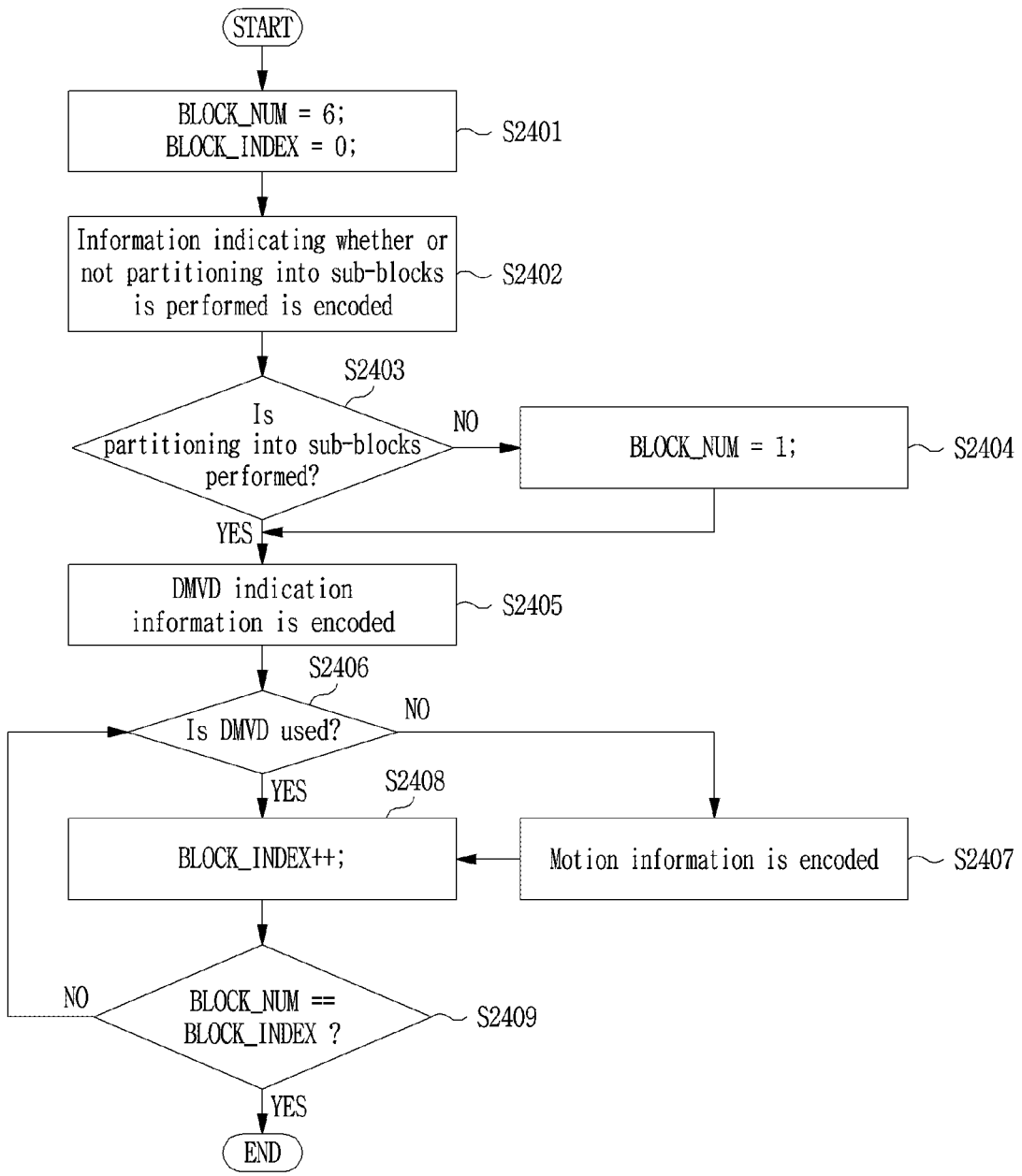
FIG. 40 is a flowchart illustrating a method of encoding information determined according to inter prediction shown in FIG. 39.

FIG. 40 is a flowchart illustrating a method of encoding information determined according to inter prediction shown in FIG. 39. The encoding method in FIG. 40 may be performed by the image encoding device 100.

In FIG. 36, the total number of sub-blocks of the current block is set to six, so that the variable BLOCK_NUM, which indicates the total number of sub-blocks to be encoded, is initialized to six and the variable BLOCK_INDEX, which indicates the index of the sub-block to be encoded, is initialized to zero at step S2401. Here, the current block is partitioned into the sub-blocks on the basis of the reconstructed blocks around the current block, so that it is not necessary to encode the number of the sub-blocks. The image decoding device 400 partitions the current block into the sub-blocks in the same manner as the image encoding device 100, so that the image decoding device 400 is capable of determining the number of the sub-blocks that may be present in the current block.

After step S2401, SUB_BLOCK, the information indicating whether or not the current block is partitioned into sub-blocks, is encoded at step S2402. Whether or not the current block is partitioned into the sub-blocks is determined at step S2403, and when the partitioning into the sub-blocks is not performed, the value of the variable BLOCK_NUM is changed into one at step S2404.

Afterward, the DMVD indication information indicating whether or not the inter prediction using the reconstructed pixel region has been used is encoded at step S2405. Whether or not the inter prediction using the reconstructed pixel region has been used is determined at step S2406, and when the inter prediction using the reconstructed pixel region has not been used, the motion information is encoded at step S2407 Conversely, when the inter prediction using the reconstructed pixel region has been used, the value of BLOCK_INDEX is increased at step S2408 and is compared with the variable BLOCK_NUM at step S2409. When the value of BLOCK_INDEX is the same as the value of BLOCK_NUM, this means that there is no more sub-block to be encoded in the current block, so that the algorithm ends. When the two values differ, proceeding to the subsequent sub-block to be encoded, which is present within the current block, takes place and then the process repeats from step S2408.

Figure 41:
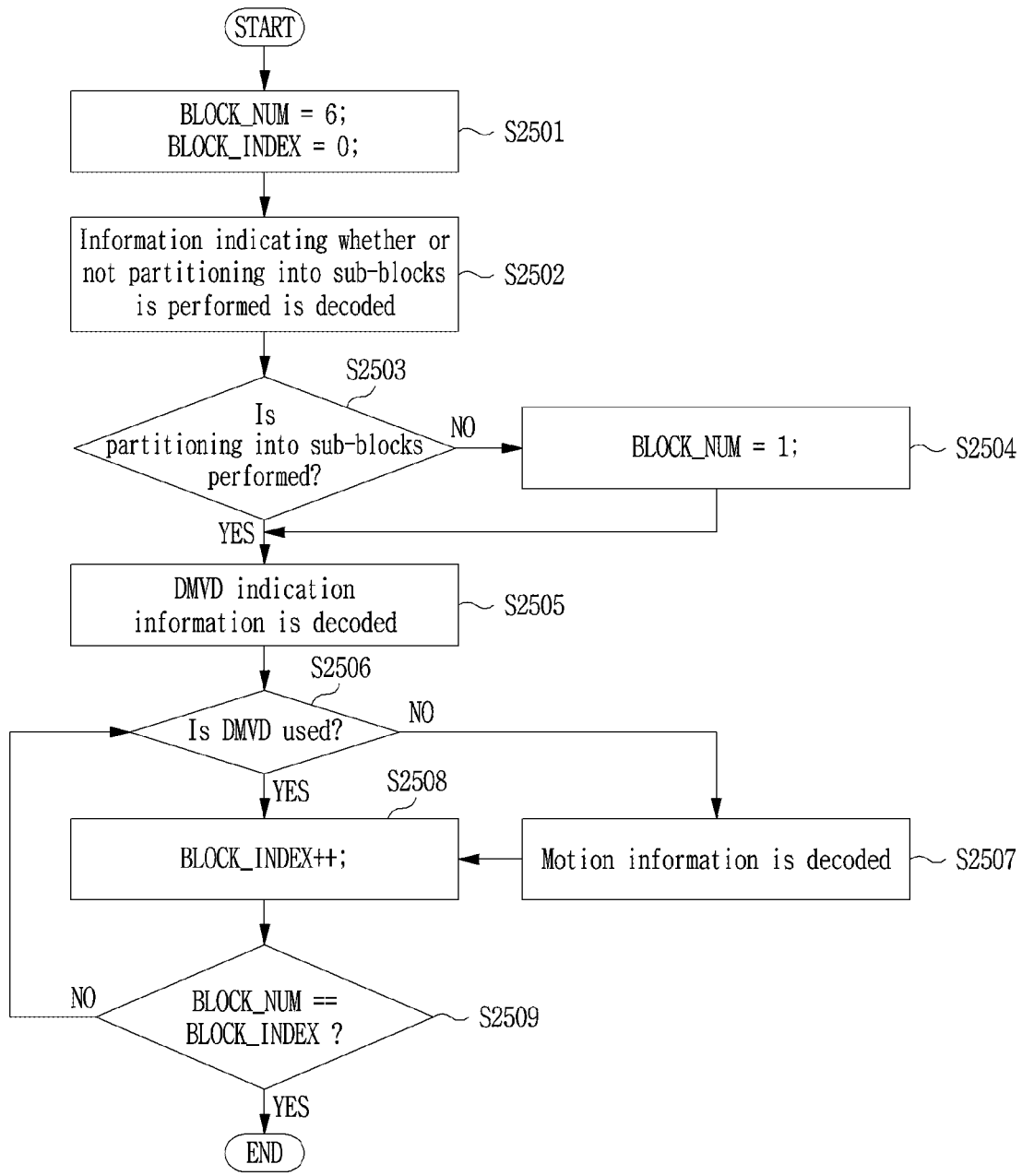
FIG. 41 is a flowchart illustrating an example of a method of decoding information encoded by the encoding method shown in FIG. 40.

FIG. 41 is a flowchart illustrating an example of a method of decoding information encoded by the encoding method shown in FIG. 40. In FIG. 36, the total number of sub-blocks of the current block is set to six, so that the variable BLOCK_NUM, which indicates the total number of sub-blocks to be decoded, is initialized to six and the variable BLOCK_INDEX, which indicates the index of the sub-block to be decoded, is initialized to zero at step S2501. As described above, on the basis of the reconstructed blocks around the current block, the image decoding device 400 and the image encoding device 100 partition the current block into the sub-blocks in the same manner, so that the information indicating the number of the sub-blocks does not need to be transmitted to the image decoding device 400. The image decoding device 400 may determine by itself, on the basis of the reconstructed blocks around the current block, the number of the sub-blocks that may be present in the current block.

After step S2501, SUB_BLOCK, the information indicating whether or not the current block is partitioned into sub-block, is decoded at step S2502. Whether or not the current block is partitioned into the sub-blocks is determined at step S2403, and when the partitioning into the sub-blocks is not performed, the value of the variable BLOCK_NUM is changed into one at step S2404.

Afterward, the DMVD indication information indicating whether or not the inter prediction using the reconstructed pixel region has beer used is decoded at step S2505. Whether or not the inter prediction using the reconstructed pixel region has been used is determined at step S2506, and when the inter prediction using the reconstructed pixel region has not been used, the motion information is decoded at step S2507. Conversely, when the inter prediction using the reconstructed pixel region has been used, the value of BLOCK_INDEX is increased at step S2508 and is compared with the variable BLOCK_NUM at step S2509. When the value of BLOCK_INDEX is the same as the value of BLOCK_NUM, this means that there is no more sub-block to be decoded in the current block, so that the algorithm ends. When the two values differ, proceeding to the subsequent sub-block to be decoded, which is present within the current block, takes place and then the process repeats from step S2506.

Sixth Exemplary Embodiment

Hereinafter, the sixth exemplary embodiment of the present invention will be described with reference to the drawings.

Figure 42A:
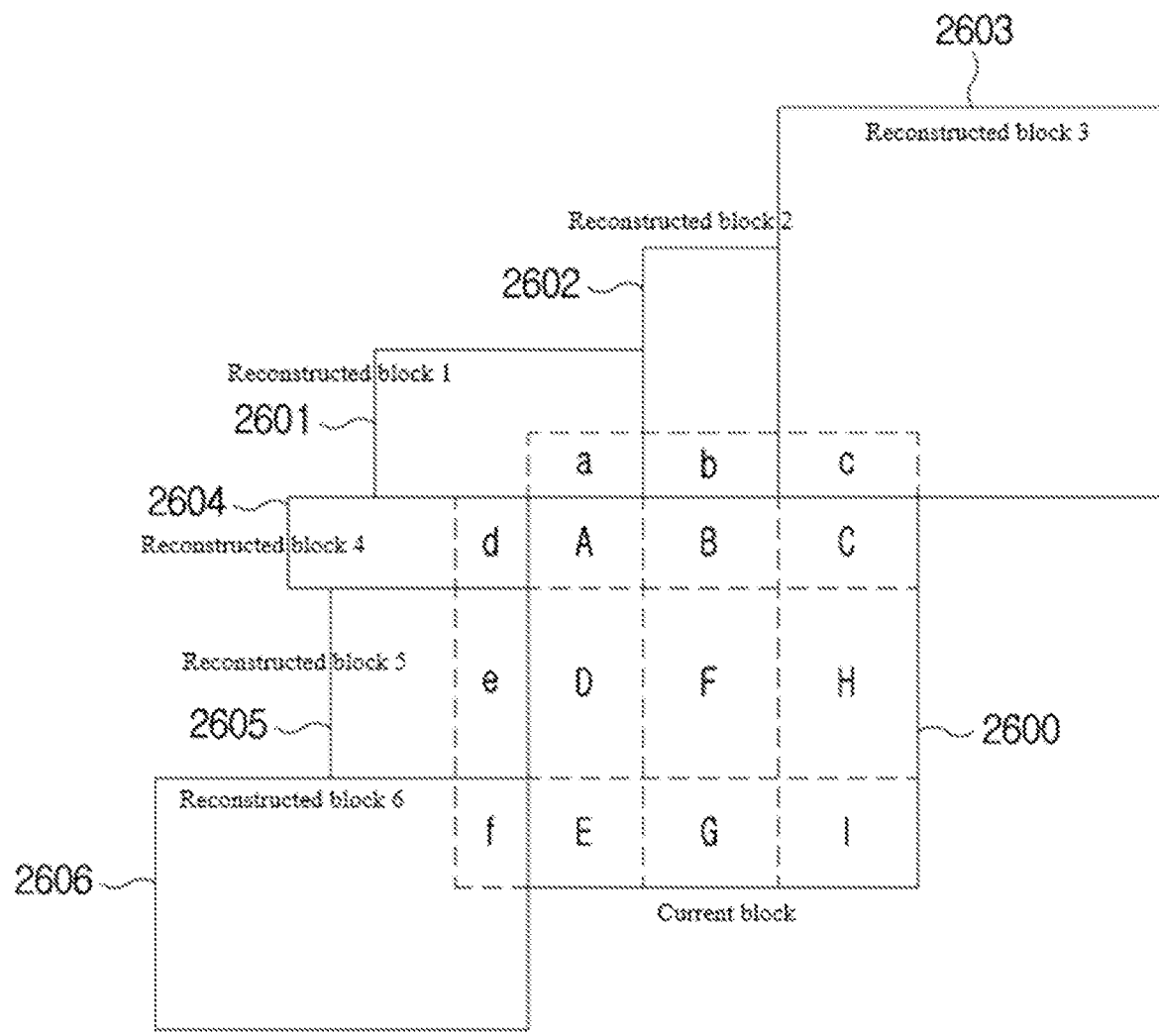
FIGS. 42a and 42b are diagrams illustrating a sixth exemplary embodiment of the present invention.
Figure 42B:
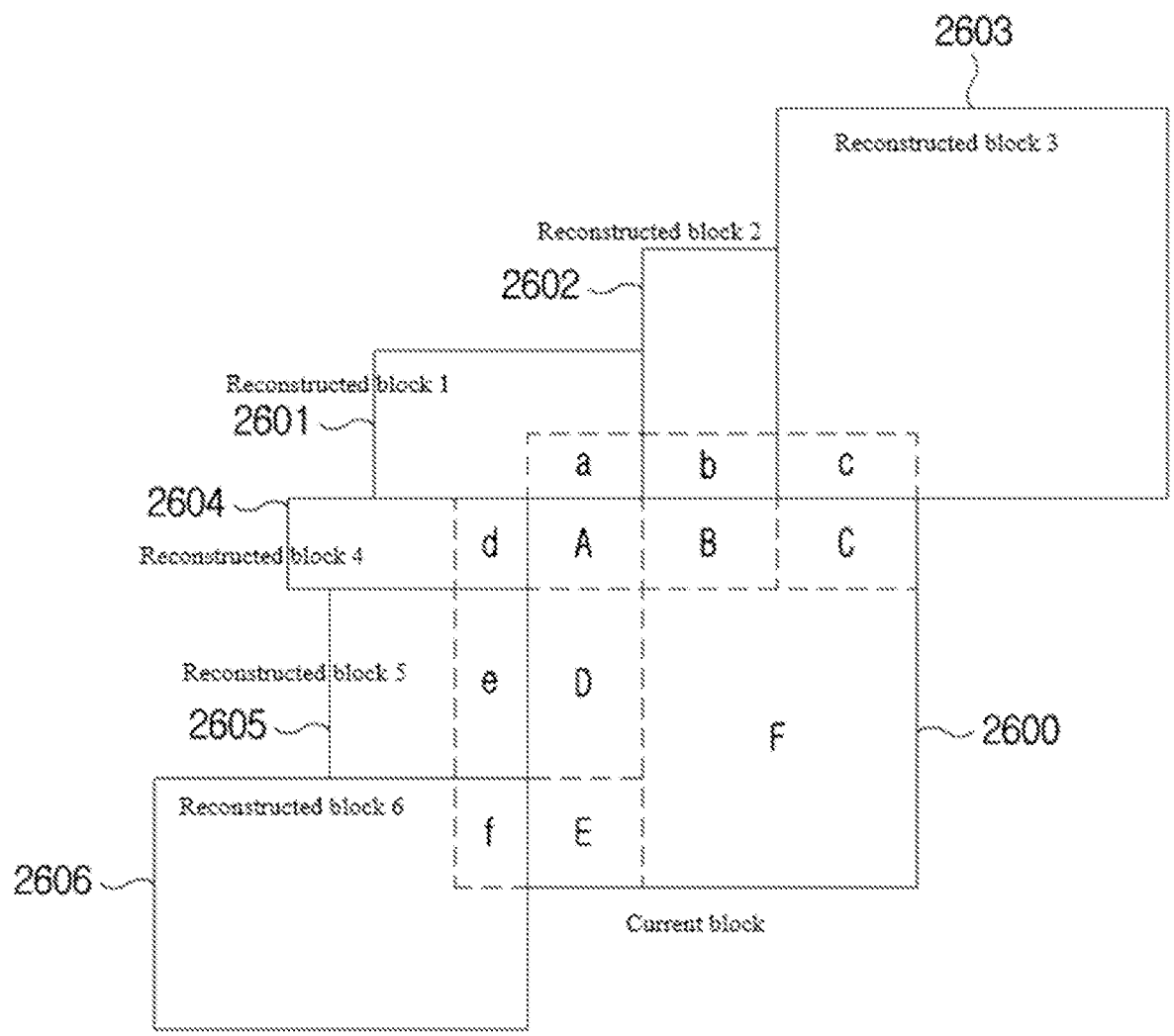

FIGS. 42a and 42b are diagrams illustrating the sixth exemplary embodiment of the present invention.

As shown in FIGS. 42a and 42b, assuming that reconstructed block 1 2601 to reconstructed block 6 260 are present around a current block 2600, the reconstructed pixel region may be partitioned into sub-blocks a to f according to the method shown in FIG. 36. According to the method shown in FIG. 37, the current block 2600 may be partitioned into sub-blocks A to I.

Here, the sub-blocks F, G, H, and I are spaced apart from the reconstructed pixel region rather than being in contact therewith, so that inter prediction using the reconstructed pixel region may be inaccurate. Therefore, in the case of the sub-blocks F, G, H, and I, the conventional inter prediction is performed, and only in the case of the sub-blocks A to E, inter prediction using the reconstructed pixel region may be used.

When inter prediction using reconstructed pixel region is performed on the su-blocks A to E, inter prediction is performed using the reconstructed pixel region adjacent to each sub-block. For example, inter prediction may be performed using reconstructed pixel region b for the sub-block B, using reconstructed pixel region c for the sub-block C, using reconstructed pixel region e for the sub-block D. and using reconstructed pixel region f for the sub-block E. In the case of the sub-block A, according to preset priority, inter prediction may be performed using either the reconstructed pixel region a or d, or using the reconstructed pixel regions a and d.

Alternatively, possibly, an index indicating which reconstructed pixel region is used for each sub-block when inter prediction using the reconstructed pixel region is performed on the sub-blocks A to E, is encoded. For example, among the reconstructed pixel regions a to f, the reconstructed pixel region b may be used to perform inter prediction on the sub-block A. In the case of the sub-block E, inter prediction may be performed using the reconstructed pixel region c. In this case, according to the horizontal or vertical size of each of the reconstructed pixel regions a to f, the number of, the positions of pixels in each region, and the like, the priority is determined and indexes are assigned.

In the case of the sub-blocks F to I, encoding or decoding may be possible by performing the conventional inter prediction. Alternatively, as shown in FIG. 42b, the sub-blocks F to I may be integrated into one and may be encoded or decoded using the conventional inter prediction.

Figure 43:
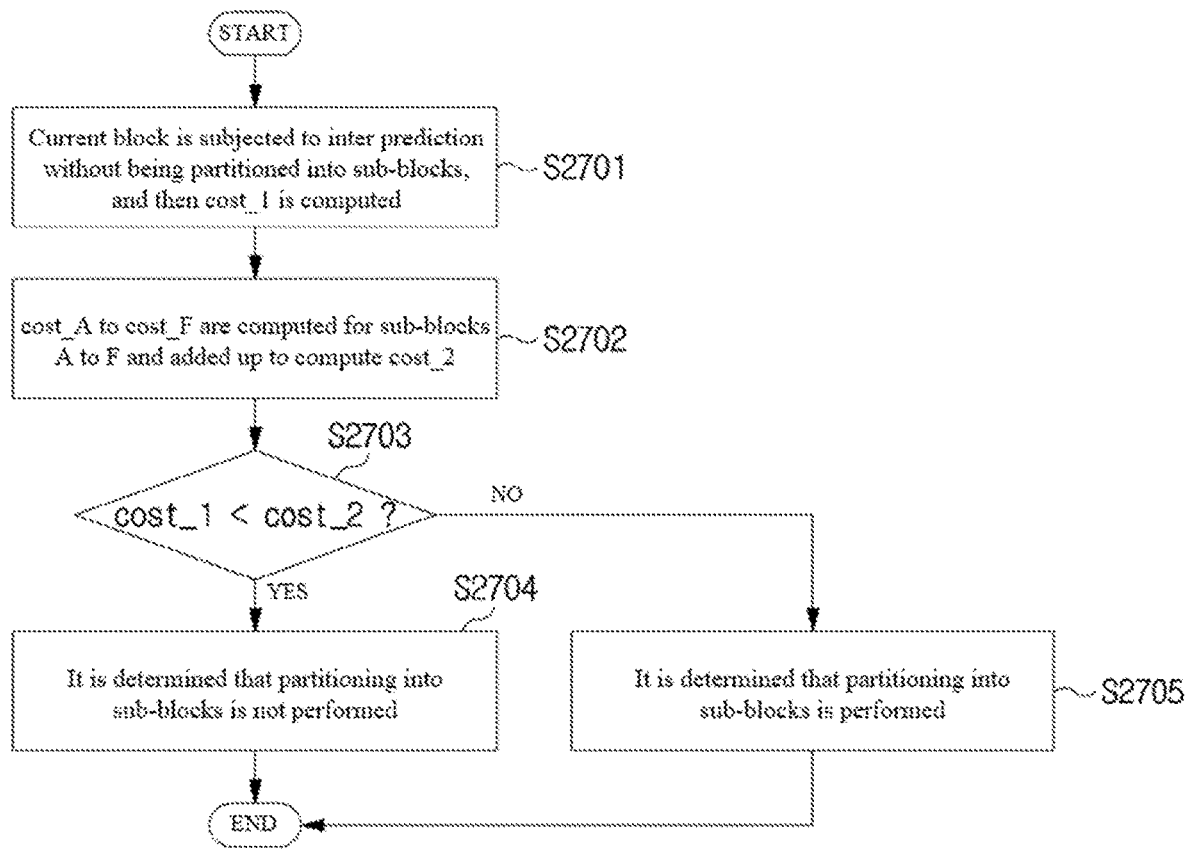
FIG. 43 is a flowchart illustrating an example of a method of determining an inter prediction mode according to the sixth exemplary embodiment of the present invention described with reference to FIGS. 42a and 42b.

FIG. 43 is a flowchart illustrating an example of a method of determining an inter prediction mode according to the sixth exemplary embodiment of the present invention described with reference to FIGS. 42a and 42b. For convenience of description, in this example, as shown in FIG. 42b, it is assumed that as the neighboring reconstructed blocks, the reconstructed block 1 2601 to the reconstructed block 6 2606 are present, and that the reconstructed pixel region is partitioned into sub-reconstructed pixel regions a to f. Further, it is assumed that the current block 2600 is partitioned into the sub-blocks A to F. Here, the sub-block F is the one into which the sub-blocks F to I in FIG. 42a are integrated.

Further, a case in which the index indicating which sub-reconstructed region is used when performing inter prediction using the reconstructed pixel region is encoded, will be described as an example. As an example, it will be described that the sub-block F is encoded or decoded by performing the conventional inter prediction. The description is given assuming that among the sub-blocks within the current block, the sub-block F is encoded or decoded last.

Referring to FIG. 43, first, the current block is subjected to inter prediction without being partitioned into sub-blocks, and then cost_1 is computed at step S2701. Afterward, the sub-blocks A to F are subjected to inter prediction individually, and cost_A to cost_F are computed and then added up to compute cost_2 at step S2702. The computed cost_1 is compared with the computed cost_2 at step S2703. When cost_1 is lower, it is determined at step S2704 that partitioning into sub-blocks is not performed. Otherwise, it is determined at step S2705 that partitioning into sub-blocks is performed and inter prediction is performed, and the algorithm ends.

Figure 44:
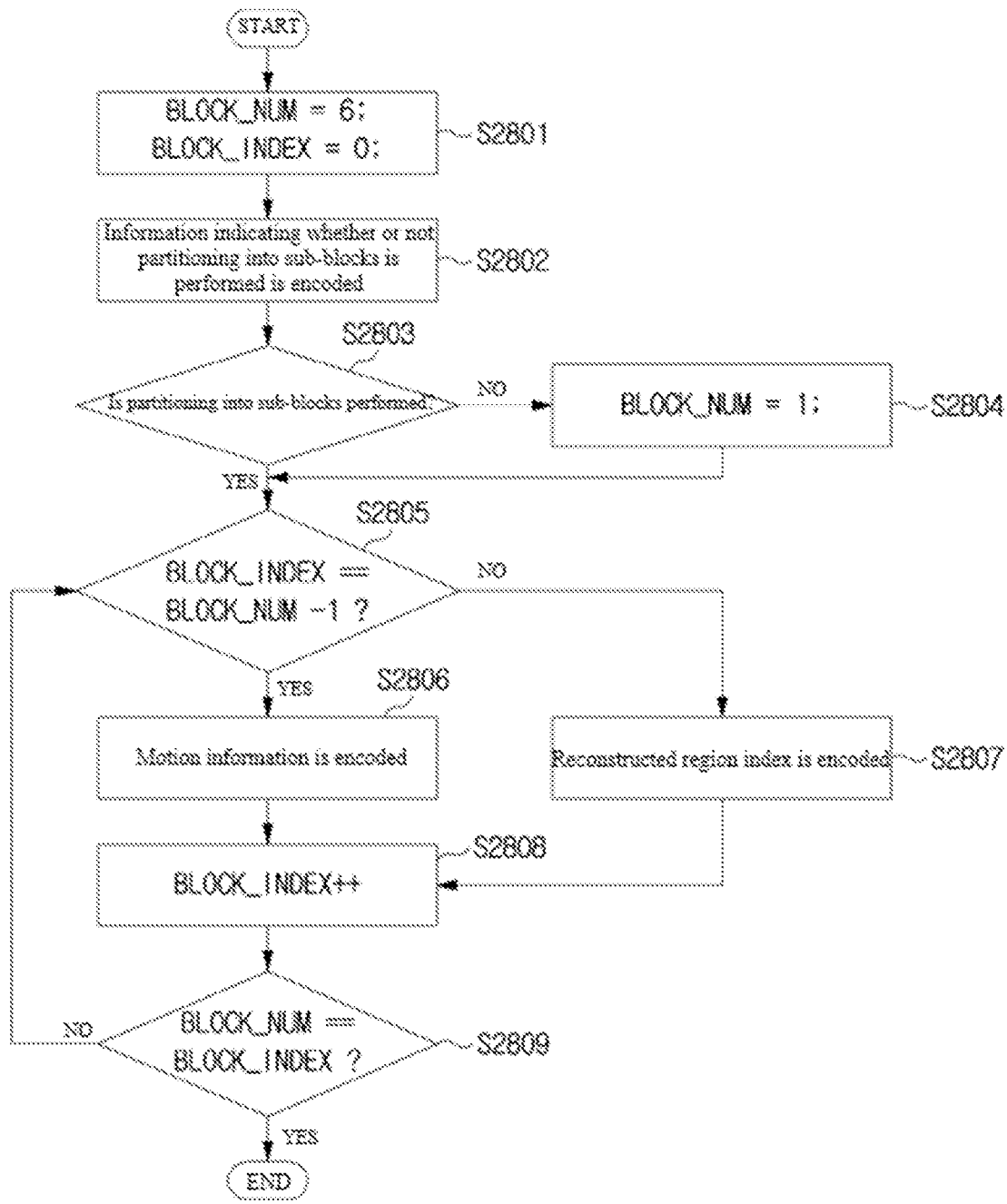
FIG. 44 is a diagram illustrating a process of encoding information determined by the method shown in FIG. 43.

FIG. 44 is a diagram illustrating a process of encoding information determined by the method shown in FIG. 43. In FIG. 42b, the total number of sub-blocks of the current block is set to six, so that the variable BLOCK_NUM, which Indicates the total number of sub-blocks to be encoded, is initialized to six and the variable BLOCK_INDEX, which indicates the index of the sub-block to be encoded, is initialized to zero at step S2801. Here, the current block is partitioned into the sub-blocks on the basis of the reconstructed blocks around the current block, so that it is not necessary to encode the number of the sub-blocks. The image decoding device 400 partitions the current block into the sub-blocks in the same manner as the image encoding device 100, so that the image decoding device 400 is capable of determining the number of the sub-blocks that may be present in the current block.

After step S2801, SUB_BLOCK, the information indicating whether or not the current block is partitioned into sub-blocks, is encoded at step S2802. Whether or not the current block is partitioned into the sub-blocks is determined at step S2803, and when the partitioning into the sub-blocks is not performed, the value of the variable BLOCK_NUM is changed into one at step S2804.

Step S2805, at which the value of BLOCK_INDEX is compared with the value of BLOCK_NUM-1, is the step of determining whether the conventional inter prediction is used for the block or the inter prediction using the reconstructed pixel region is used for the block. When the two values are the same, it is the last block, namely, the sub-block subjected to the conventional inter prediction, so that the motion information is encoded at step S2806. Otherwise, it is the sub-block subjected to the inter prediction using the reconstructed pixel region, so that the index indicating which sub-reconstructed region is used is encoded at step S2807. Alternatively, it is possible that this step is skipped and the same reconstructed region determined in the encoding device and the decoding device is used.

Afterward, the index of the sub-block is increased at step S2808, and BLOCK_NUM is compared with BLOCK_INDEX to determine whether or not encoding of all the sub-blocks present in the current block is completed, at step S2809. If not, proceeding to step S2805 takes place and the algorithm continues.

Figure 45:
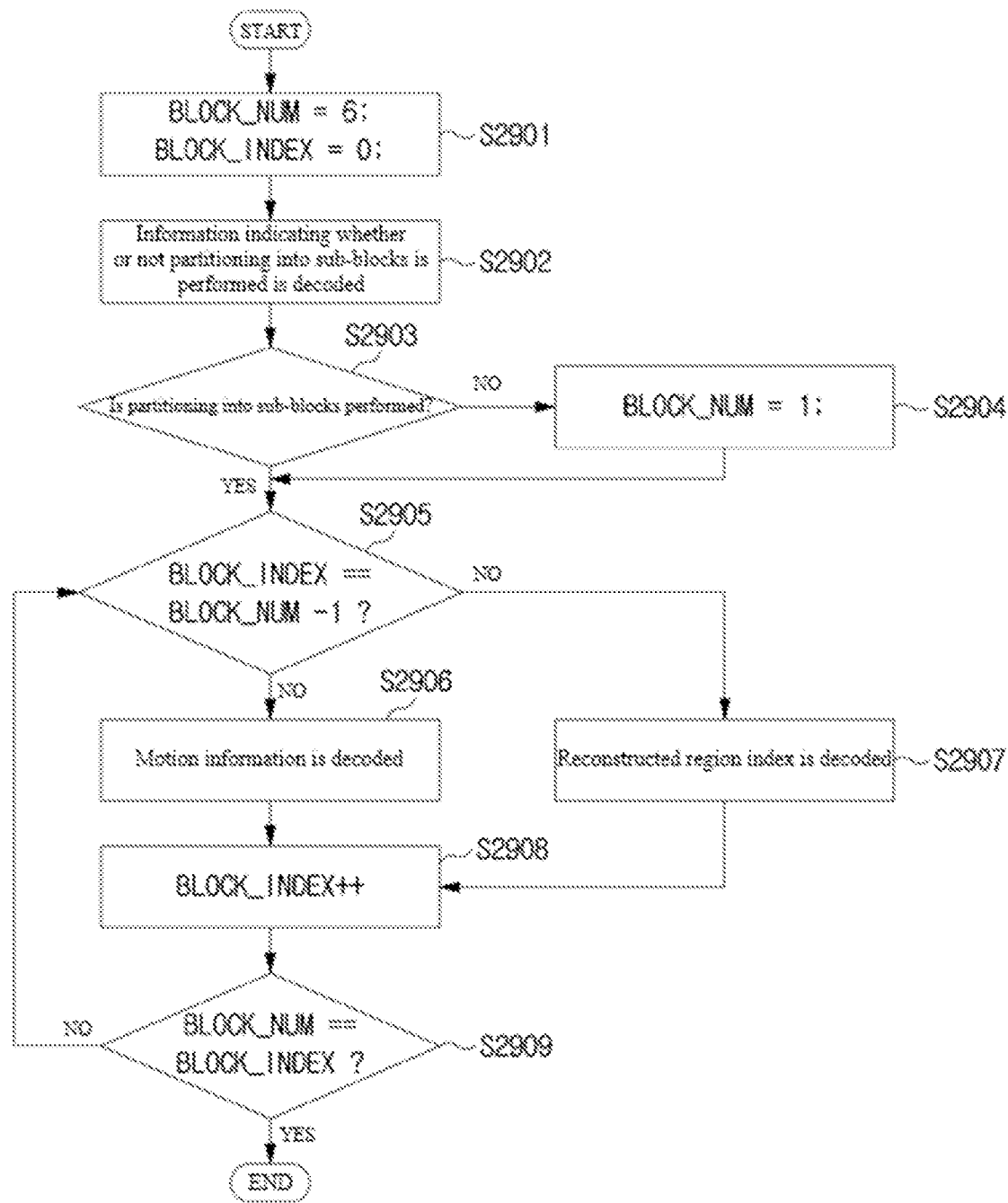
FIG. 45 is a diagram illustrating a process of decoding information encoded by the method shown in FIG. 44.

FIG. 45 is a diagram illustrating a process of decoding information encoded by the method shown in FIG. 44. In FIG. 42b, the total number of sub-blocks of the current block is set to six, so that the variable BLOCK_NUM, which indicates the total number of sub-blocks to be encoded, is initialized to six and the variable BLOCK_INDEX, which indicates the index of the sub-block to be encoded, is initialized to zero at step S2901. Here, the current block is partitioned into the sub-blocks on the basis of the reconstructed blocks around the current block, so that it is not necessary to encode the number of the sub-blocks. The image decoding device 400 partitions the current block into the sub-blocks in the same manner as the image encoding device 100, so that the image decoding device 400 is capable of determining the number of the sub-blocks that may be present in the current block.

After step S2901, SUB_BLOCK, the information indicating whether or not the current block is partitioned into sub-blocks, is decoded at step S2902. Whether or not the current block is partitioned into the sub-blocks is determined at step S2903, and when the partitioning into the sub-blocks is not performed, the value of the variable BLOCK_NUM is changed into one at step S2904.

Step S2905, at which the value of BLOCK_INDEX is compared with the value of BLOCK_NUM-1, is the step of determining whether the conventional inter prediction is used for the block or the inter prediction using the reconstructed pixel region is used for the block. When the two values are the same, it is the last block, namely, the sub-block subjected to the conventional inter prediction, so that the motion information is decoded at step S2908. Otherwise, it is the sub-block subjected to the inter prediction using the reconstructed pixel region, so that the index indicating which sub-reconstructed region is used is decoded at step S2907. Alternatively, it is possible that this step is skipped and the same reconstructed region determined in the encoding device and the decoding device is used. Afterward, the index of the sub-block is increased at step S2908, and BLOCK_NUM is compared with BLOCK_INDEX to determine whether or not decoding of all the sub-blocks present in the current block is completed, at step S2909 If not, proceeding to step S2905 takes place and the algorithm continues.

Although the exemplary methods described in the present invention are represented as a series of operations for clarity of description, the order of the steps is not limited thereto. When necessary, the steps may be performed simultaneously or in a different order. In order to realize the method according to the present invention, other steps may be added to the illustrative steps, some steps may be excluded from the illustrative steps, or some steps may be excluded while additional steps may be included.

The various embodiments of the present invention are not intended to list all possible combinations, but to illustrate representative aspects of the present invention. The matters described in the various embodiments may be applied independently or in a combination of two or more.

Further, the various embodiments of the present invention may be implemented by hardware, firmware, software, or combinations thereof. In the case of implementation by hardware, implementation is possible by one or more application specific integrated circuits (ASICs), digital signal processors (DSPs), digital signal processing devices (DSPDs), programmable logic devices (PLDs), field programmable gate arrays (FPGAs), general processors, controllers, micro controllers, microprocessors, or the like.

The scope of the present invention includes software or machine-executable instructions (for example, an operating system, an application, firmware, a program, or the like) that cause operation according to the methods of the various embodiments to be performed on a device or a computer, and includes a non-transitory computer-readable medium storing such software or instructions to execute on a device or a computer.

INDUSTRIAL APPLICABILITY

The present invention is applicable to a field of encoding or decoding an image signal.

The invention claimed is:

1. A method of decoding an image, performed by an image decoding device, comprising:
   deriving a motion vector of a current block in a current picture by motion search based on a first reconstructed pixel region (52) for inter prediction of the current block, the first reconstructed pixel region being reconstructed before the current block and being adjacent to the current block; and
   generating, based on the motion vector of the current block, a prediction block of the current block by performing the inter prediction of the current block,
   wherein deriving the motion vector of the current block in the image by the motion search comprises:
      obtaining a second reconstructed pixel region (54) through the motion search within a search range based on the first reconstructed pixel region; and
      deriving, based on a displacement between the second reconstructed pixel region and a temporary region (56) in a reference picture of the current block, the motion vector, the temporary region is obtained based on the first reconstructed pixel region of the current picture,
   wherein the search range is a pre-defined range in the image decoding device and is a partial region within the reference picture,
   wherein decoder-side motion vector derivation (DMVD) indication information indicates whether to perform the inter prediction to derive the motion vector of the current block by the motion search based on the reconstructed pixel region, is defined in units of blocks,
   wherein the DMVD indication information is dependent on first information indicating whether or not the inter prediction using the reconstructed pixel region is enabled,
   wherein, in response to the first information being TRUE, whether to perform the inter prediction to derive the motion vector of the current block by the motion search is determined based on the DMVD indication information,
   wherein, in response to the first information being FALSE, the inter prediction to derive the motion vector of the current block by the motion search is not performed, and
   wherein the first information is defined in units of pictures and is signaled from a picture header of a bitstream.

2. A method of encoding an image, performed by an image encoding device, comprising:
   deriving a motion vector of a current block in a current picture by motion search based on a first reconstructed pixel region (52) for inter prediction of the current block, the first reconstructed pixel region being reconstructed before the current block and being adjacent to the current block; and
   generating, based on the motion vector of the current block, a prediction block of the current block by performing the inter prediction of the current block,
   wherein deriving the motion vector of the current block in the image by the motion search comprises:
      obtaining a second reconstructed pixel region (54) through the motion search within a search range based on the first reconstructed pixel region; and
      deriving, based on a displacement between the second reconstructed pixel region and a temporary region (56) in a reference picture of the current block, the motion vector, the temporary region is obtained based on the first reconstructed pixel region of the current picture,
   wherein the search range is a pre-defined range in the image decoding device and is a partial region within the reference picture,
   wherein decoder-side motion vector derivation (DMVD) indication information indicates whether to perform the inter prediction to derive the motion vector of the current block by the motion search based on the reconstructed pixel region, is defined in units of blocks,
   wherein the DMVD indication information is dependent on first information indicating whether or not the inter prediction using the reconstructed pixel region is enabled,
   wherein, in response to the first information being TRUE, the DMVD indication information is determined based on whether to perform the inter prediction to derive the motion vector of the current block by the motion search,
   wherein, in response to the first information being FALSE, the inter prediction to derive the motion vector of the current block by the motion search is not performed, and
   wherein the first information is defined in units of pictures and is signaled from a picture header of a bitstream.

3. A non-transitory computer-readable medium storing a bitstream generated by an encoding method, the method comprising:
   deriving a motion vector of a current block in a current picture by motion search based on a first reconstructed pixel region (52) for inter prediction of the current block, the first reconstructed pixel region being reconstructed before the current block and being adjacent to the current block; and
   generating, based on the motion vector of the current block, a prediction block of the current block by performing the inter prediction of the current block,
   wherein deriving the motion vector of the current block in the image by the motion search comprises:
      obtaining a second reconstructed pixel region (54) through the motion search within a search range based on the first reconstructed pixel region; and
      deriving, based on a displacement between the second reconstructed pixel region and a temporary region (56) in a reference picture of the current block, the motion vector, the temporary region is obtained based on the first reconstructed pixel region of the current picture,
   wherein the search range is a pre-defined range in the image decoding device and is a partial region within the reference picture,
   wherein decoder-side motion vector derivation (DMVD) indication information indicates whether to perform the inter prediction to derive the motion vector of the current block by the motion search based on the reconstructed pixel region, is defined in units of blocks,
   wherein the DMVD indication information is dependent on first information indicating whether or not the inter prediction using the reconstructed pixel region is enabled, wherein, in response to the first information being TRUE, the DMVD indication information is determined based on whether to perform the inter prediction to derive the motion vector of the current block by the motion search, wherein, in response to the first information being FALSE, the inter prediction to derive the motion vector of the current block by the motion search is not performed, and wherein the first information is defined in units of pictures and is signaled from a picture header of the bitstream.

* * * * *